United States Patent
Novoselac et al.

(10) Patent No.: US 11,041,680 B2
(45) Date of Patent: Jun. 22, 2021

(54) HIGH-DENSITY LATENT HEAT STORAGE DEVICE

(71) Applicant: BOARD OF REGENTS, THE UNIVERSITY OF TEXAS SYSTEM, Austin, TX (US)

(72) Inventors: Atila Novoselac, Austin, TX (US); Stephen Bourne, Austin, TX (US)

(73) Assignee: BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 315 days.

(21) Appl. No.: 16/306,693

(22) PCT Filed: Jun. 2, 2017

(86) PCT No.: PCT/US2017/035681
§ 371 (c)(1),
(2) Date: Dec. 3, 2018

(87) PCT Pub. No.: WO2017/210555
PCT Pub. Date: Dec. 7, 2017

(65) Prior Publication Data
US 2019/0137190 A1    May 9, 2019

Related U.S. Application Data

(60) Provisional application No. 62/345,564, filed on Jun. 3, 2016.

(51) Int. Cl.
*F28D 20/02* (2006.01)
*F28F 1/04* (2006.01)
*F28D 20/00* (2006.01)

(52) U.S. Cl.
CPC ............. *F28D 20/02* (2013.01); *F28F 1/045* (2013.01); *F28D 2020/0021* (2013.01); *Y02E 60/14* (2013.01)

(58) Field of Classification Search
CPC .. F28D 20/00; F28D 20/02; F28D 2020/0021; F28F 1/045; Y02E 60/14;
(Continued)

(56) References Cited

U.S. PATENT DOCUMENTS

2007/0029064 A1   2/2007   Baginski et al.
2013/0240171 A1   9/2013   Morgan et al.
(Continued)

FOREIGN PATENT DOCUMENTS

EP   2905568 A1 *   8/2015   ........... F28D 7/0025
EP   2905568 A1     8/2015

OTHER PUBLICATIONS

Abhat, A. 1983. "Low Temperature Latent Heat Thermal Storage: Heat Storage Materials." Solar Energy vol. 30 (4): 313-32.
(Continued)

*Primary Examiner* — Edward F Landrum
*Assistant Examiner* — Chang H Park
(74) *Attorney, Agent, or Firm* — Meunier Carlin & Curfman LLC

(57) ABSTRACT

Latent heat storage devices are disclosed, such as latent heat storage devices comprising a phase change material encapsulated in sufficiently conductive tubes, wherein the tubes are arrayed in a hexagonal-packed pattern. The devices herein can be used, for example, in residential and/or commercial HVAC systems.

20 Claims, 28 Drawing Sheets

(58) Field of Classification Search
CPC .................. F24F 5/0017; F24F 5/0021; F24F 2005/0025; F24F 2005/0028
USPC ................................................... 165/10, 236
See application file for complete search history.

(56) References Cited

U.S. PATENT DOCUMENTS

| | | |
|---|---|---|
| 2013/0240188 A1 | 9/2013 | Xiang et al. |
| 2015/0204612 A1 | 7/2015 | Sun et al. |

OTHER PUBLICATIONS

Agyenim, Francis, Neil Hewitt, Philip Eames, and Mervyn Smyth. 2010. "A Review of Materials, Heat Transfer and Phase Change Problem Formulation for Latent Heat Thermal Energy Storage Systems (LHTESS)." Renewable and Sustainable Energy Reviews 14 (2): 615-28. doi:10.1016/j.rser.2009.10.015.
Andrepont, John S. 2012. "Applications of Low Temperature Fluid (LTF) in Thermally Stratified Thermally Stratified Thermal Energy Energy Storage (TES)." ASHRAE Transactions 118: 487.
ASTM International, 2014. D2846-14 Standard Specification for Chlorinated Poly(Vinyl Chloride) (CPVC) Plastic Hot-and-Cold-Water Distribution Systems. West Conshohocken, PA, 12 pages.
ASTM International. 2014 B88-09 Standard Specification for Seamless Copper Water Tube, 7 pages.
Baetens, Ruben, Bjørn Petter Jelle, and Arild Gustavsen. 2010. "Phase Change Materials for Building Applications: A State-of-the-Art Review." Energy and Buildings 42 (9): 1361-68. doi:10.1016/j.enbuild.2010.03.026.
Bentley, W. G., and John C. Evelyn. 1986. "Customer Thermal Energy Storage a Marketing Opportunity for Cooling off Electric Peak Demand." Power Systems, IEEE Transactions on 1 (4): 57-61.
Bezdek, Andréas, and Wlodzimierz Kuperberg. 1990. "Maximum Density Space Packing with Congruent Circular Cylinders of Infinite Length." Mathematika 37 (01): 74-80.
Bilir, Levent, and Zafer Iken. 2005. "Total Solidification Time of a Liquid Phase Change 10 Material Enclosed in Cylindrical/spherical Containers." Applied Thermal Engineering 25 (10) (July): 1488-1502. doi:10.1016/j.applthermaleng.2004.10.005.
Bourne, S., Ph.D. Student Civil, Environmental and Architectural Engineering The University of Texas at Austin, Thermal Storage and The Building Side of Smart Grid, Presented at Energy Symposium, Mar. 2013, 10 pages.
Bourne, M.S. CIV & ENVIR ENG, High Density Thermal Energy Stores Utilizing Phase Change Materials for Shifting of Peak Cooling Loads, Power Point Presentation 2016, 51 pages.
Bourne, Stephen, and Atila Novoselac. 2015. "Compact PCM-Based Thermal Stores for Shifting Peak Cooling Loads." Building Simulation, 2015, vol. 8, Issue 6, pp. 673-688.
Bourne, Stephen, and Atila Novoselac. 2015. "PCM-Based High-Density Thermal Storage Systems for Residential and Small Commercial Retrofit Applications." Procedia Engineering 121: 536-43. doi:10.1016/j.proeng.2015.08.1025.
Bourne, Stephen, and Atila Novoselac. 2016. "Improved Performance in Tube-Encapsulated Phase Change Thermal Energy Stores for HVAC Applications." Building and Environment Mar. 1998: 133-44. doi:10.1016/j.buildenv.2015.12.023.
Bourne, Steve, and Atila Novoselac. 2014. "Compact Phase Change Based Thermal Storage: Experimental Apparatus, Methodology, and Results." ASHRAE Transactions 120 (1): 1-8.
2012 Commercial Buildings Energy Consumption Survey: Energy Usage Summary CBECS 2012—Release date: Mar. 18, 2016, accessed on-line: http://www.eia.gov/consumption/commercial/reports/2012/energyusage/ (accessed Apr. 29, 2016).
Choi, Eunsoo, Young I. Cho, and Harold G. Lorsch. 1992. "Thermal Analysis of the Mixture of Laboratory and Commercial Grades Hexadecane and Tetradecane." International Communications in Heat and Mass Transfer 19 (1): 1-15.
Chun-Long Chen, and Nihad Dukhan. 2012. "Metal-Foam Enhanced PCM Storage System: The Cylinder-in-Cylinder Geometry." ASHRAE Transactions; Velraj, R. et al. 1999. Solar Energy 65 (3): 171-80.
Dimaano, Maria Natalia R., and Takayuki Watanabe. 2002. "The Capric—lauric Acid and Pentadecane Combination as Phase Change Material for Cooling Applications." Applied Thermal Engineering 22 (4): 365-377.
Electricity Overview, 2017, 23 pages. http://www.eia.gov/totalenergy/data/monthly/pdf/sec7.pdf.
Fan, Liwu, and J. M. Khodadadi. 2011. Renewable and Sustainable Energy Reviews 15 (1): 24-46.
Farid, Mohammed M, Amar M Khudhair, Siddique Ali K Razack, and Said Al-Hallaj. 2004. "A Review on Phase Change Energy Storage: Materials and Applications." Energy Conversion and Management 45 (9-10): 1597-1615. doi:10.1016/j.enconman.2003.09.015.
Feldman, D., M. M. Shapiro, and D. Banu. 1986. "Organic Phase Change Materials for Thermal Energy Storage." Solar Energy Materials 13 (1): 1-10.
Feldman, D., M. M. Shapiro, D. Banu, and C. J. Fuks. 1989. "Fatty Acids and Their Mixtures as Phase-Change Materials for Thermal Energy Storage." Solar Energy Materials 18 (3): 201-16.
Hajiah A, Krarti M (2012a). "Optimal Control of Building Storage Systems Using Both Ice Storage and Thermal Mass—Part I: Simulation Environment." Energy Conversion and 25 Management (April). doi:10.1016/j.enconman.2012.02.016. http://linkinghub.elsevier.com/retrieve/pii/S0196890412000799.
Hajiah A, Krarti M (2012b). Optimal controls of building storage systems using both ice storage and thermal mass—Part II: parametric analysis. Energy Conversion and Management, 64: 509-515. doi:10.1016/j.enconman.2012.02.020.
Hales, Thomas C. 1998. "An Overview of the Kepler Conjecture." arXiv Preprint math/9811071. (Submitted on Nov. 11, 1998 (v1), last revised May 20, 2002 (this version, v2) 16 pages. http://arxiv.org/abs/math/9811071.
He, B, V Martin, and F Setterwall. 2004. "Phase Transition Temperature Ranges and Storage Density of Paraffin Wax Phase Change Materials." Energy 29 (11): 1785-1804. doi:10.1016/j.energy.2004.03.002.
He, Bo, and Fredrik Setterwall. 2002. "Technical Grade Paraffin Waxes as Phase Change Materials for Cool Thermal Storage and Cool Storage Systems Capital Cost Estimation." Energy Conversion and Management 43 (13): 1709-23.
He, Bo, E. Mari Gustafsson, and Fredrik Setterwall. 1999. "Tetradecane and Hexadecane Binary Mixtures as Phase Change Materials (PCMs) for Cool Storage in District Cooling Systems." Energy 24 (12): 1015-1028.
Hermanns, Holger, and Holger Wiechmann. 2009. "Future Design Challenges for Electric Energy Supply." In Emerging Technologies & Factory Automation, 2009. ETFA 2009. IEEE Conference on, 1-8. http://ieeexplore.ieee.org/xpls/abs_all.jsp?arnumber=5347150.
How much energy is consumed in U.S. residential and commercial buildings? http://www.eia.gov/tools/faqs/faq.cfm?id=86&t=1 (accessed Apr. 29, 2016).
Ismail, K.A.R., and M.M. Goncalves. 1999. "Thermal Performance of a PCM Storage Unit." Energy Conversion and Management 40: 115-138.
Ismail, K.A.R., and R.I.R. Moraes. 2009. "A Numerical and Experimental Investigation of Different Containers and PCM Options for Cold Storage Modular Units for Domestic Applications." International Journal of Heat and Mass Transfer 52 (19-20) (September): 4195-4202. doi:10.1016/j.ijheatmasstransfer.2009.04.031.
Jesumathy, Stella P., M. Udayakumar, and S. Suresh. 2012. "Heat Transfer Characteristics in Latent Heat Storage System Using Paraffin Wax." Journal of Mechanical Science and Technology 26 (3): 959-965.
Jiji, Latif M., and Salif Gaye. 2006. "Analysis of Solidification and Melting of PCM with Energy Generation." Applied Thermal Engineering 26 (5): 568-575.
Kousksou, T., A. Jamil, T. El Rhafiki, and Y. Zeraouli. 2010. "Paraffin Wax Mixtures as Phase Change Materials." Solar Energy Materials and Solar Cells 94 (12): 2158-65.

(56) References Cited

OTHER PUBLICATIONS

Li, Gang, Yunho Hwang, and Reinhard Radermacher. 2012. "Review of Cold Storage Materials for Air Conditioning Application." International Journal of Refrigeration 35 (8): 2053-2077.

Monthly Energy Review, Apr. 2016, 235 pages. http://www.eia.gov/totalenergy/data/monthly/#consumption (accessed Apr. 29, 2016).

O'Neill, M. J. 1966. "Measurement of Specific Heat Functions by Differential Scanning Calorimetry." Analytical Chemistry 38 (10): 1331-36.

Regin, A. Felix, S.C. Solanki, and J.S. Saini. 2008. "Heat Transfer Characteristics of Thermal Energy Storage System Using PCM Capsules: A Review." Renewable and Sustainable Energy Reviews 12 (9): 2438-58. doi:10.1016/j.rser.2007.06.009.

Shamsundar, N, and Sparrow, E.M. 1975. "Analysis of Multidimensional Conduction Phase Change Via the Enthalopy Method". ASME. http://heattransfer.asmedigitalcollection.asme.org.ezproxy.lib.utexas.edu/article.aspx?articleid=1436183.

Sharma, Atul, V.V. Tyagi, C.R. Chen, and D. Buddi. 2009. "Review on Thermal Energy Storage with Phase Change Materials and Applications." Renewable and Sustainable Energy Reviews 13: 318-45.

Table 6. Electricity consumption by end use, 2012, 2 pages. http://www.eia.gov/consumption/commercial/reports/2012/energyusage/xls/table6_electricity%20end%20uses.xlsx.

Trip Doggett. 2013. "ERCOT—A Strategic View of the Future" presented at the Gulf Coast Power Association Fall Annual Conference, Oct. 2. http://www.ercot.com/content/news/presentations/2013/GCPA—Oct. 2, 2013 FINAL.pdf.

Trp, Anica. 2005. "An Experimental and Numerical Investigation of Heat Transfer during Technical Grade Paraffin Melting and Solidification in a Shelland-Tube Latent Thermal Energy Storage Unit." Solar Energy 79 (6): 648-60. doi:10.1016/j.solener.2005.03.006.

U.S. Census Bureau. 2013. "American Housing Survey for the United States: 2011." H150/11. U.S. Government Printing Office. 186 pages. https://www.census.gov/content/dam/Census/programssurveys/ahs/data/2011/h150-11.pdf.

U.S. Energy Information Administration. Frequently asked Questions: How much electricity is used for cooling in the United States?. Jan. 21, 2012. [Accessed Mar. 10, 2013]. http://www.eia.gov/tools/faqs/faq.cfm?id=98&t=3.

U.S. Energy Information Administration. 2006. Commercial Building Energy Consumption Survey. U.S. Energy Information Administration. http://www.eia.gov/consumption/commercial/about.cfm.

U.S. Energy Information Administration. 2013. Annual Energy Outlook 2013. Washington D.C.: U.S. Energy Information Administration. 244 pages. http://www.eia.gov/forecasts/aeo/pdf/0383(2013).pdf.

U.S. Energy Information Administration. 2015a. Monthly Energy Review—Energy Information Administration. 5 Accessed Sep. 1, 2015. 232 pages. http://www.eia.gov/totalenergy/data/monthly/index.cfm#consumption.

U.S. Energy Information Administration. 2015b. Use of Electricity—Energy Explained, Your Guide to Understanding Energy—Energy Information Administration. Accessed Sep. 1, Last Updated: Apr. 30, 2018. 3 pages. http://www.eia.gov/energyexplained/index.cfm?page=electricity_use.

U.S. Energy Information Administration. 2015c. Residential Energy Consumption Survey (RECS)-Data—U.S. Energy Information Administration (EIA). Accessed Sep. 1. 2015. https://www.eia.gov/consumption/residential/data/2009/index.php?view=consumption U.S. Energy Information Administration. 2015d. "Annual Energy Outlook 2015 with Projections to 2040." DOE/EIA-0383(2015). Washington, D.C.: U.S. Energy Information Administation. http://www.eia.gov/forecasts/aeo/ 154 pages.

Velraj, R., R. V. Seeniraj, B. Hafner, C. Faber, and K. Schwarzer. 1999. "Heat Transfer Enhancement in a Latent Heat Storage System." Solar Energy 65 (3): 171-80.

International Preliminary Report on Patentability issued for Application No. PCT/US2017035681, dated Dec. 13, 2018, 8 pages.

The International Search Report and Written Opinion dated Aug. 14, 2017 in PCT/US2017/035681. 10 pages.

\* cited by examiner

Horizontal cross section of hexagonal-packed PCM encapsulation tubes

HIGH-DENSITY LATENT HEAT STORAGE DEVICE

CROSS REFERENCE TO RELATED APPLICATIONS

This application is a national stage application filed under 35 U.S.C. § 371 of PCT/US2017/035681 filed Jun. 2, 2017, which claims the benefit of U.S. Provisional Patent Application Ser. No. 62/345,564 filed Jun. 3, 2016, the disclosures of which are expressly incorporated herein by reference.

FIELD

The subject matter disclosed herein relates to latent heat storage devices in general, and in particular to high-density latent heat storage devices comprising a phase change materials. The devices herein can be used, for example, in residential and/or commercial HVAC systems.

BACKGROUND

Commercial and residential buildings consume more than 40% of the primary energy used in the United States, including 70% of all U.S. electricity. Overall, 11% of electricity is used for environmental cooling applications in the U.S. The amount of electricity used for environmental cooling in the warmer southern climates of the U.S. can rise substantially above this average; it has been estimated that more than 20% of the annual electric consumption for residential buildings in the southern census region of the United States is used for cooling applications, and can go as high as 27% of annual electric load in the hot and humid climate of Florida. When concentrated into the summer cooling season weather-sensitive loads such as these can exceed 50% of peak summer electric demand. Furthermore, the demand for residential and commercial cooling is expected to increase due to an ongoing shift in population towards warmer regions of the country.

The ability to shift peak cooling loads to off-peak periods, when existing underutilized base load generation capacity is available, can reduce the cost of electric power and improve returns on electric generation capital equipment investments. Shifting of these cooling loads to periods of renewable energy availability can also mitigate the uncertainty in power generation accompanied by the increased use of intermittent renewable energy sources such as wind and solar power, while making better use of these renewable energy systems.

Actively-controlled thermal energy stores can provide the means to time-shift building cooling loads. An active thermal storage system works like a thermal battery, charging during periods of low electricity costs or high availability and discharging when electricity is scarce or expensive. These storage systems can be particularly effective at reducing peak energy demand and overall building energy costs for environmental systems when utility peak demand and/or time-of-day electric rates are in place. A properly-sized thermal storage system can also reduce the required size and peak capacity of environmental cooling equipment, and thus reduce capital equipment costs, since the capacity of the equipment need only meet average rather than peak demand rates.

Water-glycol mixtures are a popular material used to store thermal energy in sensible form (as a change in temperature of a storage medium) since it has a relatively high heat capacity of between 3.7 and 4.2 kJ/(kg*K) depending on composition. In addition, water-glycol based hydronic cooling systems are common, making integration of this type of thermal store with existing cooling systems simple and cost effective. However, the necessary chilled water tanks are large; while new buildings can be designed around such tanks, existing buildings may not have the space necessary to add a sensible chilled water thermal storage system. Given the long lifespan of existing residential and commercial structures (the median age of residential and commercial buildings in the U.S. is approximately 37 and 28 years, respectively), the ability to retrofit thermal storage to existing buildings must be considered. For these retrofit applications, smaller, more compact high-density thermal stores may be required.

Such high density thermal stores can be developed using materials that store thermal energy in latent form, during a change in phase—for instance, from liquid to solid or gas to liquid—instead of in sensible form. Latent energy storage is characterized by a large enthalpy change at a constant (or with only a small change in) temperature. The result is that latent (phase change) systems can store thermal energy at a density an order of magnitude greater than that of a sensible (temperature change) system.

Many materials can be used for latent thermal energy storage. These materials are collectively known as PCMs, or phase change materials. Typical PCMs suitable for use in environmental control thermal storage applications are generally restricted to liquid-solid phase changes for volumetric efficiency and ease of use. While some liquid-gas phase transitions have high gravimetric thermal capacity, their volume changes and required operating pressures make them difficult to utilize. Common liquid-solid phase PCMs include water (ice), organics such as paraffins or fatty acids, and salt hydrates.

Water as ice has successfully been used for years as a phase change thermal storage medium (i.e., the "icebox" from years past). However, water expands when frozen making containment difficult during phase cycling. In addition, water freezes at a temperature significantly lower than the 5-12° C. typically used for HVAC systems, requiring a separate chiller system for ice-based thermal storage and increasing overall HVAC system installation and operation costs. Salt hydrates are caustic, tend to need subcooling (a requirement that they be cooled below their freezing point before crystallization is initiated), and suffer from phase segregation over repeated freeze-thaw cycles that limit their useful lifespan. Paraffins and fatty acid hydrocarbons offer relatively high heats of fusions (~200 kJ/kg), chemical stability, no subcooling (self-nucleating), do not degrade with thermal cycling, are available in temperature ranges suitable for HVAC applications, and are compatible with most encapsulation materials. They also tend to have poor thermal conductivity and are somewhat flammable, but these issues can be mitigated by thermal system design.

A previous study has demonstrated that latent thermal stores constructed of tube-encapsulated (CPVC tubes) paraffin-based PCMs show improved thermal storage densities over conventional sensible chilled water tanks (Bourne, Stephen, and Atila Novoselac. 2015. "Compact PCM-Based Thermal Stores for Shifting Peak Cooling Loads." *Building Simulation*, December 2015, Volume 8, Issue 6, pp 673-688). However, as the packing density of the CPVC PCM encapsulation tubes reaches their maximum and the tubes assume a hexagonal-packed configuration, the annular flow path is reduced to shared roughly triangular-shaped flow paths around each tube. This causes the heat transfer fluid (HTF) flow to be unevenly distributed around each encapsulation tube, resulting in uneven thermal energy distribution to and into the encapsulation tubes. This forces the encapsulation tube material and PCM to redistribute the thermal energy around and into the PCM. Both the CPVC and PCM used have poor thermal conductivity, resulting in unacceptable thermal performance for the hexagonal packed configuration.

One method for resolving the poor performance of the hexagonal packed configuration is through the use of PCM conductivity enhancements. Previous studies have investigated the use of internal PCM conductivity enhancements, such as metallic foam or stainless steel lessing rings, to improve the effective conductivity of the PCM (Fan, Liwu, and J. M. Khodadadi. 2011. Renewable and Sustainable Energy Reviews 15 (1): 24-46; Chun-Long Chen, and Nihad Dukhan. 2012. "Metal-Foam Enhanced PCM Storage System: The Cylinder-in-Cylinder Geometry." *ASHRAE Transactions*; Velraj, R. et al. 1999. *Solar Energy* 65 (3): 171-80). However, these methods add cost and reduce the PCM capacity of the thermal storage system by between 10 and 20%. Thus, there is a need for improved latent heat storage devices. The compositions devices and methods disclosed herein address these and other needs.

SUMMARY

Disclosed herein are high-density, compact latent heat storage devices and uses thereof. These high-density, compact thermal storage units are comprised of cylindrical encapsulation tubes which are: i) arrayed in a hexagonal-packed pattern; ii) contain a phase change material; and iii) are made of a sufficiently conductive material (for example, copper, aluminum, thermally-enhanced polymers, etc.). These high-density compact, thermal storage units are suitable for use, for example, in small to medium residential or commercial applications that utilize, or can be retrofitted to use, chilled water cooling coils. A model is also provided herein wherein the thermal and physical properties of the encapsulation tubes, heat transfer fluid, and a phase change material can be used to design the system. Alternatively, the model can be used to select the appropriate encapsulation tubes, heat transfer fluid, and phase change material based on defined system requirements.

In one aspect, provided herein is a latent heat storage device comprising:
a containment tank;
a plurality of cylindrical encapsulation tubes having a hollow interior, wherein the cylindrical encapsulation tubes are arrayed in a hexagonal-packed pattern, are comprised of a sufficiently conductive material, and are contained within the containment tank;
a phase change material, contained within the hollow interior of the cylindrical encapsulation tubes; and
a means for connecting the containment tank in fluid communication with a first source of heat transfer fluid to allow a heat transfer fluid to flow through a heat transfer fluid space to exchange heat with the phase change material;
wherein the latent heat storage device has a first resistance ratio of less than about 0.1, wherein the first resistance ratio is defined by the equation:

$$\frac{R_t}{R_c} = \frac{\pi^3}{72(2\sqrt{3} - \pi)} \frac{(r_o + r_i)/2}{(r_o - r_i)} \frac{Nu \, k_f}{k_t}$$

wherein:
$R_t$ is the resistance of conduction around the encapsulation tube [° K/W];
$R_c$ is the resistance of convection between the heat transfer fluid (HTF) and the encapsulation tube [° K/W];
$r_o$ is the outside radius of the encapsulation tube [m];
$r_i$ is the inside radius of the encapsulation tubing [m];
$k_f$ is the conductivity of the heat transfer fluid [W/(m·° K)];
$k_t$ is the conductivity of the encapsulation tube material [W/(m·° K)]; and
Nu is the Nusselt number.

In one aspect of the invention, provided herein is a latent heat storage device comprising:
a containment tank;
a plurality of cylindrical encapsulation tubes having a hollow interior, wherein the cylindrical encapsulation tubes are arrayed in a hexagonal-packed pattern, are comprised of a sufficiently conductive material, and are contained within the containment tank;
a phase change material, contained within the hollow interior of the cylindrical encapsulation tubes; and
a means for connecting the containment tank in fluid communication with a first source of heat transfer fluid to allow a heat transfer fluid to flow through a heat transfer fluid space to exchange heat with the phase change material;
wherein the latent heat storage device has a second resistance ratio of less than about 0.1, wherein the second resistance ratio is defined by the equation:

$$\frac{R_t}{R_p} = \frac{\pi^2}{18} \frac{(r_o + r_i)/2}{(r_0 - r_i)} \frac{k_p}{k_t}$$

wherein:
$R_t$ is the resistance of conduction around the encapsulation tube [° K/W];
$R_p$ is the resistance of conduction between the PCM and the encapsulation tube [° K/W];
$r_o$ is the outside radius of the encapsulation tube [m];
$r_i$ is the inside radius of the encapsulation tubing [m];
$k_p$ is the conductivity of the phase change material (PCM) [W/(m·° K)]; and
$k_t$ is the conductivity of the encapsulation tube material [W/(m·° K)].

In one aspect of the invention, provided herein is a latent heat storage device comprising:
a containment tank;
a plurality of cylindrical encapsulation tubes having a hollow interior, wherein the cylindrical encapsulation tubes are arrayed in a hexagonal-packed pattern, are comprised of a sufficiently conductive material, and are contained within the containment tank;
a phase change material, contained within the hollow interior of the cylindrical encapsulation tubes; and
a means for connecting the containment tank in fluid communication with a first source of heat transfer fluid to allow a heat transfer fluid to flow through a heat transfer fluid space to exchange heat with the phase change material;

wherein the latent heat storage device has a first resistance ratio of less than about 0.1 and a second resistance ratio of less than about 0.1;

wherein the first resistance ratio is defined by the equation:

$$\frac{R_t}{R_c} = \frac{\pi^3}{72(2\sqrt{3}-\pi)} \frac{(r_o+r_i)/2}{(r_o-r_i)} \frac{Nu\, k_f}{k_t}$$

wherein the second resistance ratio is defined by the equation:

$$\frac{R_t}{R_p} = \frac{\pi^2}{18} \frac{(r_o+r_i)/2}{(r_0-r_i)} \frac{k_p}{k_t}$$

wherein:

$R_t$ is the resistance of conduction around the encapsulation tube [° K/W];

$R_c$ is the resistance of convection between the heat transfer fluid (HTF) and the encapsulation tube [° K/W];

$R_p$ is the resistance of conduction between the PCM and the encapsulation tube [° K/W];

$r_o$ is the outside radius of the encapsulation tube [m];

$r_i$ is the inside radius of the encapsulation tubing [m];

$k_f$ is the conductivity of the heat transfer fluid [W/(m·° K)];

$k_p$ is the conductivity of the phase change material (PCM) [W/(m·° K)];

$k_t$ is the conductivity of the encapsulation tube material [W/(m·° K)]; and

Nu is the Nusselt number.

BRIEF DESCRIPTION OF THE DRAWINGS

The accompanying figures, which are incorporated in and constitute a part of this specification, illustrate several aspects described below.

DETAILED DESCRIPTION

Figure 1:
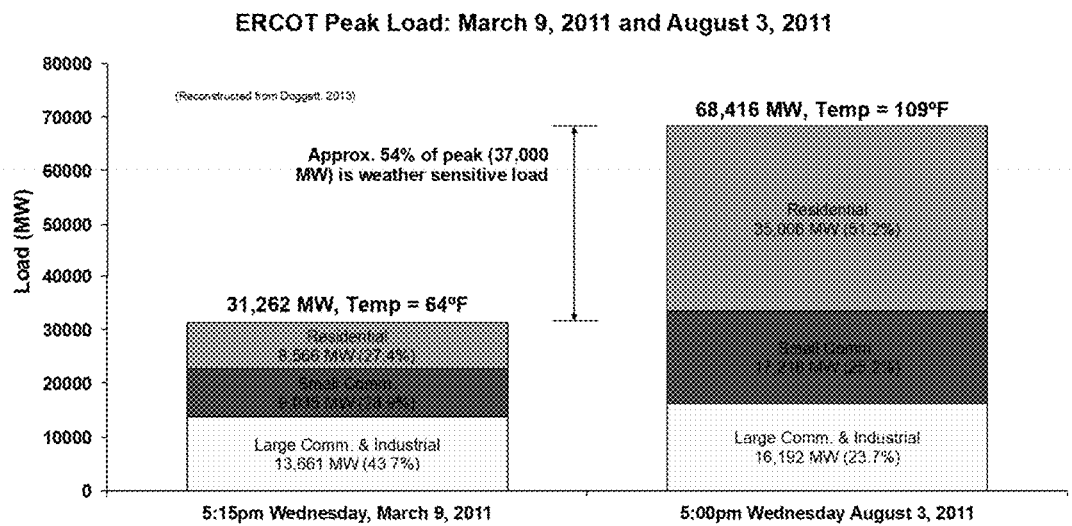
FIG. 1. Extrapolated impact of weather on peak electricity loads in Texas. Note that the increase in peak power use due to weather-sensitive load is primarily due to an increase in energy use by residential customers.

The materials, compounds, compositions, devices, and methods described herein may be understood more readily by reference to the following detailed description of specific aspects of the disclosed subject matter and the Examples included therein.

Before the present materials, compounds, compositions, devices, and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

High-Density Latent Heat Storage Devices

Disclosed herein are high-density, compact latent heat storage devices and uses thereof. These high density compact thermal storage units are comprised of cylindrical encapsulation tubes which are: i) arrayed in a hexagonal-packed pattern; ii) contain a phase change material; and iii) are made of a sufficiently conductive material (for example, copper, aluminum, thermally-enhanced polymers, etc.). These high-density compact thermal storage units are suitable for use, for example, in small to medium residential or commercial applications that utilize, or can be retrofitted to use, chilled water cooling coils. The results show that such a design unexpectedly increases thermal capacity over 3 to 7 times over that of a conventional chilled water tank. The system can have a reversible flow direction, depending on the charge or discharge cycle.

In one aspect, provided herein is a latent heat storage device comprising:
a containment tank;
a plurality of cylindrical encapsulation tubes having a hollow interior, wherein the cylindrical encapsulation tubes are arrayed in a hexagonal-packed pattern, are comprised of a sufficiently conductive material, and are contained within the containment tank;
a phase change material, contained within the hollow interior of the cylindrical encapsulation tubes; and
a means for connecting the containment tank in fluid communication with a first source of heat transfer fluid to allow a heat transfer fluid to flow through a heat transfer fluid space to exchange heat with the phase change material;
wherein the latent heat storage device has a first resistance ratio of less than about 0.1, wherein the first resistance ratio is defined by the equation:

$$\frac{R_t}{R_c} = \frac{\pi^3}{72(2\sqrt{3}-\pi)} \frac{(r_o+r_i)/2}{(r_o-r_i)} \frac{Nu\, k_f}{k_t}$$

wherein:
$R_t$ is the resistance of conduction around the encapsulation tube [° K/W];
$R_c$ is the resistance of convection between the heat transfer fluid (HTF) and the encapsulation tube [° K/W];
$r_o$ is the outside radius of the encapsulation tube [m];
$r_i$ is the inside radius of the encapsulation tubing [m];
$k_f$ is the conductivity of the heat transfer fluid [W/(m·° K)];
$k_t$ is the conductivity of the encapsulation tube material [W/(m·° K)]; and
Nu is the Nusselt number.

In one aspect, provided herein is a latent heat storage device comprising:
a containment tank;
a plurality of cylindrical encapsulation tubes having a hollow interior, wherein the cylindrical encapsulation tubes are arrayed in a hexagonal-packed pattern, are comprised of a sufficiently conductive material, and are contained within the containment tank;
a phase change material, contained within the hollow interior of the cylindrical encapsulation tubes; and
a means for connecting the containment tank in fluid communication with a first source of heat transfer fluid to allow a heat transfer fluid to flow through a heat transfer fluid space to exchange heat with the phase change material;
wherein the latent heat storage device has a second resistance ratio of less than about 0.1, wherein the second resistance ratio is defined by the equation:

$$\frac{R_t}{R_p} = \frac{\pi^2}{18} \frac{(r_o+r_i)/2}{(r_0-r_i)} \frac{k_p}{k_t}$$

wherein:
$R_t$ is the resistance of conduction around the encapsulation tube [° K/W];
$R_p$ is the resistance of conduction between the PCM and the encapsulation tube [° K/W];
$r_o$ is the outside radius of the encapsulation tube [m];
$r_i$ is the inside radius of the encapsulation tubing [m];
$k_p$ is the conductivity of the phase change material (PCM) [W/(m·° K)]; and
$k_t$ is the conductivity of the encapsulation tube material [W/(m·° K)].

In one aspect, provided herein is a latent heat storage device comprising:
a containment tank;
a plurality of cylindrical encapsulation tubes having a hollow interior, wherein the cylindrical encapsulation tubes are arrayed in a hexagonal-packed pattern, are comprised of a sufficiently conductive material, and are contained within the containment tank;
a phase change material, contained within the hollow interior of the cylindrical encapsulation tubes; and
a means for connecting the containment tank in fluid communication with a first source of heat transfer fluid to allow a heat transfer fluid to flow through a heat transfer fluid space to exchange heat with the phase change material;

wherein the latent heat storage device has a first resistance ratio of less than about 0.1 and a second resistance ratio of less than about 0.1;

wherein the first resistance ratio is defined by the equation:

$$\frac{R_t}{R_c} = \frac{\pi^3}{72(2\sqrt{3}-\pi)}\frac{(r_o+r_i)/2}{(r_o-r_i)}\frac{Nu\ k_f}{k_t}$$

wherein the second resistance ratio is defined by the equation:

$$\frac{R_t}{R_p} = \frac{\pi^2}{18}\frac{(r_o+r_i)/2}{(r_0-r_i)}\frac{k_p}{k_t}$$

wherein:

$R_t$ is the resistance of conduction around the encapsulation tube [° K/W];
$R_c$ is the resistance of convection between the heat transfer fluid (HTF) and the encapsulation tube [° K/W];
$R_p$ is the resistance of conduction between the PCM and the encapsulation tube [° K/W];
$r_o$ is the outside radius of the encapsulation tube [m];
$r_i$ is the inside radius of the encapsulation tubing [m];
$k_f$ is the conductivity of the heat transfer fluid [W/(m·° K)];
$k_p$ is the conductivity of the phase change material (PCM) [W/(m·° K)];
$k_t$ is the conductivity of the encapsulation tube material [W/(m·° K)]; and
Nu is the Nusselt number.

In some embodiments, the sufficiently conductive tubes are comprised of a metal. In some embodiments, the sufficiently conductive tubes are comprised of copper. In some embodiments, the sufficiently conductive tubes are comprised of aluminum. In some embodiments, the sufficiently conductive tubes are comprised of a thermally enhanced polymer.

In some embodiments, the phase change material can be chosen based on its thermal properties. That is, the phase change material can be a material with sufficient thermal properties for the intended operating temperature range. In some embodiments, the phase change material has a phase change temperature in a range from −20° C. to 100° C., e.g., from −10° C. to 100° C., from −5° C. to 100° C., from 0° C. to 100° C., from 5° C. to 100° C., from 10° C. to 100° C., from 15° C. to 100° C., from 20° C. to 100° C., from 25° C. to 100° C., from 30° C. to 100° C., from 35° C. to 100° C., from 40° C. to 100° C., from −20° C. to 50° C., −10° C. to 50° C., from −5° C. to 50° C., from 0° C. to 50° C., from 5° C. to 50° C., from 10° C. to 50° C., from 15° C. to 50° C., from 20° C. to 50° C., from 25° C. to 50° C., from 30° C. to 50° C., or from 35° C. to 50° C. In some embodiments, the phase change material is selected from water (ice), a salt hydrate, a fatty acids, or a paraffin hydrocarbon. In some embodiments, the phase change material is a paraffin hydrocarbon. In some embodiments, the phase change material comprises tetradecane. In some embodiments, the phase change material comprises at least 99% tetradecane.

In some embodiments, the heat transfer fluid can be chosen based on its thermal properties. That is, the heat transfer fluid can be a material with sufficient thermal properties for the intended operating temperature range. In some embodiments, the heat transfer fluid comprises an aqueous solution of ethylene glycol, propylene glycol, glycerol, or combinations thereof. In some embodiments, the heat transfer fluid comprises an aqueous solution containing about 35% by volume propylene glycol.

In some embodiments, the latent heat storage device has a first resistance ratio of less than 0.2. In some embodiments, the latent heat storage device has a first resistance ratio of less than 0.1. In some embodiments, the latent heat storage device has a first resistance ratio of less than 0.08. In some embodiments, the latent heat storage device has a first resistance ratio of less than 0.05. In some embodiments, the latent heat storage device has a first resistance ratio of less than 0.01. In some embodiments, the latent heat storage device has a first resistance ratio of less than 0.005.

In some embodiments, the latent heat storage device has a second resistance ratio of less than 0.2. In some embodiments, the latent heat storage device has a second resistance ratio of less than 0.1. In some embodiments, the latent heat storage device has a second resistance ratio of less than 0.08. In some embodiments, the latent heat storage device has a second resistance ratio of less than 0.05. In some embodiments, the latent heat storage device has a second resistance ratio of less than 0.01. In some embodiments, the latent heat storage device has a second resistance ratio of less than 0.005.

In some embodiments, the latent heat storage device has a first resistance ratio of less than about 0.2. In some embodiments, the latent heat storage device has a first resistance ratio of less than about 0.1. In some embodiments, the latent heat storage device has a first resistance ratio of less than about 0.08. In some embodiments, the latent heat storage device has a first resistance ratio of less than about 0.05. In some embodiments, the latent heat storage device has a first resistance ratio of less than about 0.01. In some embodiments, the latent heat storage device has a first resistance ratio of less than about 0.005.

In some embodiments, the latent heat storage device has a second resistance ratio of less than about 0.2. In some embodiments, the latent heat storage device has a second resistance ratio of less than about 0.1. In some embodiments, the latent heat storage device has a second resistance ratio of less than about 0.08. In some embodiments, the latent heat storage device has a second resistance ratio of less than about 0.05. In some embodiments, the latent heat storage device has a second resistance ratio of less than about 0.01. In some embodiments, the latent heat storage device has a second resistance ratio of less than about 0.005.

The terms "about" and "approximately" are defined as being "close to" as understood by one of ordinary skill in the art. In one non-limiting embodiment the terms are defined to be within 10%. In another non-limiting embodiment, the terms are defined to be within 5%. In still another non-limiting embodiment, the terms are defined to be within 1%.

In one aspect, provided herein is a latent heat storage device comprising:

a containment tank;
a plurality of cylindrical encapsulation tubes having a hollow interior, wherein the cylindrical encapsulation tubes are arrayed in a hexagonal-packed pattern, are comprised of a sufficiently conductive material, and are contained within the containment tank;
a phase change material, contained within the hollow interior of the cylindrical encapsulation tubes; and
a means for connecting the containment tank in fluid communication with a first source of heat transfer fluid to allow a heat transfer fluid to flow through a heat transfer fluid space to exchange heat with the phase change material;

wherein the latent heat storage device has a first resistance ratio of less than 0.1, wherein the first resistance ratio is defined by the equation:

$$\frac{R_t}{R_c} = \frac{\pi^3}{72(2\sqrt{3} - \pi)} \frac{(r_o + r_i)/2}{(r_o - r_i)} \frac{Nu \; k_f}{k_t}$$

wherein:
$R_t$ is the resistance of conduction around the encapsulation tube over length $L_t$ [° K/W];
$R_c$ is the resistance of convection between the HTF and the encapsulation tube [° K/W];
$r_o$ is the outside radius of the encapsulation tube [m];
$r_i$ is the inside radius of the encapsulation tubing [m];
$k_f$ is the conductivity of the heat transfer fluid [W/(m·° K)];
$k_t$ is the conductivity of the encapsulation tube material [W/(m·° K)]; and
Nu is the Nusselt number.

In one aspect of the invention, provided herein is a latent heat storage device comprising:
a containment tank;
a plurality of cylindrical encapsulation tubes having a hollow interior, wherein the cylindrical encapsulation tubes are arrayed in a hexagonal-packed pattern, are comprised of a sufficiently conductive material, and are contained within the containment tank;
a phase change material, contained within the hollow interior of the cylindrical encapsulation tubes; and
a means for connecting the containment tank in fluid communication with a first source of heat transfer fluid to allow a heat transfer fluid to flow through a heat transfer fluid space to exchange heat with the phase change material;
wherein the latent heat storage device has a second resistance ratio of less than 0.1, wherein the second resistance ratio is defined by the equation:

$$\frac{R_t}{R_p} = \frac{\pi^2}{18} \frac{(r_o + r_i)/2}{(r_0 - r_i)} \frac{k_p}{k_t}$$

wherein:
$R_t$ is the resistance of conduction around the encapsulation tube over length $L_t$ [° K/W];
$R_p$ is the resistance of conduction between the PCM and the encapsulation tube [° K/W];
$r_o$ is the outside radius of the encapsulation tube [m];
$r_i$ is the inside radius of the encapsulation tubing [m];
$k_p$ is the conductivity of the phase change material (PCM) [W/(m·° K)]; and
$k_t$ is the conductivity of the encapsulation tube material [W/(m·° K)].

In one aspect of the invention, provided herein is a latent heat storage device comprising:
a containment tank;
a plurality of cylindrical encapsulation tubes having a hollow interior, wherein the cylindrical encapsulation tubes are arrayed in a hexagonal-packed pattern, are comprised of a sufficiently conductive material, and are contained within the containment tank;
a phase change material, contained within the hollow interior of the cylindrical encapsulation tubes; and
a means for connecting the containment tank in fluid communication with a first source of heat transfer fluid to allow a heat transfer fluid to flow through a heat transfer fluid space to exchange heat with the phase change material;
wherein the latent heat storage device has a first resistance ratio of less than 0.1 and a second resistance ratio of less than 0.1;
wherein the first resistance ratio is defined by the equation:

$$\frac{R_t}{R_c} = \frac{\pi^3}{72(2\sqrt{3} - \pi)} \frac{(r_o + r_i)/2}{(r_o - r_i)} \frac{Nu \; k_f}{k_t}$$

wherein the second resistance ratio is defined by the equation:

$$\frac{R_t}{R_p} = \frac{\pi^2}{18} \frac{(r_o + r_i)/2}{(r_0 - r_i)} \frac{k_p}{k_t}$$

wherein:
$R_t$ is the resistance of conduction around the encapsulation tube over length $L_t$ [° K/W];
$R_c$ is the resistance of convection between the HTF and the encapsulation tube [° K/W];
$R_p$ is the resistance of conduction between the PCM and the encapsulation tube [° K/W];
$r_o$ is the outside radius of the encapsulation tube [m];
$r_i$ is the inside radius of the encapsulation tubing [m];
$k_f$ is the conductivity of the heat transfer fluid [W/(m·° K)];
$k_p$ is the conductivity of the phase change material (PCM) [W/(m·° K)];
$k_t$ is the conductivity of the encapsulation tube material [W/(m·° K)]; and
Nu is the Nusselt number.

Phase Change Materials (PCMs)

Many materials can be used for latent thermal energy storage. These materials are collectively known as PCMs, or phase change materials. Typical PCMs suitable for use in environmental control thermal storage applications are generally restricted to liquid-solid phase changes for volumetric efficiency and ease of use. For environmental space cooling applications, phase change temperatures should operate in the range of from 5 to 12° C. In some embodiments, potential cooling-mode PCMs include water (ice), salt hydrates, fatty acids, and/or paraffin hydrocarbons. For environment space heating applications, phase change temperatures should operate in the range of from 30 to 50° C. (but can go higher for specific applications) and use a suitable PCM.

Water as ice has successfully been used for years as a phase change thermal storage medium (i.e., the "icebox" from years past). However, water expands when frozen making containment difficult during phase cycling. In addition, water freezes at a temperature significantly lower than the 5-12° C. typically used for HVAC systems, requiring a separate chiller system for ice-based thermal storage and increasing overall HVAC system installation and operation costs. Salt hydrates are caustic, tend to need subcooling (a requirement that they be cooled below their freezing point before crystallization is initiated), and suffer from phase segregation over repeated freeze-thaw cycles that limit their useful lifespan. Paraffins and fatty acid hydrocarbons offer relatively high heats of fusions (~200 kJ/kg), chemical stability, no subcooling (self-nucleating), do not degrade with thermal cycling, are available in temperature ranges suitable for HVAC applications, and are compatible with most encapsulation materials. They also tend to have poor thermal conductivity and are somewhat flammable, but these issues can be mitigated by the disclosed thermal system design. The paraffin compound tetradecane shows promise for use in active cold thermal storage systems, as it has a phase change temperature suitable for environmental cooling use of between approximately 5.5 and 5.8° C. and a heat of fusion of approximately 215 kJ/kg.

n-Paraffin (hereafter paraffin) waxes consisting of one or more compounds of the generic form $CH_3$—$(CH_2)_n$—$CH_3$ have been heavily investigated for their use as PCMs (phase change materials) in thermal storage systems. Studies have shown that paraffin-based PCMs with the needed properties of melting temperature and heat of fusion can be crafted using paraffin with hydrocarbon chains of particular length, or through the use of mixtures of such paraffin. These paraffin compounds are congruent through their melt-freeze cycles, chemically stable, compatible with available low-cost encapsulation materials, non-toxic, possess high heats of fusion, and are available in suitable temperature ranges for use in cold storage systems. Paraffins do suffer from poor thermal conductivity (approximately 0.2 W/(m·K), however, encapsulation dimensions can be adjusted or internal thermal conduction enhancements used when necessary to improve thermal performance. Such paraffins can be used to construct high-density thermal storage system for environmental cooling applications.

In one embodiment, the phase change material is tetradecane.

The melting of paraffins occurs over a range of temperature. Thermal testing is performed on the PCM using a water bath protocol to determine the freeze and melt temperature range of the tetradecane PCM. A 20 ml sample of PCM is placed in a section of clear ½" schedule 40 PVC pipe, and a thermistor installed in the approximate center of the sample. The temperature reading of the thermistor is monitored as the PCM sample freezes and melts while in a temperature-controlled water bath. The freezing temperature range is found using a water bath temperature of 2° C., and the melting temperature range using a water bath temperature of 9° C. A picture of an example of a water bath apparatus is shown as an inset in FIG. 3.

A previous study has demonstrated that latent thermal stores constructed of tube-encapsulated paraffin-based PCMs show improved thermal storage densities over conventional sensible chilled water tanks (Bourne, Stephen, and Atila Novoselac. 2015. "Compact PCM-Based Thermal Stores for Shifting Peak Cooling Loads." *Building Simulation*, December 2015, Volume 8, Issue 6, pp 673-688). Tube encapsulation is selected because it allows for a greater PCM density than spherical encapsulation; cylinders have a maximum packing density of 90.7% versus only 74.0% for spheres. In these experiments CPVC encapsulation tubes containing tetradecane as a PCM are packed into a tank in a pseudo-annular ring configuration, where the tubes are spaced such that each is surrounded by HTF (heat transfer fluid) that flows longitudinally along the vertically oriented encapsulation tubes. This configuration results in two dimensional heat transfer, in the r and z directions, within the encapsulation tubes and PCM. The study found that—when using laminar HTF flow at moderate encapsulation tube densities, where the cross sectional area of the encapsulation tubes equaled approximately half of the cross sectional area of the tank—this configuration allowed for approximately 80% of thermal store capacity to be recovered over a two hour period at an output temperature of <6.5°. This performance level is acceptable for reducing peak cooling loads, which typically occur over a 2 to 6 hour period.

However, as the packing density of the CPVC PCM encapsulation tubes reaches their maximum and the tubes assume a hexagonal-packed configuration, the annular flow path is reduced to six shared roughly triangular-shaped flow paths around each tube. While Nusselt number correlations exist for triangular pipe flow, these are average values; the convective heat transfer is not the same everywhere along the surface of the tubes due to the restricted fluid flow near the apexes of each triangular flow path. This causes the HTF flow to be unevenly distributed around each encapsulation tube, resulting in uneven thermal energy distribution to and into the encapsulation tubes. This forces the encapsulation tube material and PCM to redistribute the thermal energy around and into the PCM. Both the CPVC and PCM used by Bourne and Novoselac (Bourne, Stephen, and Atila Novoselac. 2015. "Compact PCM-Based Thermal Stores for Shifting Peak Cooling Loads." *Building Simulation*, December 2015, Volume 8, Issue 6, pp 673-688) have poor thermal conductivity, resulting in unacceptable thermal performance for the hexagonal packed configuration.

A PCM is a substance with a high heat of fusion which, melting and solidifying at a certain temperature, is capable of storing and releasing large amounts of energy. Heat is absorbed or released when the material changes from solid to liquid and vice versa. For example, the PCM can be water, a salt-water solution, a sugar alcohol, a paraffin, a fatty acid, a salt hydrate, a nitrate, a hydroxide, a hygroscopic material, or combinations thereof. More specifically, the PCM can be erythritol; xylitol; mannitol; galactitol; a blend of galactitol and mannitol; urea; ureidopyrimidone; N,N-dialkylpiperidinum; N,N-dialkylpyrrolidinium; LiF and $BeF_2$; NaF and $BeF_2$; LiF and NaF and KF; NaF and $ZrF_4$; $KNO_3$ and KCl; $KNO_3$ and $K_2CO_3$; LiBr and KBr; $KNO_3$ and KBr; $KNO_3$ and LiOH; $FeCl_2$ and KCl; KCl and LiCl; $K_2CO_3$ and KOH; $K_2SO_4$ and KOH; $FeCl_2$ and NaCl; KCl and $MnCl_2$; LiBr and LiI; KCl—$MgCl_2$; $MnCl_2$ and NaCl; $LiCO_3$ and LiOH; LiBr and LiF; NaCl and $MgCl_2$; $K_2CO_3$ and $MgCO_3$; KF and $KBF_4$; $Na_2SO_4$ and $ZnSO_4$; $CaCl_2$) and LiCl; LiCl and $Li_2SO_4$; KF and LiF; $K_2CO_3$ and $Li_2CO_3$; $Li_2CO_3$ and $Na_2CO_3$; LiCl and LiF; $CaCl_2$ and NaCl; $KVO_3$ and $BaTiO_3$; KCl and LiBr and NaBr; KBr and LiCl and NaCl; LiBr and NaBr and KBr; NaOH and NaCl and $Na_2CO_3$; KCl and LiCl and $Li_2SO_4$; $MgCl_2$ and KCl and NaCl; NaCl and KCl and $FeCl_2$; KCl and LiCl and $CaF_2$; $CaCl_2$) and KCl and LiCl; NaCl and KCl and LiCl; KF and $AlF_3$ and $ZrF_4$; $MnCl_2$ and KCl and NaCl; $Na_2SO_4$ and $K_2SO_4$ and $ZnSO_4$; $Na_2CO_3$ and $K_2CO_3$ and $ZnSO_4$; $Na_2CO_3$ and $K_2CO_3$ and $LiCO_3$; KCl and NaCl and LiF; LiCl and NaCl and $Li_2SO_4$; LiCl and KCl and $CaCl_2$) and $CaF_2$; KCl and NaCl and LiCl and $Li_2SO_4$; $NaNO_3$; $KNO_3$; $KNO_3$ and KCl; $KNO_3$ and $K_2CO_3$; $KNO_3$ and KBr; $FeCl_2$ and KCl; KCl and LiCl; $K_2CO_3$ and KOH; $K_2SO_4$ and KOH; $FeCl_2$ and NaCl; LiBr and KBr; NaOH and NaCl and $Na_2CO_3$; $MgCl_2$ and KCl and NaCl; NaCl and KCl and $FeCl_2$; $CaCl_2$) and KCl and LiCl; $MgCl_2$ and KCl and NaCl; $MgCl_2$ and KCl and NaCl; NaOH and NaCl and $Na_2CO_3$; $MnCl_2$ and KCl and NaCl; $Na_2CO2$ and $K_2CO_3$ and $Li_2CO_3$; LiF and LiCl and $LiVO_3$ and $Li_2SO_4$ and $Li_2MoO_4$; LiF and LiCl and $Li_2SO_4$ and $Li_2MoO_4$; LiF and KF and $KCO_4$ and KCl; LiF and LiOH; LiF and $BaF_2$ and KF and NaF; LiF and KF and NaF and KCl; LiF and NaF and KF and $MgF_2$; LiF and NaF and KF; LiF and KF and NaF; LiF and NaF and KF; LiF and LiCl; KF and LiCl; KF and LiCl; LiF and KF; LiF and $LiVO_3$ and $Li_2MoO_4$; LiCl and KCl and $LiCO_3$ and LiF; LiCl and KCl; KCl and $MnCl_2$ and NaCl; LiClLiVO$_3$ and $Li_2MoO_4$ and $Li_2SO_4$ and LiF;

NaCl and KCl and MgCl$_2$; KCl and MgCl$_2$ and NaCl; NaCl and MgCl$_2$; KCl and ZnCl$_2$; KCl and MgCl$_2$; NaCl=MgCl$_2$; LiCl and Li$_2$SO$_4$ and Li$_2$MoO$_4$; KCl and MnCl$_2$; LiCl and Li$_2$SO$_4$ and LiVO$_3$; KCl and MnCl$_2$; NaCl and MgCl$_2$; CaCl$_2$) and KCl and NaCl and NaF; CaCl$_2$) and KCl and MgCl$_2$ and NaCl; CaCl$_2$ and KCl and NaCl; KCl and MgCl$_2$; LiCl and LiF and MgF$_2$; CaCl$_2$ and CaF$_2$ and NaF; CaCl$_2$) and NaCl; NaOH and NaCl and Na$_2$CO$_3$; LiOH and LiF; Li$_2$CO$_3$ and K$_2$CO$_3$ and Na$_2$CO$_3$; Li$_2$CO$_3$ and K$_2$CO$_3$; Li$_2$CO$_3$ and K$_2$CO$_3$; Zn and Mg; Al and Mg and Zn; Mg and Cu and Zn; Mg and Cu and Ca; Mg and Al; formic acid; caprilic acid; glycerin; D-Lactic acid; methyl palmitate; camphenilone; docasyl bromide; caprylone; phenol; heptadecanone; 1-cyclohexylooctadecane; 4-heptadacanone; p-joluidine; cyanamide; methyl eicosanate; 3-heptadecanone; 2-heptadecanone; hydrocinnamic acid; cetyl alcohol; α-nepthylamine; camphene; O-nitroaniline; 9-heptadecanone; thymol; sodium acetate; trimethylolethane; methylbehenate; diphenyl amine; p-dichlorobenzene; oxalate; hypophosphoric acid; O-xylene dichloride; β-chloroacetic acid; nitro naphthalene; trimyristin; heptaudecanoic acid; α-chloroacetic acid; bee wax; bees wax; glycolic acid; glyolic acid; p-bromophenol; azobenzene; acrylic acid; dinto toluent; phenylacetic acid; thiosinamine; bromcamphor; durene; benzylamine; methyl bromobenzoate; alpha napthol; glautaric acid; p-xylene dichloride; catechol; quinine; acetanilide; succinic anhydride; benzoic acid; stibene; benzamide; acetic acid; polyethylene glycol; capric acid; eladic acid; lauric acid; pentadecanoic acid; trusteric; myristic acid; palmatic acid; stearic acid; acetamide; methyl fumarate; K$_2$HPO$_4$.6H$_2$O; FeBr$_3$.6H$_2$O; Mn(NO$_3$)$_2$.6H$_2$O; FeBr$_3$.6H$_2$O; CaCl$_2$.12H$_2$O; LiNO$_3$.2H$_2$O; LiNO$_3$.3H$_2$O; Na$_2$CO$_3$.10H$_2$O; Na$_2$SO$_4$.10H$_2$O; KFe(SO$_4$)$_2$.12H$_2$O; CaBr$_2$.6H$_2$O; LiBr$_2$.2H$_2$O; Zn(NO$_3$)$_2$.6H$_2$O; FeCl$_3$.6H$_2$O; Mn(NO$_3$)$_2$.4H$_2$O; Na$_2$HPO$_4$.12H$_2$O; CoSO$_4$.7H$_2$O; KF.2H$_2$O; MgI$_2$.8H$_2$O; CaI$_2$.6H$_2$O; K$_2$HPO$_4$.7H$_2$O; Zn(NO$_3$)$_2$.4H$_2$O; Mg(NO$_3$).4H$_2$O; Ca(NO$_3$).4H$_2$O; Fe(NO$_3$)$_3$.9H$_2$O; Na$_2$SiO$_3$.4H$_2$O; K$_2$HPO$_4$.3H$_2$O; Na$_2$S$_2$O$_3$.5H$_2$O; MgSO$_4$.7H$_2$O; Ca(NO$_3$)$_2$.3H$_2$O; Zn(NO$_3$)$_2$.2H$_2$O; FeCl$_3$.2H$_2$O; Ni(NO$_3$)$_2$.6H$_2$O; MnCl$_2$.4H$_2$O; MgCl$_2$.4H$_2$O; CH$_3$COONa.3H$_2$O; Fe(NO$_3$)$_2$.6H$_2$O; NaAl(SO$_4$)$_2$.10H$_2$O; NaOH.H$_2$O; Na$_3$PO$_4$.12H$_2$O; LiCH$_3$COO.2H$_2$O; Al(NO$_3$)$_2$.9H$_2$O; Ba(OH)$_2$.8H$_2$O; Mg(NO$_3$)$_2$.6H$_2$O; KAl(SO$_4$)$_2$.12H$_2$O; MgCl$_2$.6H$_2$O; gallium-gallium antimony eutectic; gallium; cerrolow eutectic; Bi—Cd—In eutectic; cerrobend eutectic; Bi—Pb—In eutectic; Bi—In eutectic; Bi—Pb-tin eutectic; Bi—Pb eutectic; CaCl$_2$.6H$_2$O and CaBr$_2$.6H$_2$O; Triethylolethane and water and urea; C$_{14}$H$_{28}$O$_2$ and C$_{10}$H$_{20}$O$_2$; CaCl$_2$ and MgCl$_2$.6H$_2$O; CH$_3$CONH$_2$ and NH$_2$CONH$_2$; Triethylolethane and urea; Ca(NO$_3$).4H$_2$O and Mg(NO$_3$)$_3$.6H$_2$O; CH$_3$COONa.3H$_2$O and NH$_2$CONH$_2$; NH$_2$CONH$_2$ and NH$_4$NO$_3$; Mg(NO$_3$)$_3$.6H$_2$O and NH$_4$NO$_3$; Mg(NO$_3$)$_3$.6H$_2$O and MgCl$_2$.6H$_2$O; Mg(NO$_3$)$_3$.6H$_2$O and MgCl$_2$.6H$_2$O; Mg(NO$_3$)$_3$.6H$_2$O and Al(NO$_3$)$_2$.9H$_2$O; CH$_3$CONH$_2$ and C$_{17}$H$_{35}$COOH; Mg(NO$_3$)$_2$.6H$_2$O and MgBr$_2$.6H$_2$O; Napthalene and benzoic acid; NH$_2$CONH$_2$ and NH$_4$Br; LiNO$_3$ and NH$_4$NO$_3$ and NaNO$_3$; LiNO$_3$ and NH$_4$NO$_3$ and KNO$_3$; LiNO$_3$ and NH$_4$NO$_3$ and NH$_4$Cl; or combinations thereof.

The disclosed PCM compositions can optionally comprise one or more viscosity modifiers. For example, the viscosity modifier in the disclosed composition can be glycerol, erythritol, threitol, arabitol, xylitol, ribitol, sorbitol, dulcitol, iditol, isomalt, maltitol, or lactitol. In other examples, a suitable viscosity modifier in the disclosed compositions can be a diisocyanate, such as methylene diphenyl diisocyanate (MDI), toluene diisocyanate (TDI), naphthalene diisocyanate (NDI), isophorone diisocyanate (IPDI), and/or hexamethylene diisocyanate (HDI).

The disclosed PCM compositions can optionally comprise one or more additives. One type of additive that can be included in the disclosed compositions is an antimicrobial. Because the disclosed compositions contain sugar alcohols, microbial growth can be a concern in certain situations. Thus, any antimicrobial material that can prevent or reduce microbial growth in the disclosed compositions can be used. Examples of suitable antimicrobial materials include metals such as copper, zinc, or silver and/or salts thereof. Further examples of suitable antimicrobial materials include natural and synthetic organic compositions such as β-lactam antibiotics like penicillin or cephalosporin, and protein synthesis inhibitors like neomycin. Antimicrobial materials such as lactic acid, acetic acid, or citric acid can also be used. In some other examples, an antimicrobial material can comprise a quarternary ammonium compound such as benzalkonium chloride, benzethonium chloride, methylbenzethonium chloride, cetylalkonium chloride, cetylpyridinium chloride, cetrimonium, cetrimide, dofanium chloride, tetraethylammonium bromide, didecyldimethylammonium chloride, and domiphen bromide. The antimicrobials can be used in effective amounts, e.g., an amount that will prevent or reduce microbial growth while not substantially affecting the latent heat and melting point of the blend.

Another suitable additive that can be included in the disclosed PCM compositions is a fire retardant. Suitable fire retardants can comprise an organic composition or an inorganic composition. In some examples, a suitable fire retardant such as tris(2-chloro-1-(chloromethyl)ethyl)phosphate, aluminum hydroxide, magnesium hydroxide. In some embodiments, a fire retardant can comprise a zeolite. The fire retardants can be used in effective amounts, e.g., an amount that will prevent or reduce combustion while not substantially affecting the latent heat and melting point of the blend.

Still further, the disclosed PCM compositions can optionally comprise agents to prevent supercooling. Suitable examples of such agents include sparingly soluble inorganic salts such as calcium sulfate, calcium pyrophosphate silver iodide.

The disclosed PCM compositions can optionally comprise a thickener such as water insoluble super adsorbent polymer (acrylic acid copolymer) carboxymethyl cellulose, cationic guar gum, or fumed silica.

The disclosed PCM compositions can optionally comprise an antioxidant such as amine or hydroxyamines, or phenols.

The disclosed PCM compositions can optionally comprise a corrosion inhibitor such as sodium sulfite, chromates, and polyphosphates.

Heat Transfer Fluid (HTF)

A heat transfer fluid (HTF) can be flowed through the device. For example, the heat transfer fluid can be water, or an antifreeze/water mixture (e.g., an engine coolant).

Examples of suitable antifreeze/water mixtures include aqueous solutions of ethylene glycol, propylene glycol, and/or glycerol.

In one embodiment, the HTF (heat transfer fluid) is a mix of distilled water containing 35% by volume propylene glycol. The pertinent properties of the 35% by volume propylene glycol HTF, evaluated at the mean thermal store operating temperature of 6.5° C., are shown in Table 4 (See Example 2).

The discharge cycle flow rates can be selected such that the thermal store can be discharged over a two to six hour period while maintaining a useable output temperature for as much of the discharge cycle as possible. A useable discharge temperature for chilled water HVAC applications is <6.5° C., though other applications can require different discharge temperatures. Charge cycle flow rates can be set at the maximum flow tested for the discharge cycle. HTF flow rates tested can be constant during each test, but vary between runs at between 100 mL/min and 300 mL/min in 50 mL/min increments; charge cycles are all at 300 mL/min.

In one embodiment, the Reynolds number for these flows, using this tank configuration, HTF, and a characteristic length based on the hydraulic radius of the flow paths, is on the order of one. This means that a laminar flow regime is maintained throughout the tests. While higher flow rates would produce turbulent flow, the required flow velocity through the tank would be at least 3 orders of magnitude greater than during these tests. This would result in a higher heat transfer rate, but would also result in little change to the temperature of the HTF as it passes through the store. Since an express purpose of the thermal store is to change the temperature of the HTF as it passes through the store, the flow rate must be restricted to flows such that the HTF residence time is high enough to affect the HTF temperature. Note that due to the small hydraulic diameter of the flow paths (~0.21 times the encapsulation tube radius), the heat transfer rates are high enough for the intended purpose, even with laminar flow.

Encapsulation Tubes

In some embodiments, provided herein are cylindrical encapsulation tubes having a hollow interior, wherein the cylindrical encapsulation tubes are arrayed in a hexagonal-packed pattern, are comprised of a sufficiently conductive material, and are contained within the containment tank.

Figure 18:
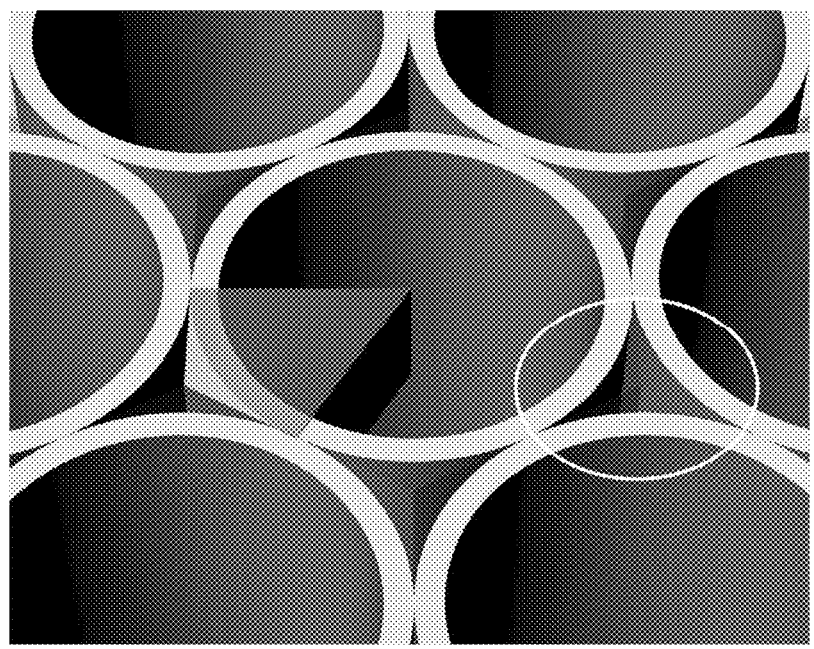
FIG. 18. The hexagonal packed tube configuration and the resulting triangular-like flow paths (example circled). The partial segment shown in the center tube represents a numeric modeling element whose external vertical interfaces are adiabatic boundaries; this element forms part of the basis for the modified Biot number.

In some embodiments, the encapsulation tubes are arrayed in a hexagonal-packed pattern (See, for example, FIG. 18). In this arrangement, the encapsulation tubes are packed in tightly together, such that each interior tube should come into contact with six tubes surrounding each interior tube at approximately every 60 degrees.

In some embodiment, the encapsulation tubes are comprised of a material of high thermal conductivity, for example, copper, steel, nickel, aluminum, thermally-enhanced polymers, or a combination thereof. In some embodiments, the encapsulation tubes are comprised of carbon or graphite or composites using these materials as thermal enhancements.

In some embodiments, the encapsulation tubes are comprised of copper. In some embodiments, the encapsulation tubes are comprised of aluminum. In some embodiments, the encapsulation tubes are comprised of a thermally enhanced polymer.

Although aluminum has less heat conductivity than copper, it does not corrode in certain heat storage media, particularly when the medium is chemically maintained moderately basic. In addition, aluminum has the benefit of a lower cost, and thus can decrease the cost of the device.

In some embodiments, the encapsulation tubes are individual tubes and are capped at each end. In additional embodiments, the tubes may be folded back on each other, but still arranged such that a cross-section of the encapsulation tubes would still reveal a hexagonal packed pattern.

In one embodiment, each tube has an air space to allow the PCM contained within the hollow interior of the tube to expand and contract. In addition, the PCM tubes may be internally pressurized to reduce cycling fatigue and to ensure a positive pressure within the tubes throughout the thermal cycle.

In some embodiments, the device comprises a means for connecting the containment tank in fluid communication with a first source of heat transfer fluid to allow a heat transfer fluid to flow through a heat transfer fluid space to exchange heat with the phase change material.

In some embodiments, the device further comprises an inlet port and an outlet port for transferring a heat transfer fluid through a heat transfer fluid space to exchange heat with the phase change material.

In some embodiments, the device further comprises an inlet port and an outlet port for transferring a heat transfer fluid through a heat transfer fluid space to exchange heat with the phase change material.

Further, the heat transfer fluid flow through the tank may be reversed for different modes (charge/discharge) to optimize thermal cycling performance and maintain a constant direction of the tank temperature gradient.

Applications and Methods

Commercial and residential environmental cooling loads account for 11% of all U.S. electric consumption, and can be a much larger share of seasonal peak electric demand—particularly in regions with warmer climates. The demand for residential and commercial cooling is expected to increase due to a projected growth in residential and commercial floor space, and to a shift in population towards states with warmer climates.

Disclosed herein is the development of a simple, compact, high density thermal storage device suitable for use in small to medium residential or commercial applications that utilize, or can be retrofitted to use, chilled water cooling coils.

In some examples, the high density thermal storage device describe herein can be used in thermal exchange devices and/or thermal storage devices. In some examples, the thermal exchange/storage devices using the high density thermal storage device described herein can be used in applications where the storage of thermal energy is desirable. For example, the thermal storage devices can be used to collect thermal energy for later use (e.g., hours, days or many months later). In this way, the thermal storage devices can be used to improve energy efficiency in a wide variety of applications. For example, the thermal storage/exchange devices described herein can be utilized in conjunction with heating and/or cooling systems (e.g., in conjunction with HVAC systems in vehicles such as cars and airplanes as well as in buildings), in conjunction with solar energy collection and utilization, in conjunction with refrigeration, or in conjunction with industrial processes. The thermal exchange/storage devices described herein can be tailored for use in particular applications (e.g., for operation in various ranges of powers/energies) by adjusting the materials incorporated in the thermal storage device to provide a thermal storage device configured to operate in conjunction with different temperature regimes (e.g. by choosing a suitable PCM).

In one embodiment, the device contemplated herein is useful as a thermal battery, for example, for use in vehicles (i.e. electric vehicles). Rechargeable thermal energy storage-based hot-and-cold batteries can provide efficient heating and cooling to electric vehicles without draining the on-board battery packs, in effect extending the driving range of electric vehicles. The disclosed devices can be used in a high-energy density and low-cost thermal storage system that can provide efficient cabin heating and cooling for electric vehicles.

EXAMPLES

The following examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present invention which are apparent to one skilled in the art.

Example 1. Compact Phase Change Material (PCM)-Based Thermal Stores for Shifting Peak Cooling Loads Thermal energy stores, when used as part of a demand management system, can shift peak cooling loads to off-peak hours or to periods when intermittent renewable energy sources are available. This enables more efficient use of baseline and renewable electric capacity, and reduces dependence on less efficient and more costly peak energy power plants. High density thermal stores can be an effective retrofit option for existing buildings and environmental control systems. Disclosed in this example is the development of a simple, compact, high density thermal storage unit suitable for use in small to medium residential or commercial applications that utilize, or can be retrofitted to use, chilled water cooling coils. This thermal store design is based on the use of a widely available phase change material (PCM), macro-encapsulated into cylindrical tubes that are packed into a containment tank. An experimental scale model of this thermal store is constructed for test purposes, and tests are conducted to determine the feasibility of this design and to characterize its operation. A numeric model is developed to demonstrate the feasibility of modeling such a store using simplified assumptions, both for design purposes and real-time predictive control strategies. The results in this example show that such a design increases thermal capacity over that of a simple chilled water tank, and that a simplified numeric model for use by control systems can predict the short-term performance of the store in near real-time.

Symbols used in this Example $A_a$ Cross-sectional area associated with advection [m$^2$]
$A_c$ Surface area associated with convection [m$^2$]
$A_i$ Area of the inside face (relative to the radius) of a modeled element [m$^2$]
$A_o$ Area of the outside face (relative to the radius) of a modeled element [m$^2$]
$A_h$ Area of the horizontal face of a modeled element [m$^2$]
$A_{lm,i}$ Log-mean area of the inside face of the modeled element [m$^2$]
$A_{lm,o}$ Log-mean area of the outside face of the modeled element [m$^2$]
C heat capacity [J/(kg·°K]
F Flow rate [m$^3$/s]
$F_{lpm}$ Flow rate [L/min]
h Thermal convection coefficient [W/(m$^2$·°K]
HF Heat of fusion for PCM (Tetradecane) [J/kg]
$HF_p$ Heat of fusion remaining as of the previous time step for a specific PCM element undergoing phase change [J]
$HF_m$ The maximum heat of fusion calculated for a specific element [J]
k Thermal conductivity [W/(m·°K]
r Radial dimension [m]
t time [s]
T Temperature
$T_{amb}$ Ambient temperature [°C. or °K]
$T_s$ Surface temperature for convection heat transfer [°C. or °K]
$T_S$ Highest temperature at which the PCM begins to solidify [°C.]
$T_M$ Lowest temperature at which the PCM begins to melt [°C.]
$U_z$ Velocity of the heat transfer fluid flow
V Volume [m$^3$]
w Velocity in the z direction of the HTF (heat transfer fluid) [m/s]
z vertical dimension [m]
Δt Time step [s]
Δr length dimension of the current radial step [m]
α Thermal diffusivity [m$^2$/s]
ρ Density [kg/m$^3$]
Subscripts
c PCM parameter
f Heat transfer fluid (HTF) parameter
m Vertical integer coordinate of the referenced node (vertical node number)
n Radial integer coordinate of the referenced node (radial node number)
v CPVC parameter
Superscripts
t Current time step
t−Δt Previous time step Without any effective large-scale electric energy storage capability, electric power must be produced as it is used and precisely follow demand Uncertainty in both generation and demand requires a means to regulate one or the other to maintain an ongoing balance. Typical regulation mechanisms focus on the manipulation of generation by using a mix of generation sources consisting of baseline, intermediate, and peak power plants. [Masters, 2004].

The increased use of renewable but intermittent energy resources—such as wind and solar power—adds uncertainty to generation capacity. Total U.S. solar and wind power generation is expected to grow by 46 and 42 gigawatts respectively by the year 2040, with total renewables producing almost 20% of all electric power [US EIA, 2013]. Without mitigating action, offsetting the increased uncertainty in electric supply caused by the use of these intermittent renewable energy resources will require an increased capacity in fast-response but less efficient and more costly peak demand power plants. The need for more peak demand power plants can be mitigated by shifting peak electric load to non-peak periods [Bendy and Evelyn, 1986], or to times when intermittent renewable energy is on-line.

Commercial and residential environmental cooling loads account for 11% of all U.S. electric consumption [USEIA, 2012], and can be a much larger share of seasonal peak electric demand—particularly in regions with warmer climates [Wattles, 2011]. The Electric Reliability Council of Texas (ERCOT) reports that up to 54% of peak summer energy demand in Texas is due to weather-related loads, much of which is associated with environmental cooling [Doggett, 2013]. The demand for residential and commercial cooling is expected to increase due to a projected growth in residential and commercial floor space, and to a shift in population towards states with warmer climates [US EIA, 2013].

Active thermal energy stores, when used as part of a demand management strategy, can time-shift these cooling loads. Studies have shown that active thermal storage systems can be effective at both reducing peak energy demand and the overall cost of building energy use by environmental systems, particularly when cost incentives—such as peak demand and time-of-day rates—are in use [Hajiah and Krarti, 2012a,b]. The use of thermal storage systems can also reduce the peak demand seen by environmental chiller equipment, eliminating the requirement that chiller equipment be capable of meeting peak cooling load demands. Instead, chiller equipment only needs to meet total load requirements (time-averaged load) [He et al., 1999]. This reduces the capacity requirements and cost of chiller equipment, and minimizes the refrigerant charge necessary for a given application.

The data in FIG. 1 shows that up to 71% of weather sensitive load experienced in Texas is due to residential demand associated with environmental cooling load. The American Housing Survey data indicates that residential structures in 2011 had an average age of approximately 37 years [U.S. Census Bureau, 2013]. Similar data exists for commercial buildings, which account for 22% of Texas weather-sensitive load and have a typical 28 year lifespan [USEIA, 2006]. The long usable lifespan of residential and commercial buildings dictates that an effort be made to develop retrofittable thermal storage systems that can be deployed in existing structures, structures that may not permit the addition of large conventional sensible thermal energy stores such as chilled water tanks. High capacity, high density thermal storage systems will be necessary for these retrofit applications.

Thermal energy can be stored sensibly through a change in temperature of a storage medium, or it can be stored latently as a change in phase of a material—for instance, from a solid phase to a liquid phase or vice versa. Phase change processes are characterized by large changes in enthalpy at constant or near-constant temperatures. These characteristics of phase change/latent energy storage systems allow them to store energy at greater density and over a smaller temperature range than sensible energy storage systems, such as conventional chilled water tanks [Regin et al., 2008]. For example, the energy required to melt ice (0° C. ice changed to 0° C. water) is roughly equal to the energy required to heat the resulting water from 0° C. to almost 80° C. (334 kJ/kg at a nearly constant 0° C., vs. 4.2 kJ/(kg·K) over 80° C. [Cengel et al., 2008]).

PCMs (phase change materials) suitable for use in an environmental cooling latent energy thermal storage system should exhibit several key properties, including: high volumetric and gravimetric heat of fusion; a narrow phase change temperature band in a range compatible with existing chiller equipment; acceptable thermal conductivity; chemical stability; and physical compatibility with common encapsulation materials [Abhat 1982] [Baetens et al., 2010] [Humphries, 1977]. For environmental space cooling applications, phase change temperatures should operate in the range of 5 to 12° C. [Li et al, 2012] [Dimaano et al, 2002]. Potential cooling-mode PCMs include water, salt hydrates, fatty acids, and paraffin hydrocarbons.

n-Paraffin (hereafter paraffin) waxes consisting of one or more compounds of the generic form $CH_3-(CH_2)_n-CH_3$ have been heavily investigated for their use as PCMs (phase change materials) in thermal storage systems [Abhat, 1983] [Humphries et al, 1977] [Hale et al, 1971]. Studies have shown that paraffin-based PCMs with the needed properties of melting temperature and heat of fusion can be crafted using paraffin with hydrocarbon chains of particular length, or through the use of mixtures of such paraffin [He et al., 1999] [He et al., 2004] [Choi et al., 1992]. These paraffin compounds are congruent through their melt-freeze cycles, chemically stable, compatible with available low-cost encapsulation materials, non-toxic, possess high heats of fusion, and are available in suitable temperature ranges for use in cold storage systems. Paraffins do suffer from poor thermal conductivity (approximately 0.2 W/(m·K) however, encapsulation dimensions can be adjusted or internal thermal conduction enhancements used when necessary to improve thermal performance. Such paraffins can be used to construct high-density thermal storage system for environmental cooling applications.

In this example, the development of a simple, compact, high-density paraffin-based PCM thermal storage device suitable for residential or small commercial retrofit applications is disclosed. A simplified numeric model for this store is developed for design and real-time control applications. The model utilizes a finite volume approach so as to preserve both the change in temperature of the HTF as it passes through the store as well as the capability for multiple phase fronts that may develop during partial charge/discharge cycles.

Previous Phase Change Models and Experiments

Shamsunder and Sparrow [1975] comprehensively developed an implicit two-dimensional non-linear numeric solution for PCM solidification in a long rectangular container (square tubing), based on the enthalpy model and solved using iterative methods. Their non-dimensionalized solution utilizes the Ste (Stefan), Fo (Fourier) and Bi (Biot) numbers. This work, like some others in the realm of PCM solidification and melting, relies on a constant HTF (heat transfer fluid) temperature. This constant HTF temperature condition is inconsistent with the operation of an actual thermal store, since the express purpose of a thermal store is to transfer energy to/from a HTF that must change temperature as it traverses the system. However, their model does give valuable insight into the development and solution of an enthalpy-based numeric model. Their results show that a low Bi number is required for the store to produce a near-constant heat flux; this is because for a low Bi number the resistance of convection dominates, and in the modeled scheme the external resistant (1/[hA]) does not vary. Bi numbers larger than 1 produce significant drop-off in heat transfer with respect to time. Ste numbers between 0.01 and 0.1 (within the realm of common PCMs) were modeled and shown to have little effect on solidification until near the end of the process.

Jesumathy et al. [2012] investigated a single vertical annulus tube-in-shell design for a PCM-based thermal storage system. Their study showed that the PCM did not melt in a uniform manner; instead, the PCM melted from the top down, even though they had attempted to maintain a constant and uniform thermal bath temperature. They also experimented by altering the Reynolds number of the flow around the encapsulation annulus, but limited the Re range to between 693 and 1175 (laminar flow). This study also notes that in certain cases internal (encapsulation) convection may result at the interface between the PCM and the encapsulation system, increasing heat flow internal to the encapsulation system Jiji and Gaye [2006] analytically investigated the theoretical solidification and melting of slab elements of PCM using a quasi-steady state model as an approximation. This method assumes that the system—from a sensible energy perspective—is always in equilibrium (sensible equilibrium is assumed to be reached immediately after the sensible/latent energy transformation has been completed). When the Stefan number is much less than one, this is a feasible assumption (sensible energy is only a small part of the total energy exchange). The solution was found analytically, but required that the surface temperature of the encapsulation system be constant. The solution operates by assuming separate differential equations for conduction through the PCM—one for the solidified portion and one for the liquefied portion of the PCM, each with its own boundary conditions—with a separate differential equation acting to connect the two at the moving interface boundary between the phases (using a quasi-steady state approximation). The rate of movement of the phase change interface is related to the difference between conduction from/to each of the phases and the heat of fusion of the PCM, coupled with the geometry of the system.

Ismail and Moraes [2009] investigated analytically and experimentally the use of spherically-encapsulated PCM. Their study assumed a constant HTF temperature outside of the spheres, and used a finite-difference approximation to numerically model the freeze cycle while assuming only conduction inside of the spherical shell. Their numeric results correlated well with experimental results when diameters were small. They did not investigate melting cycles.

Ismail and Gonzalves [1999] numerically investigated the freezing of n-Eicosane ($T_r=36.4°$ C.) in a tube-in-shell system, where the shell contained the PCM and the tubes passing through the shell in a single-pass arrangement carried the HTF. Their enthalpy method model concentrates on a single similarity unit of HTF pipe and surrounding PCM annulus. Their numerical approximation is based on dimensionless parameters, and the results are expressed in terms of a heat exchanger in the form of NTU, mass fractions of PCM solidified, and effectiveness based on a dimensionless time, radii of the HTF tube, equivalent radius of the (effective) PCM annulus area (the "symmetry circle"), and the formulation of a Biot number involving the HTF pipe diameter. Their solution couples changes in the HTF with convection to the PCM. Their results show that increases in the R* ratio (the ratio of the outer PCM annulus diameter to the HTF tube diameter) reduces effectiveness and increases the time period for full solidification. In addition, they conclude that an R* value of 4 is optimal from the standpoint of both NTU and effectiveness for this particular design.

Bilir and Ilken [2005] investigated the solidification time of PCM in both cylindrical and spherical containers using an enthalpy model and an explicit scheme. The model assumes a perfectly conducting shell ($R_T=0$), a constant HTF temperature and convection coefficient h, and radial conduction only (a reasonable assumption given solidification from the outside inward). Their model is similar to, and expands upon, that of Shamsunder and Sparrow [1975]. The result of an analysis of their model provides correlations for solidification times as a function of Stefan, Biot numbers and a superheat parameter for both cylinders and spheres.

These efforts have focused on the speed and manner in which an encapsulated PCM can store or recover energy. Most utilize some form of enthalpy tracking, and model the thermal performance of a single unit of a thermal store design. However, in many cases the idealized model or experiment is inconsistent with application as a thermal storage system. For instance, the assumption of a constant temperature HTF is inconsistent with use as a thermal store, as the express purpose of the store requires that HTF temperature change as it passes through the system. In other cases a model may allow only a single phase front, however, in a partial discharge/recharge operation multiple phase fronts are possible. Finally, these models have concentrated on optimizing freeze/melt rates; however, energy storage and recovery in a thermal store does not necessarily have to be fast, but only fast enough for a particular application.

Methods

An experimental thermal store design is constructed utilizing PCM encapsulated in CPVC tubes arranged in a pseudo annular-ring configuration inside of an insulated PVC tank. Cylindrical encapsulation is used due to its higher potential density of encapsulated volume over spherical encapsulation (theoretical maximums of approaching 90.7% vs. 74.0% respectively), and also to minimize manufacturing costs. The thermal performance of this design can be manipulated by altering the diameter, length, spacing, and number of the PCM encapsulation tubes.

A finite-volume numeric model, suitable for use in thermal storage applications, is also developed to demonstrate that simplified models for design and real-time operation/control are feasible for this thermal store design.

Experimental Apparatus

In this example, the PCM encapsulation system for the thermal store consists of CPVC tubes. CPVC is chosen due to its chemical resistance to n-alkane paraffins and its availability in an appropriate size. Standard ½ inch (12.7 mm) CPVC tubing is used. Tubes are cut to a finished length of 1.14 m with the end caps installed. This length is chosen to maintain a manageable size for the test apparatus. Each tube is filled with 0.116 L of PCM, then fitted with end caps. The completed tubes contain approximately 0.167 m of clear space above the liquid PCM to allow for expansion/contraction of the PCM without large changes in internal pressure.

The tank is constructed of standard 4 inch (0.102 m) schedule 40 PVC pipe. The top and bottom of the tank utilize PVC fittings to allow for water flow and instrumentation. A PVC pipe flange is installed at a level coincident with the top of the PCM encapsulation tubes to facilitate installation of the PCM tubes and instrumentation. The main body of the tank, which contains the full height of the encapsulated PCM tubes, is placed into a 0.305 m diameter cardboard form tube and supported by 0.102 m of Styrofoam insulation board at its base. The remaining space around the tube is filled with polyurethane spray foam insulation. The upper flange and top portion of the tank is manually insulated with polyurethane foam batting and covered by a 0.305 m diameter cardboard cylinder.

The temperature measurement system utilizes Omega 44033 epoxy-encapsulated thermistors with an interchangeability of 0.1° C. These thermistors are positioned at both the input and output of the thermal storage tank, and are placed directly in the restricted flow path of the entry/exit ports to minimize error and external influences. Return tank, loop, and ambient temperatures are also measured using these thermistors, as is the water bath and PCM temperatures during PCM water bath melt/freeze testing. The thermistors are connected to GW Instruments iNet-100 A/D data acquisition hardware, which provides excitation current for each thermistor through a precision 4.7 kohm resistor with an accuracy of +/−0.025%-20 ppm/° C. The iNet-100 in this configuration has a temperature measurement accuracy of +/−0.1° C. Temperature data is recorded at 10 second intervals during each test run.

HTF flow rates are measured using Omega FLR1009 Pelton-type turbine wheel flow meters with a range of 50 to 500 ml/min and an output of 0 to 5 volts. These devices have a repeatability of 0.2% of full scale. One flow meter is used per tank port (at the top and bottom of the PCM tank), however, since the flow meters are not bi-directional only the device acting as the input is utilized for each test run; the unused device is bypassed. These devices are dependent on fluid viscosity, and so require calibration to the fluid in use. The flow meter in use for each run is manually calibrated using direct measurement of the output flow from the tank at the beginning and end of each test run.

Figure 2:
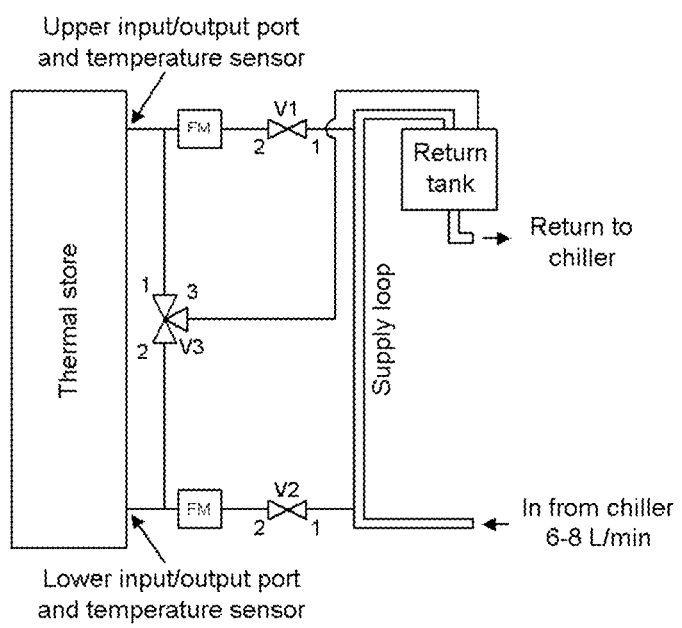
FIG. 2. Schematic of the test tank and its connections. Note that two modes of operation are possible: Charge mode with V1 closed, V2 open, and V3=1–3; or discharge mode with V1 open, V2 closed, and V3=2–3. The supply loop delivers a constant flow rate of 6 to 8 liters/minute so that the temperature in the loop is constant, and so that the supply links to the tank are as short as possible. The return tank is open to allow for flow rate confirmation by direct measurement.
Figure 3:
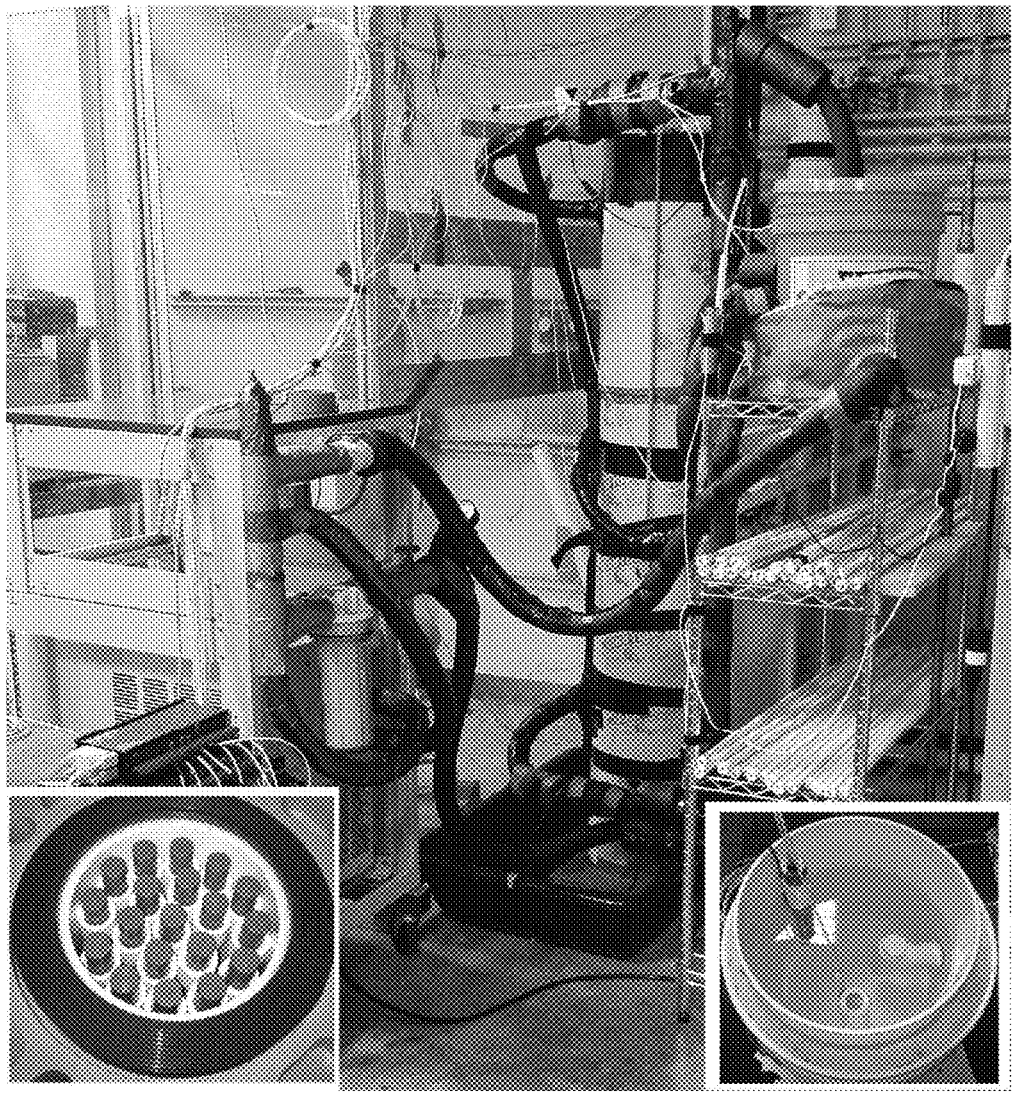
FIG. 3. This picture of the apparatus shows the chiller, thermal store, and the return tank. The chiller supplies the heat transfer fluid loop, which terminates in the return tank located on the wire rack. The thermal store draws chilled water from the loop, either to the bottom (charge cycle) or top (discharge cycle) of the tank and outputs it to the return tank, where the flow rate can be measured and used to calibrate to the flow meters before and after each run. The inset on the right shows the water bath tank; the inset on the left shows the 19-tube packing arrangement.

Testing is performed by pumping chilled water through the storage tank. A Polyscience 5706T portable chiller unit supplies chilled water. To minimize temperature changes in the HTF during delivery to the tank, the tank is supplied from a high-volume-flow loop that delivers the HTF at constant temperature to points very near the tank inputs. Small diameter polyethylene tubing connects the supply loop with the input/output terminals of the tank to minimize residence time in the tubing. All tubes are insulated by wrapping the tubes in foam rubber pipe insulation having a minimum R-value of 0.5 (SI). A schematic of the tank and its connections is shown in FIG. 2, and a picture of the complete apparatus is shown in FIG. 3.

The direction of HTF flow in the tank is devised to preserve any temperature gradient developed in the tank, and is dependent on the cycle (charge or discharge). During the charge (freeze) cycle, chilled water at approximately 2° C. is pumped into the bottom of the tank. During the discharge (melt) cycle, chilled water at approximately 11° C. is pumped into the top of the tank. The 2° C. charge temperature is selected as low enough to fully freeze the PCM while also being within the capability of typical chilled water systems. The 11° C. temperature for the discharge cycle is selected as representative of a typical cooling coil chilled water return temperature. HTF flow rates for the recharge (freeze) cycle are fixed at 300 ml/min Flow rates for discharge are constant during each run, but vary between runs at rates from 100 ml/min to 200 ml/min.

Two PCM/tank configurations are investigated: a high density configuration utilizing 31 tightly-packed encapsulated PCM tubes, and a moderate-density configuration utilizing 19 evenly-spaced encapsulated PCM tubes. When the thermal store is configured for high density mode, the close-packing arrangement fails at the inside surface of the tank, resulting in additional flow paths around the inside edge of the tank. The total area of these flow paths are large with respect to the total flow path between the tubes. To minimize the impact of these flow paths they are blocked with ⅝" closed-cell foam backer rod; this provides for more uniform and consistent heat transfer between the PCM tubes and the HTF. When in the moderate-density 19 tube configuration, this perimeter area is small relative to the total free cross section area of the tank and so is ignored. A picture of the 19-tube packing configuration is shown as an inset in FIG. 3.

PCM Testing

In this example, tetradecane is used for the phase change material. A lab grade product of approximately 99% purity is selected over a technical grade product (95%) grade due to early experiments conducted with a technical grade formulation. In those experiments it was found that the freezing point of the tetradecane was depressed by the impurities found in the technical grade product, making it unsuitable for this application. The essential properties of pure tetradecane are taken from the literature, as indicated in Table 1.

TABLE 1

Properties of pure tetradecane

| Property | Value | Test condition | Source |
| --- | --- | --- | --- |
| Freezing temperature | 5.5° C. | N/A | Hale et al, 1971 |
| Density (solid) | 825 kg/m$^3$ | 4° C. | |
| Density (liquid) | 771 kg/m$^3$ | 10° C. | |
| Latent heat | 226 (kJ/kg) | (Based on liquid density) | |
| Conductivity | 0.15 W/(m °K) | 20° C. | |
| Heat capacity (solid) | 1.68 kJ/(kg °K) | −20 to 0° C. | Kousksou, 2010 |
| Heat capacity (liquid) | 2.18 kJ/(kg °K) | 25° C. | (calculated) |
| Heat capacity (T-avg) | 1.99 kJ/(kg °K) | 2° C.-11° C. | |

The melting of paraffins occurs over a range of temperature. Thermal testing is performed on the PCM using a water bath protocol to determine the freeze and melt temperature range of the tetradecane PCM. A 20 ml sample of PCM is placed in a section of clear ½ schedule 40 PVC pipe, and a thermistor installed in the approximate center of the sample. The temperature reading of the thermistor is monitored as the PCM sample freezes and melts while in a temperature-controlled water bath. The freezing temperature range is found using a water bath temperature of 2° C., and the melting temperature range using a water bath temperature of 9° C. A picture of the water bath apparatus is shown as an inset in FIG. 3.

Numeric Model

Figure 4:
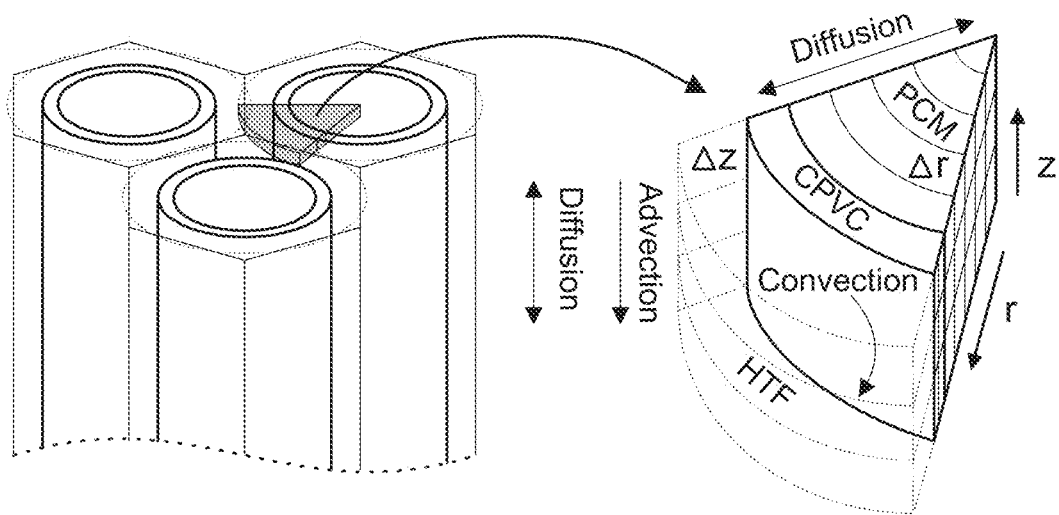
FIG. 4. Elements, dimensions, and heat transfer considerations of the initial numeric model. PCM is encapsulated in CPVC tubes, which are then packed into a larger containment tank at regular spacing intervals. The tube count, radius, spacing and length all affect thermal performance of the store. Note that the hexagonal annular cylinder is replaced by an equivalent cylindrical form, the radius of which is based on the number of tubes and the total cross-sectional free area of the tank.

The numeric model of this experiment is developed based on a finite volume energy balance of an annular ring configuration of cylinder (tube)-encapsulated PCM, as shown in FIG. 4. The finite volume energy balance method was chosen for the initial model to allow maximum flexibility, including the ability to later model a partial freeze-melt-freeze cycle where multiple phase fronts might exist.

The model is a two-dimensional (in r and z) finite volume representation of the unit shown in FIG. 4, which comprises a 60° segment of an individual PCM encapsulation tube and its share of the associated HTF flow path. The example segment shown in FIG. 2 is assumed to have adiabatic boundaries along its exposed vertical surfaces, based on the assumptions that $dT/d\theta$ is equal to zero (the model is axisymmetric) and that a uniform temperature exists within HTF cells at the same vertical location. Temperature nodes are located at the center of each volume element, with surface temperature nodes used at surfaces separating dissimilar materials. Volume element nodes can accumulate latent and/or sensible energy, while surface nodes are used only to transfer energy between adjacent dissimilar materials.

The model accepts as input two matrices that represent the last state (temperature and available latent energy) for each temperature node and volume element, as well as model physical properties (dimensions, material properties), some pre-calculated constant dimensions and parameters to speed processing, and the current incoming HTF temperature. It outputs the new node state for the current time step, including the current output temperature, as well as the latent enthalpy for each PCM node. Successive iterations of the model allow for run times of any length.

The actual annular area associated with each encapsulation tube is a hexagonal cylinder, but for modeling purposes the hexagonal cylinder is replaced by a circular cylinder of equivalent cross-sectional area equal to an appropriate share of the free cross-sectional area of the tank; this is done to preserve the relationship between HTF (heat transfer fluid, i.e.: propylene glycol and distilled water solution) volumetric flow rate and velocity within the tank. Advection due to HTF flow, vertical diffusion in the HTF, convection between the HTF and the surface of the encapsulation tubes, and conduction through the encapsulation material and PCM are all considered in the model. Diffusion is considered only in the z direction for the HTF, but for both the r and z directions in the encapsulation material and PCM. For this iteration of the numeric model the heat capacity (C) and conduction (k) of the components are assumed constant, regardless of phase or temperature. Due to the change in phase and resulting change in heat capacity, the heat capacity value used for the PCM is a temperature/phase averaged value, as shown in Table 1. To maintain model simplicity and speed of operation, the potential for buoyancy-driven free convection within the encapsulated PCM or within the thermal storage tank itself is ignored. Only conduction is considered internal to the PCM encapsulation tubes, regardless of phase state, while conduction, advection, and forced convection are considered in the HTF. The model is calibrated so that any free convection effects are included in the effective heat transfer coefficient, h, or the material thermal conductivity, k.

Figure 5:
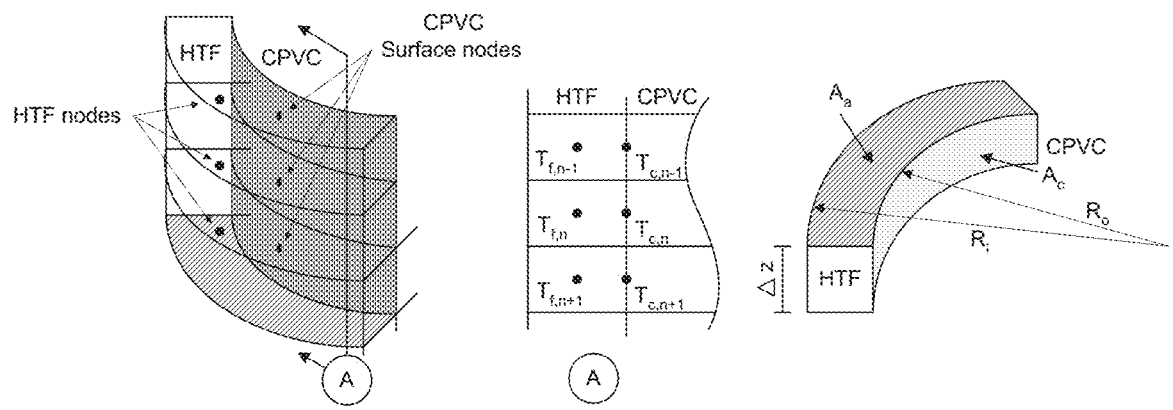
FIG. 5. Geometry and nodes for advection-convection-diffusion energy balance equations. This represents advection due to heat transfer fluid (HTF) flow, forced convection between the HTF and the surface of the CPVC encapsulation tubes, and vertical diffusion in the HTF.

The energy balance between the HTF and the surface of the encapsulation is described by an equation based on the geometry and nodes as shown in FIG. 5. The energy balance for the HTF element is such that:

net enthalpy change=net convection+net diffusion+ net advection

Performing an energy balance on the elements shown in FIG. 3 gives the equation:

$$V_f \rho_f C_f (T_{f,m}^t - T_{f,m}^{t-\Delta t}) = A_c h(T_{s,m} - T_{f,m})\Delta t + \quad (1)$$

$$A_a k_f \left( \frac{T_{s,m} - T_{f,m}}{\Delta z} - \frac{T_{f,m} - T_{f,m+1}}{\Delta z} \right)\Delta t + A_a w \rho_f C_f (T_{f,m-1} - T_{f,m})$$

This equation collapses to the more recognizable differential form:

$$\frac{\partial T}{\partial t} = \frac{A_c}{V_f} \frac{h}{\rho_f C_f}(T_s - T_f) + \alpha_f \frac{\partial^2 T}{\partial z^2} - w \frac{\partial T}{\partial z} \quad (2)$$

Boundary surface nodes are used between dissimilar interfaces. These nodes are used solely to transfer energy, and do not have any sensible or latent energy storage capabilities. In addition, these operate in the r dimension only, unlike normal element nodes, which operate in both the r and z dimensions. In these boundary surface nodes, net energy in=net energy out.

Figure 6:
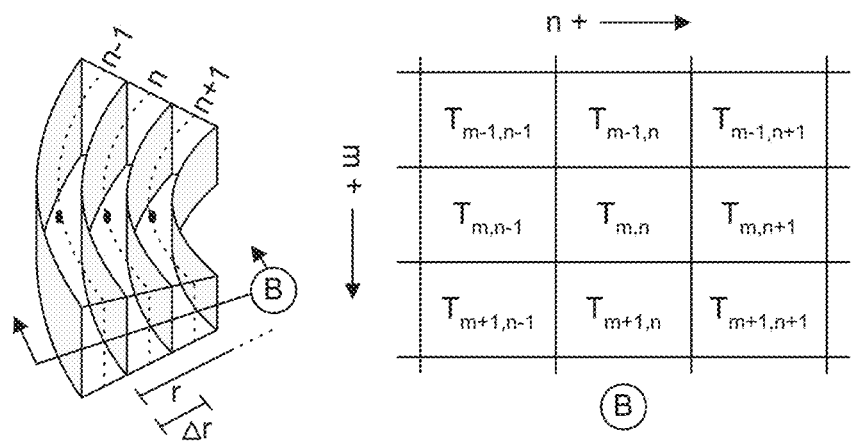
FIG. 6. Internal conduction nodes and numbering scheme. This represents the system of nodes used to calculate the temperature and energy exchange within the PCM and encapsulation tubes due to diffusion through the materials.

Two modes of energy transfer are defined for internal (encapsulation and PCM) nodes: Sensible energy mode and latent energy mode. Sensible energy mode applies to the internal element nodes of the encapsulation material, or to the PCM nodes when they are either fully frozen or fully melted. In this mode, an energy balance for the internal, conduction-only nodes follows a similar process (net in =net stored). However, this mode is complicated by the changing area over which heat transfer occurs in the radial direction, as shown in FIG. 6. Formulating a finite volume energy balance based on the geometry shown in FIG. 6 gives the equation:

$$V_{(m,n)}\rho_{(m,n)}C_{(m,n)}\frac{T_{(m,n)}^t - T_{(m,n)}^{t-\Delta t}}{\Delta t} = \quad (3)$$

$$\left[ k_{(m,n)}A_{o(m,n)}\frac{T_{(m,n-1)} - T_{(m,n)}}{\Delta r} - k_{(m,n)}A_{i(m,n)}\frac{T_{(m,n)} - T_{(m,n+1)}}{\Delta r} \right] +$$

$$\left[ k_{(m,n)}A_{h(m,n)}\frac{T_{(m-1,n)} - T_{(m,n)}}{\Delta r} - k_{(m,n)}A_{(m,n)}\frac{T_{(m,n)} - T_{(m+1,n)}}{\Delta r} \right]$$

This equation collapses to the more recognizable form of the heat equation (for k=constant) in cylindrical coordinates for the r and z dimensions:

$$\frac{\partial T}{\partial t} = \frac{\alpha}{r}\frac{\partial}{\partial r}\left(r\frac{\partial T}{\partial r}\right) + \alpha \frac{\partial^2 T}{\partial z^2} \quad (4)$$

Latent energy mode applies to the internal PCM elements only, and only when they are undergoing phase-change. Thermal energy transfer is by conduction/diffusion between the PCM elements and other PCM elements and/or the encapsulation material elements, regardless of phase, and so normal conduction/diffusion calculations apply. However, in this mode the available latent enthalpy of a PCM element is tracked and updated at each time step. In addition, the temperature of a PCM element undergoing phase change is set to a new fixed value for each time step; this temperature is a linear value between its melting temperature $T_M$ (the lowest temperature at which it begins to melt) and its solidification temperature $T_S$ (the highest temperature at which it begins to solidify) based on the percentage of latent capacity remaining in that element. This calculation is shown in Equation 5. The model then simultaneously solves for the remaining unknown temperatures in the thermal store for the current time step. The final temperature field is used to calculate the net energy in to or out of each phasing PCM element, and these values are used to update their available latent energy. New fixed temperatures for the next time step are calculated from the updated latent energy values for the phasing PCM elements. The net effect of this mode is similar to allowing the PCM to have a higher heat capacity during its latent heat phase change than during its sensible temperature change.

$$T_{(m,n)} = T_M + \left(1 - \frac{HF_p}{HF_m}\right)(T_S - T_M) \quad (5)$$

If heat transfer is considered in the radial direction as occurring between temperature nodes, then the radial heat transfer can also be thought of as occurring across a cylinder of material with a temperature node on each surface. Integration of Fourier's law in cylindrical coordinates applied over the r dimension for this case yields Equation 6, where the effective thermal area over which the heat transfer occurs is the logarithmic mean of the surface areas associated with each temperature node. (McAdams, 1942). For this reason the log mean area of each associated set of nodes is used as the effective area of thermal transfer between them for the radial direction in the discretized equations.

$$Q = kA\frac{dT}{dr} \rightarrow \frac{k}{(r_{n+1} - r_n)}\left(\frac{A_{n+1} - A_n}{\ln(A_{n+1}/A_n)}\right)(T_{n+1} - T_n) = \frac{k}{\Delta r}A_{lm}\Delta T \quad (6)$$

Differences Between the Numeric Model and Experimental Apparatus

There are fundamental differences between the numeric model and the experimental model, with the numeric model being an idealized subset of the experiment. A schematic comparing the experimental and numeric models is found in FIG. 7. To make the two comparable—necessary for validation of the numeric model—adjustments are made to the model as described in the following paragraphs.

Figure 7:
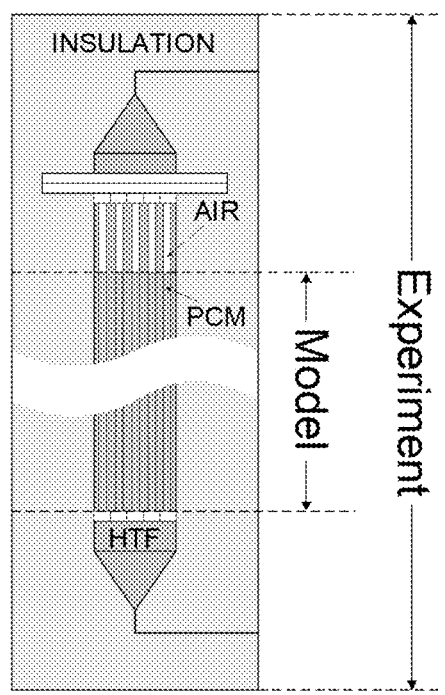
FIG. 7. Schematic of the experimental apparatus vs. the numeric model. Note that the basic numeric model does not include the water pools at the top or bottom of the experiment, nor does it include the thermal mass of the PVC tank shell or fixtures. The basic numeric model is only concerned with the portion of the thermal store that contains PCM-filled CPVC tubes and the surrounding HTF. The portion of the encapsulation tubes that contain air is also excluded from the basic numeric model.

The experimental apparatus has a small pool of HTF at the top and bottom of the tank, as well as some water surrounding the non-active (air containing) portion of the encapsulation tubes (a total volume of approximately 1.46 liters for the 19-tube configuration), as shown in FIG. 7. These water pools both delay and skew the output temperature of the tank relative to the numeric model. To compensate for these water pools, the incoming water temperature for the numeric model is pre-conditioned through the use of a separate numeric model that accounts for advection, diffusion and delay due to the HTF pools. These preconditioned temperatures are used as the input to the numeric model. To accurately account for the total energy change in the thermal store, including the energy changes associated with these water pools, the input temperatures to the preconditioning model are used for the overall energy calculations.

The numeric model is developed to simulate an idealized thermal store of any size based on a representative unit of the store. Since knowledge of the tank shell construction and size are not known, it is not considered by the base numeric model. For the case of the experimental apparatus, the construction of the shell and its impact are known with the result being a specific overall increase in the sensible heat capacity of the system. This is compensated for in the numeric model by proportionally increasing the heat capacity of the CPVC used in the encapsulation tubes, such that the net sensible energy storage in the PVC tank shell is incorporated into the total sensible energy storage of the CPVC tubes. The thermal effects of the non-PCM-containing portion of the CPVC tubes that are excluded from the numeric model are handled in the same manner.

The numeric model assumes perfect insulation, with no shell losses. However, the experimental system has limited insulation and non-negligible losses through the shell. To compensate for this, the numeric model incorporates a loss function that is integrated with the HTF energy/temperature calculations (since the shell losses would be transferred to the HTF first). The loss rates for the experimental apparatus are determined by observing the energy loss of the experimental apparatus during steady-state operation. Losses are determined for each flow rate and test mode so that all losses—including those due to the input/output plumbing—are properly determined for each experimental run configuration. Typical loss rates noted are between 0.2 and 0.3 W/° K.

A finite amount of time is required to shift the experiment from charge mode to discharge mode. During this time, the experimental apparatus experiences heat gain from the environment, warming the tank contents, as well as causing some thermal stratification. To compensate in the numeric model for this heat gain and stratification the model applies an initial linear gradient to the tank where the top of the tank is 0.2° C. higher than the charge temperature, while the bottom of the tank remains at the charge temperature. This approximates the average net energy gain due to losses to the environment during the time it takes to shift from charge to discharge mode, and is commensurate with the gain observed in the experimental apparatus during the mode reconfiguration process.

For validation with the experimental apparatus, each of the above adjustments are made to the numeric model and used for all simulations presented here. However, for general parametric study purposes the bare model can be used without these adjustments. The bare model is meant to be generic and not require a specific containment vessel material or insulation level.

Results

PCM testing is performed to characterize the PCM. Test runs are then performed to characterize the Nusselt number associated with convection between the HTF and the encapsulation tube surface, and to characterize the latent heat capacity of the PCM. Tests are then performed on the thermal store using multiple flow rates representative of expected loads on a per-unit basis and compared to the corresponding results of the numeric model.

Phase Change Material Tests

Figure 8:
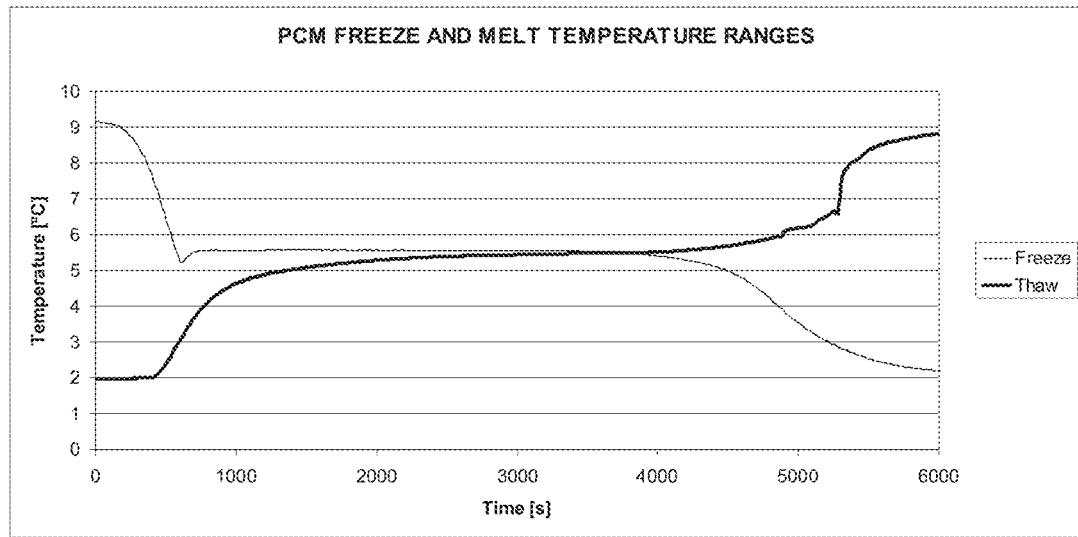
FIG. 8. Freeze/melt performance of 99% tetradecane. The freeze curve is nearly flat, with freeze occurring between 5.6 and 5.4° C. Note the sub cooling to 5.2° C. before freezing occurs. The melt cycle occurs over a wider temperature range of between 4.5 and 6.5° C. Water bath temperatures are 2° C. and 9° C. for the freeze and melt cycles, respectively.

The temperature range of melting for paraffins is dependent on the method used for testing and the temperature differential or rate of change of temperature between the sample and its surroundings. The thermal storage unit described in this paper is essentially a water bath with a water temperature that varies depending on the cycle type (freeze or melt). To estimate the effective temperature ranges of freezing and melting, a sample of encapsulated PCM is placed in alternating water baths of 2 degrees Celsius (freeze cycle) and 9 degrees Celsius (melt cycle) while the temperature of the PCM sample is monitored. This temperature range was selected so as to center the thermal response near the reported melting temperature of pure tetradecane. The water bath test results for the 98.8% tetradecane used in these experiments are provided in FIG. 8. These results show that the PCM freezes at between 5.6 and 5.4° C., with a sub cooling requirement of 5.2° C. before freezing begins. The results also show that the PCM melts over a wider range of between 4.5 to 6.5° C. The numeric model is designed to model cooling system support (and therefore the PCM melt cycle), so the melt cycle temperatures are used in the model ($T_{melt}$=4.5° C., $T_{solidify}$=6.5° C.) for this investigation. These temperatures are also used in the model to set the temperature of the melting PCM as a linear function of the phase state for each PCM element.

Thermal Store Calibration

Calibration for the effective Nusselt number for heat transfer between the HTF and the PCM encapsulation tube is required because, while modeled as an annular-ring configuration, it is different from such in several respects. For instance, the outer ring surface is virtual, adiabatic, and is not constrained by dz/dt=0 (dz/dt equals the free stream velocity $U_z$ at the virtual outer annular surface). In addition, the flow velocities are very low and exhibit Reynolds numbers on the order of 1, which is lower than typical correlations for annular flow.

Figure 9:
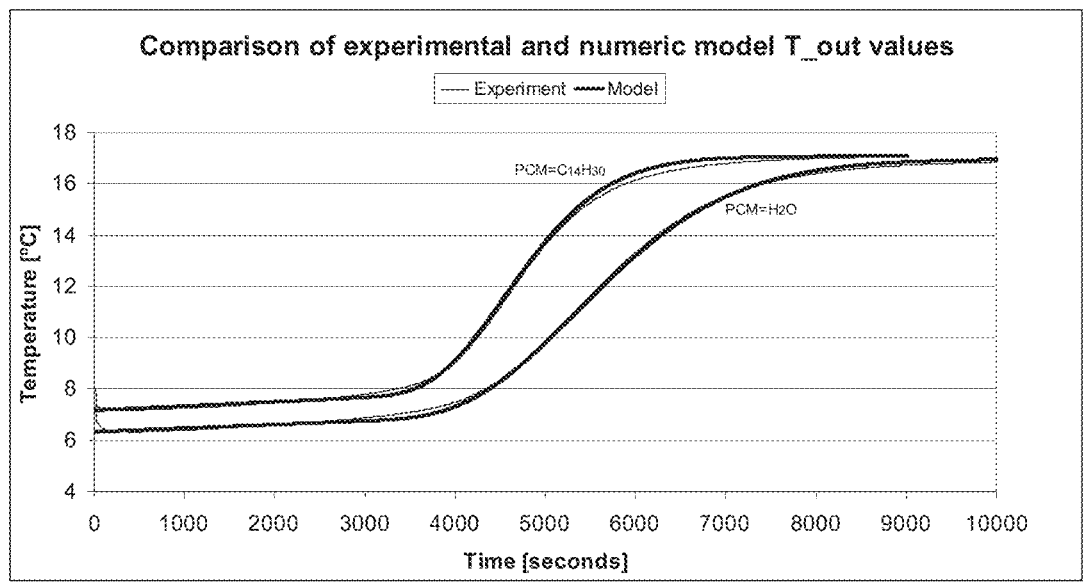
FIG. 9. Comparison of experimental and model output temperatures in sensible storage mode. Both water and tetradecane filled encapsulation tubes were used for these results. The Nusselt number was set at 2.5 to generate the numeric model data. Corrections are applied to the numeric model as detailed in the Methods section to compensate for the fundamental differences between the idealized model and the actual experiment.

The tank is calibrated for effective Nusselt number using a loose-packed configuration of 19 CPVC tubes, each filled with 120 ml of distilled water. The parameters used for the distilled water in its liquid state are shown in Table 2. The tank is pre-chilled to 6° C., and then supplied HTF through the upper input at 17° C. while the output temperature is recorded. The results are used in conjunction with the numeric model to determine the effective Nusselt number for external heat convection to the PCM-containing tubes. A comparison of the experiment to the calibrated numeric model (using the adjustments to the numeric model as defined in the methods section) is shown in FIG. 9. The Nusselt number is found to be approximately between 2 to 3, with 2.5 being selected for use in the numeric model.

TABLE 2

Properties of distilled water at 12° C.

| Property | Value | Conditions | Source |
| --- | --- | --- | --- |
| Density | 1000 kg/m$^3$ | 12° C. | Incropera, 2007 |
| Conductivity | 0.590 W/(m °K) | | |
| Heat capacity | 4.189 kJ/(kg °K) | | |

The tank is also calibrated using 19 CPVC tubes filled with tetradecane as per the methods section. The parameters used for the tetradecane calibration are those in Table 1 for the liquid form of tetradecane. To avoid the possibility of phase change in the tetradecane, the temperature range for this test is limited to 7° C. and 17° C. This calibration cycle also determined the appropriate Nusselt number to be approximately 2 to 3. These results are shown in FIG. 9.

In addition, the tank is calibrated for the effective value of the PCM latent heat. The tetradecane used in this experiment is 98.8% tetradecane, 0.8% tridecane, and 0.4% other impurities. However, studies have shown that small amounts of some impurities in tetradecane can reduce the latent heat of fusion (He et al., 1999). The PCM latent heat of fusion value is adjusted to provide the best match of the expected total energy recovery from the thermal store to the total energy actually recovered (including projected losses). Based on the recovered energy from three experimental runs (at flow rates of 100 ml/min, 150 ml/min, and 200 ml/min), the value of the latent heat for the PCM is estimated to be 215 kJ/kg. This is only slightly lower (5%) than the 226 kJ/kg expected for pure tetradecane.

Thermal Store Test Results

Figure 10:
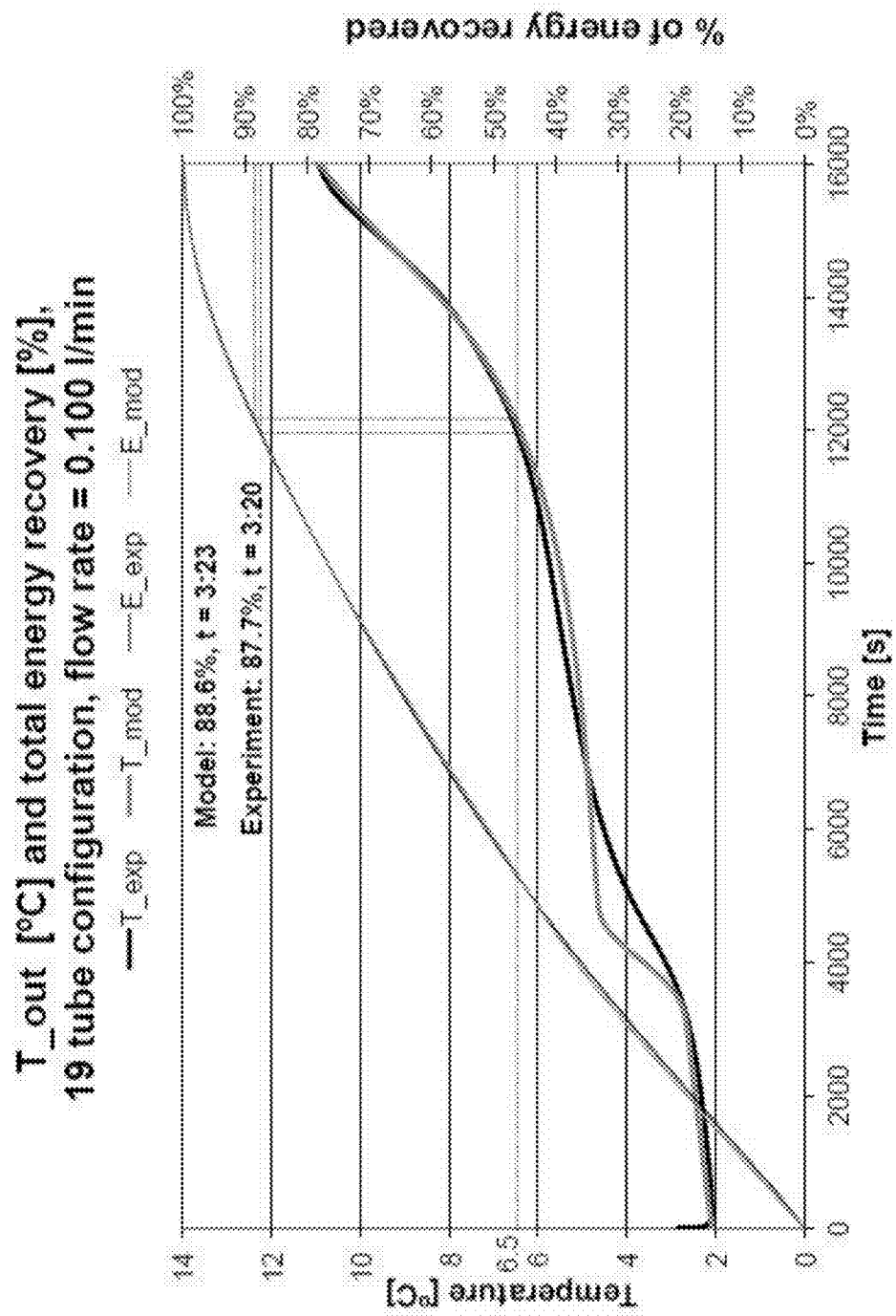
FIG. 10. Output temperature and energy recovery with respect to time for both the experiment and numeric model at a flow rate of 100 ml/min. The percentage of total energy recovered while the output temperature is less than or equal to 6.5° C. is identified. Total energy recovered includes losses, which can be captured through the use of higher insulation levels.
Figure 11:
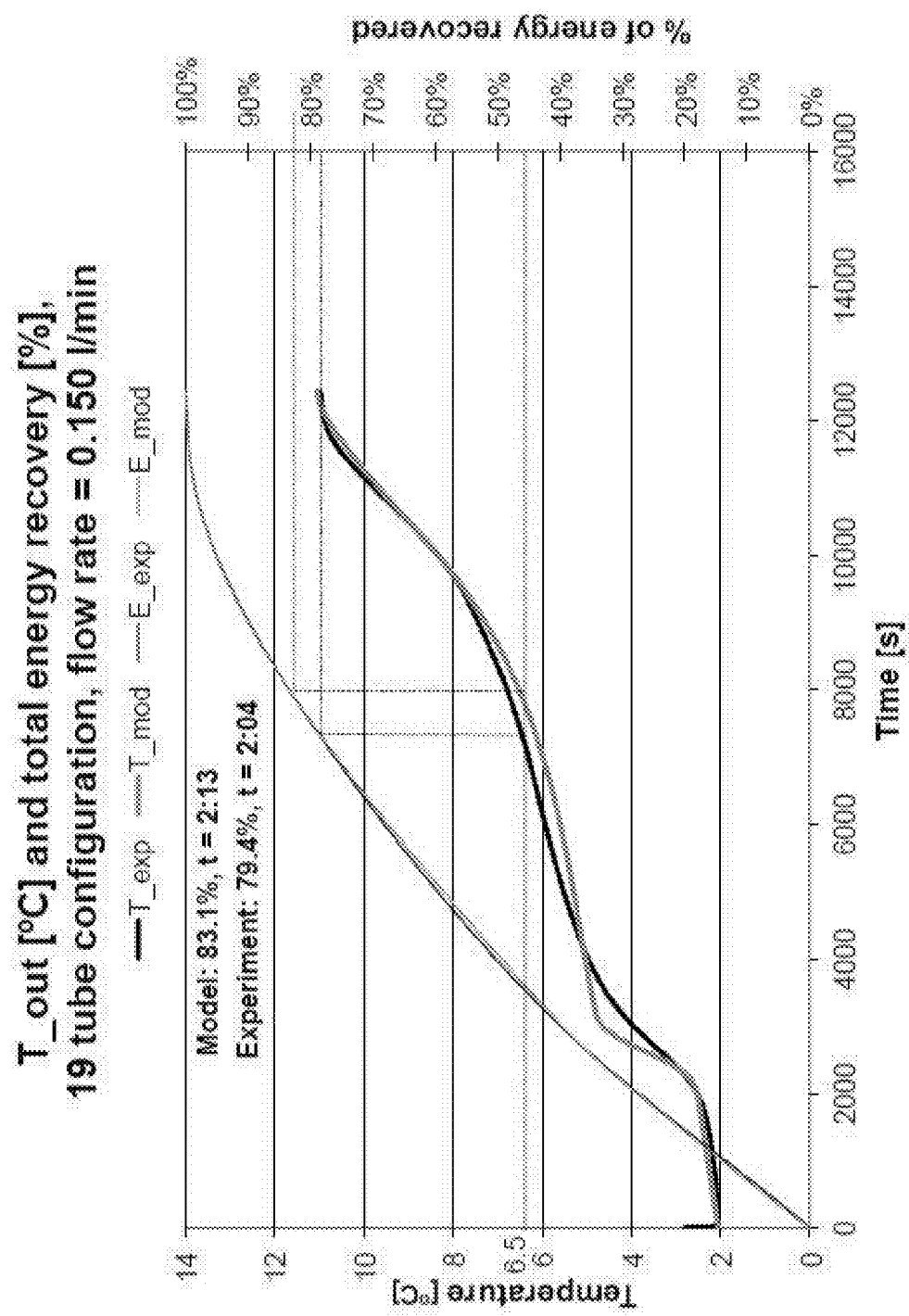
FIG. 11. Output temperature and energy recovery with respect to time for both the experiment and numeric model at a flow rate of 150 ml/min.
Figure 12:
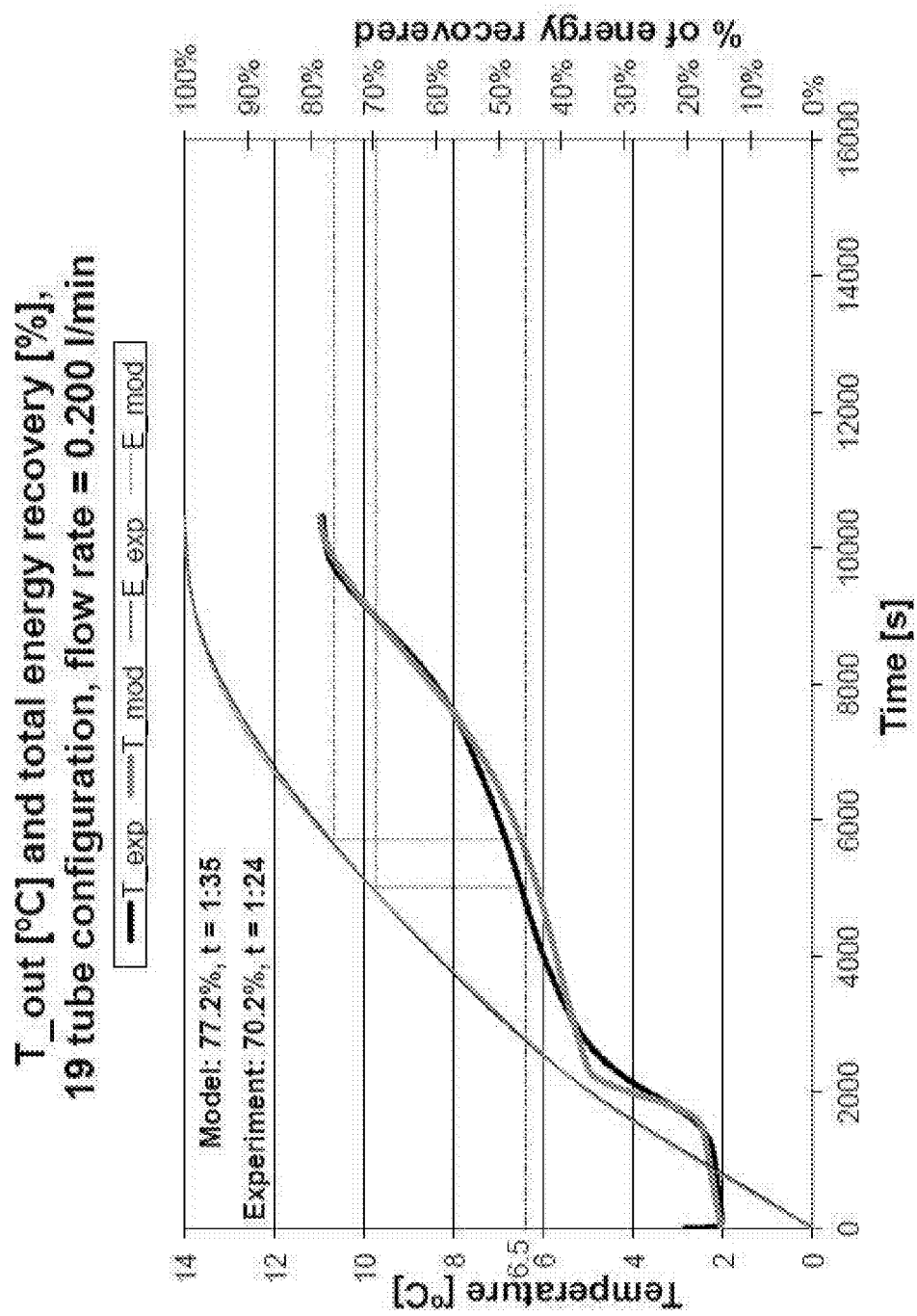
FIG. 12. Output temperature and energy recovery with respect to time for both the experiment and numeric model at a flow rate of 200 ml/min.

Thermal store test results for HTF flow rates of 100 ml/min, 150 ml/min and 200 ml/min using the 19 tube moderate density configuration are shown in FIGS. 10, 11 and 12. These plots include the output temperature and net % of recovered energy with respect to time (note that recovered energy includes losses through the tank wall, since it is possible to recover these losses with better insulation). The results show that for usable output temperatures of up to 6.5° C. (a minimum delta T of 4.5° C.), between 70% to 88% of total recoverable thermal storage capacity (sensible and latent) can be utilized, depending on flow rate through the tank.

The error between experimental and modeled data for the 19 tube configuration are calculated relative to the range of operation for temperature, total energy recovered, and percent of total energy recovered. Three runs at each of the experimental flow rates of 100 ml/min, 150 ml/min, and 200 ml/min were compared to the predicted output. Temperature measured with respect to time and compared to predicted values had differences of no more than 10.0% for all runs. The total energy recovered, calculated from HTF temperature changes, flow rates, and estimate losses, differed by no more than 2.4% between runs. When recovered energy is compared as a percentage of total recovered for the model vs. the experiment, this figure drops to 1.5%.

Results from High-Density Configuration

Figure 13:
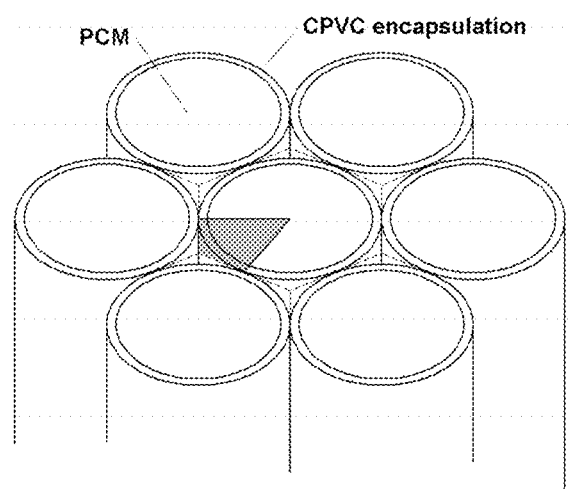
FIG. 13. An example of the high-density hexagonal packed PCM encapsulation tube arrangement. Note that the 60° element of the numeric model (in gray) still applies for this configuration. Also note the triangular-shaped HTF flow paths formed by the confluence of the PCM encapsulation tubes.

Experimental runs using the 31-tube high-density configuration were inconclusive. This is because the annular ring assumption of the numeric model breaks down as the spacing between the encapsulation tubes approaches zero. The model uses the HTF trapped between the encapsulation tubes (as shown in FIG. 13) to form a virtual volume for the annular ring configuration. However—unlike a true annular ring configuration—the convective heat transfer is not distributed evenly around the circumference of the encapsulation tube. Instead, the energy is concentrated near the center of the triangular-shaped HTF flow areas formed by the confluence of the encapsulation tubes, forcing the energy to be redistributed by and through the low-conductivity PCM and impeding performance of the store. The minimum tube spacing required to support the annular ring assumption of the model, and the difficulties encountered with the CPVC high-density configuration can be overcome by using a more conductive encapsulation material or by thermal conductivity enhancements to the PCM itself, are discussed in the Examples below.

Figure 14:
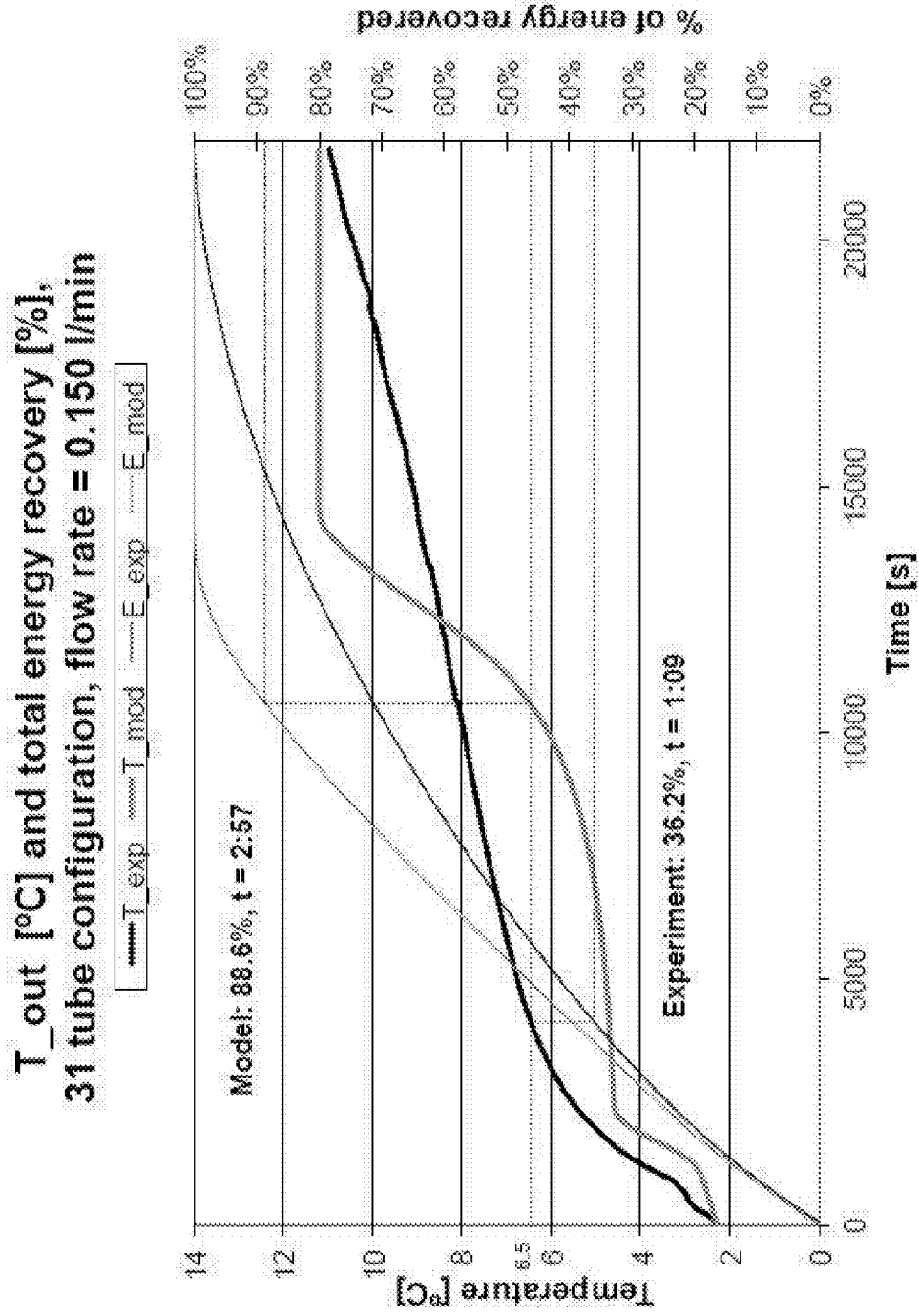
FIG. 14. This plot shows the difference between the experiment and numeric model data for a high-density hexagonal packed configuration of 31 PCM encapsulation tubes. Note the large discrepancy between the temperature and energy plots, indicating that the numeric model breaks down as the encapsulation tubes become more closely spaced.

Plots comparing the results of a high-density experimental run and the corresponding numeric model are shown in FIG. 14. Previous experiments using densely packed tubes produced similar experimental results (Bourne 2014), however, there is a large discrepancy between the output temperatures of the experiment and those predicted by the numeric model. The higher than expected output temperatures of the experiment indicate a much lower heat transfer rate than that anticipated by the numeric model, for the reasons discussed above.

Free Convection

The numeric model ignores the potential for internal or external free convection related to the PCM encapsulation tubes and their contents. Instead, the model uses Nusselt number and conductivity values that represent average effective heat transfer rates. The experimental and numeric results, however, indicate that free convection may play a role in overall heat transfer. This is evidenced by higher heat transfer rates early in the discharge cycle, when temperature differences between the HTF and PCM are highest, and lower heat transfer rates later in the cycle. The effective Nusselt number associated with free convection is a function of the Grashof number, which is dependent on the temperature difference between the fluid and the surface involved in convective heat transport; this could explain the discrepancies between the experiment and the numeric model results.

Example of Model Application

Figure 15:
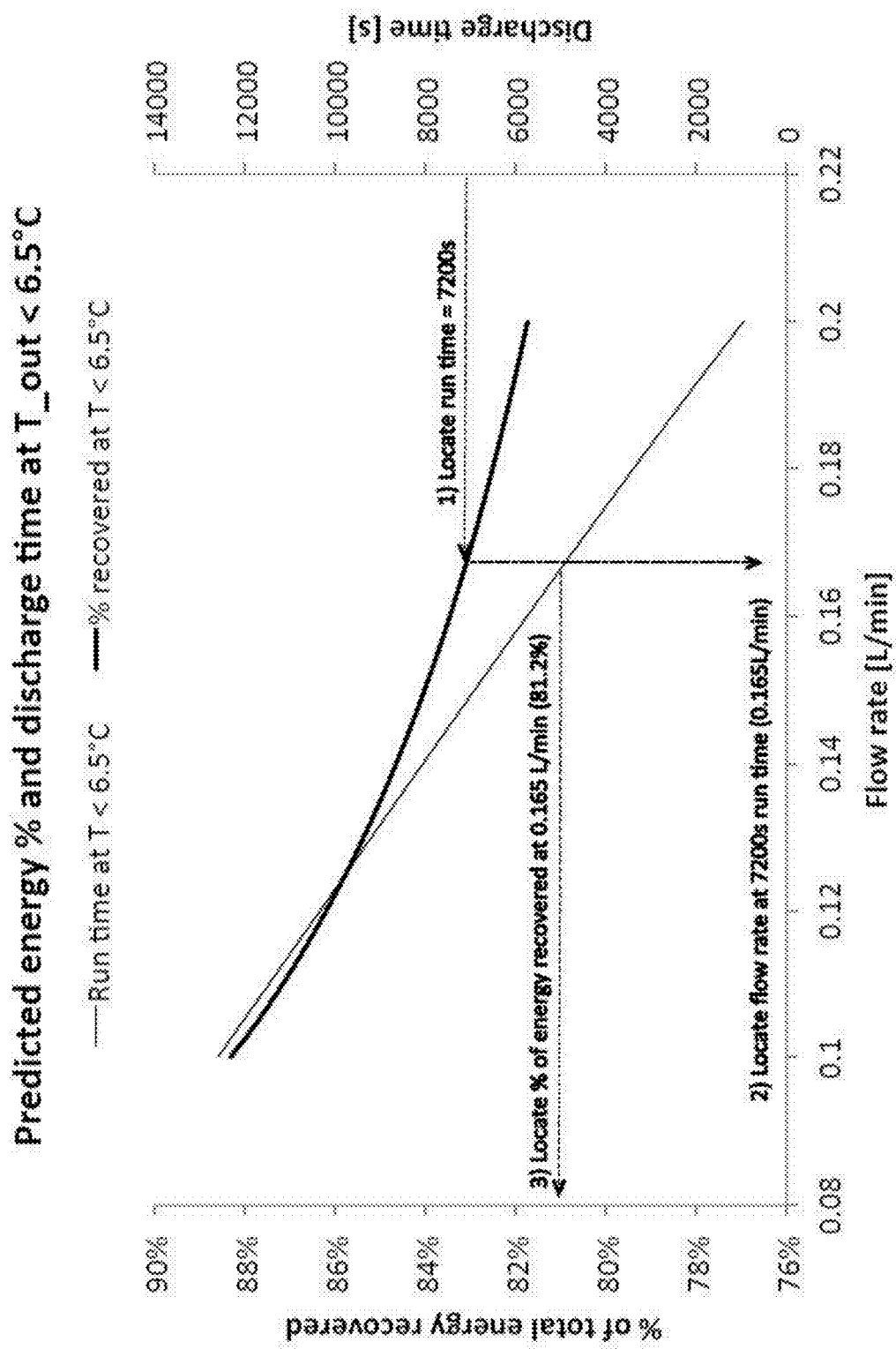
FIG. 15. Performance for full discharge cycles, as predicted by the numeric model. This figure shows how the maximum energy recovery (as a percentage of total recoverable energy) relates to flow rate and run time. The plots here can be used to determine optimal run parameters. For example, for a run time of 2 hours (7200 seconds) the optimal flow rate is 0.165 L/min, which results in a predicted energy recovery of 81.2% of total recoverable energy.

The calibrated numeric model can be used to predict the performance of this thermal store. For instance, the performance of a fully charged store relative to run time, flow rate, or desired energy recovery rate can be examined FIG. 15 demonstrates this capability by plotting the predicted performance of this thermal store for these variables using typical loss rates. The model predicts that the percentage of energy recovered at output temperatures of <6.5° C. varies nearly linearly within the expected range of operation (0.1 L/min to 0.2 L/min).

Experimental Error Analysis

The values used in the experimental calculations and their uncertainties are shown in Table 3. The relative uncertainty for values in Table 3 that operate over a range is determined using the median value of that range. Temperature uncertainty is taken directly from thermistor manufacturer data (based on NIST certification), while energy flow uncertainty is calculated from the relevant parameters. While the relative uncertainty of the loss rate is highest (LR in Table 3), the loss rate portion of the total energy calculation is small and contributed very little to the uncertainty of the tank total energy calculations. The major contributor to uncertainty in the energy calculations is found to be the temperature differential value ΔT. The overall typical relative uncertainty of the experimental energy flow calculations is found to be approximately 4.0%.

TABLE 3

Experimental uncertainty values

| Description | Symbol | Value or range | Error | Relative* | Units | Source |
|---|---|---|---|---|---|---|
| Temp | T | 2-11° C. | 0.1 | 1.5% | C. | Supplier |
| Ambient Temp | $T_{amb}$ | 23 | 1 | 4.0% | C. | Measured |
| $T_{in}$-$T_{out}$ | ΔT | 0-9° C. | 0.14 | 3.1% | C. | Calculated |
| Flow rate | $F_{lpm}$ | 0.100-0.200 | 0.003 | 2.0% | L/min | Measured |
| Density, HTF | $\rho_w$ | 1036 | 3 | 0.3% | kg/m² | |
| Heat capacity, HTF | $C_w$ | 3750 | 50 | 1.3% | J(kg K) | ASHRAE |
| Loss rate | LR | 0.2-0.3 | 0.05 | 20.0% | W/K | Measured |
| Overall (energy calculations) | | | | 4.0% | | |

*The relative error for parameter values given as a range is calculated at the median value of that range.

Uncertainty in the model is driven by the calibration of the model through the manipulation of the Nusselt number (for convective heat transfer) and the conductivity of the PCM. These uncertainties exceed all other uncertainties associated with the modeling methods utilized. For example, computation grid and time step were refined to get grid and time step independent solutions, and geometry parameters were taken from ASTM standards for PVC/CPVC pipe dimensions (ASTM, 2014). The process of model calibration through the manipulation of the Nusselt number is described in the Results/Discussion, Thermal store calibration section of this paper.

The model in its current form in this Example is limited to applications where it can be calibrated to a physical apparatus. This is because the model assumes that any free convection effects, either in the HTF or in the encapsulated PCM, can be adequately represented by adjusting the constant Nusselt number and PCM conductivity values. The model may be expanded by identifying when such natural convection effects become significant, and integrate their effect into Nusselt and conductivity values that vary as appropriate during runtime.

Summary

This Example shows that PCM-based thermal stores of this design can be used to store and recover thermal energy with a timescale and recovery rate sufficient for their use in the intended application. In addition, this Example shows that simple, near real-time finite-volume numeric models can predict the performance of this type of thermal store with sufficient accuracy so as to allow their use in an appropriate control system. The approach of calibrating the annular ring model so that average effective convection and thermal conductivity coefficients are determined allows for simplifications that eliminate the need to account for the possibility of internal and external free convection flows.

It is also noted that the simplified annular ring model breaks down as the actual spacing between the encapsulation tubes approaches zero, and that a high-density hexagonal packing of the CPVC encapsulation tubes performs poorly. This is possibly the result of the lower effective convective heat transfer rate offered in this configuration, and/or the poor thermal performance of the either the PCM or the CPVC encapsulation material. Improvements in the model-ing and performance of the hexagonal-packed configuration of this thermal store are investigated in Example 2 and Example 3 below and examine how a sufficiently conductive encapsulation material, or conductivity enhancements to the PCM itself, can improve the performance, energy storage density, and modeling capabilities of the high density hexagonal-packed configuration of this thermal store design.

REFERENCES CITED IN EXAMPLE 1

Abhat, A. 1983. "Low Temperature Latent Heat Thermal Storage: Heat Storage Materials." Solar Energy Vol 30 (4): 313-332.

2009 *ASHRAE Handbook—Fundamentals*. 2009. Atlanta Ga.: American Society of Heating, Refrigeration and Air-Conditioning Engineers, Inc.

ASTM International. (2014). D2846-14: *Standard Specification for Chlorinated Poly(Vinyl Chloride) (CPVC) Plastic Hot-and-Cold-Water Distribution Systems*. West Conshohocken, Pa.

Baetens, Ruben, Bjorn Petter Jelle, and Arild Gustaysen. 2010. "Phase Change Materials for Building Applications: A State-of-the-art Review." Energy and Buildings 42 (9) (September): 1361-1368. doi:10.1016/j.enbuild.2010.03.026.

Bentley W G, Evelyn J C (1986). Customer thermal energy storage a marketing opportunity for cooling off electric peak demand. *IEEE Transactions on Power Systems*, 1: 57-61.

Bilir, Levent, and Zafer lken. 2005. "Total Solidification Time of a Liquid Phase Change Material Enclosed in Cylindrical/spherical Containers." Applied Thermal Engineering 25 (10) (July): 1488-1502. doi:10.1016/j.applthermaleng.2004.10.005.

Bourne, S., Novoselac, A. Compact Phase Change Based Thermal Stores: Experimental Apparatus, Methodology, and Results. ASHRAE Winter Conference New York, ASHRAE Papers CD: 2014 ASHRAE Winter Conference, New York, N.Y.

Cengel, Yunus A., Robert H. Turner, and John M. Cimbala. 2008. Fundamentals of Thermal-Fluid Sciences. 3rd ed. New York, N.Y.: McGraw Hill.

Choi, Eunsoo, Young I. Cho, and Harold G. Lorsch. 1992. "Thermal Analysis of the Mixture of Laboratory and Commercial Grades Hexadecane and Tetradecane." International Communications in Heat and Mass Transfer 19 (1): 1-15.

Dimaano, Maria Natalia R., and Takayuki Watanabe. 2002. "The Capric-lauric Acid and Pentadecane Combination as Phase Change Material for Cooling Applications." Applied Thermal Engineering 22 (4): 365-377.

Hajiah A, Krarti M (2012a). "Optimal Control of Building Storage Systems Using Both Ice Storage and Thermal Mass—Part I: Simulation Environment." Energy Conversion and Management (April). doi:10.1016/j.enconman.2012.02.016. http://linkinghub.elsevier.com/retrieve/pii/S0196890412000799.

Hajiah A, Krarti M (2012b). optimal controls of building storage systems using both ice storage and thermal mass—Part II: parametric analysis. Energy Conversion and Management, 64: 509-515. doi:10.1016/j.enconman.2012.02.020.

Hale, D, M Hoover, and M O'Neill. 1971. "Phase Change Materials Handbook". United States. http://hdl.handle.net/2060/19720012306.

He, Bo, E. Mari Gustafsson, and Fredrik Setterwall. 1999. "Tetradecane and Hexadecane Binary Mixtures as Phase Change Materials (PCMs) for Cool Storage in District Cooling Systems." Energy 24 (12): 1015-1028.

He, B, V Martin, and F Setterwall. 2004. "Phase Transition Temperature Ranges and Storage Density of Paraffin Wax Phase Change Materials." Energy 29 (11) (September): 1785-1804. doi:10.1016/j.energy.2004.03.002.

Humphries, William, and Edwin Griggs. 1977. "A Design Handbook for Phase Change Thermal Storage Control and Energy Storage Devices". National Aeronautics and Space Administration Scientific and Technical Information Office. http://hdl.handle.net/2060/19780007491.

Ismail, K. A. R., and M. M. Goncalves. 1999. "Thermal Performance of a PCM Storage Unit." Energy Conversion and Management 40: 115-138.

Ismail, K. A. R., and R. I. R. Moraes. 2009. "A Numerical and Experimental Investigation of Different Containers and PCM Options for Cold Storage Modular Units for Domestic Applications." International Journal of Heat and Mass Transfer 52 (19-20) (September): 4195-4202. doi: 10.1016/j.ijheatmasstransfer.2009.04.031.

Jesumathy, Stella P., M. Udayakumar, and S. Suresh. 2012. "Heat Transfer Characteristics in Latent Heat Storage System Using Paraffin Wax." Journal of Mechanical Science and Technology 26 (3): 959-965.

Jiji, Latif M., and Salif Gaye. 2006. "Analysis of Solidification and Melting of PCM with Energy Generation." Applied Thermal Engineering 26 (5): 568-575.

Kousksou, T., A. Jamil, T. El Rhafiki, and Y. Zeraouli. 2010. "Paraffin Wax Mixtures as Phase Change Materials." *Solar Energy Materials and Solar Cells* 94 (12): 2158-65.

Li, Gang, Yunho Hwang, and Reinhard Radermacher. 2012. "Review of Cold Storage Materials for Air Conditioning Application." International Journal of Refrigeration 35 (8): 2053-2077.

Masters, Gilbert M. 2004. Renewable and Efficient Electric Power Systems. Hobnoken, N.J.: John Wiley & Sons, Inc.

McAdams W H (1942). Heat Transmission, 2nd edn. New York: McGraw-Hill.

Regin, A. Felix, S. C. Solanki, and J. S. Saini. 2008. "Heat Transfer Characteristics of Thermal Energy Storage System Using PCM Capsules: A Review." Renewable and Sustainable Energy Reviews 12 (9) (December): 2438-2458. doi:10.1016/j.rser.2007.06.009.

Shamsundar, N, and Sparrow, E. M. 1975. "Analysis of Multidimensional Conduction Phase Change Via the Enthalopy Method". ASME. http://heattransfer.asmedigitalcollection.asme.org.ezproxy.lib.utexas.edu/article.aspx?art icleid=1436183.

Trip Doggett. 2013. "ERCOT—A Strategic View of the Future" presented at the Gulf Coast Power Association Fall Annual Conference, October 2. http://www.ercot.com/content/news/presentations/2013/GCPA-2Oct.2013FINAL.pdf.

U.S. Census Bureau. 2013. American Housing Survey for the United States: 2011. U.S. Government Printing Office. https://www.census.gov/content/dam/Census/programs-surveys/ahs/data/2011/h150-11.pdf U.S. Energy Information Administration. 2006. "Commercial Building Energy Consumption Survey". U.S. Energy Information Administration. http://www.eia.gov/consumption/commercial/about.cfm.

U.S. EIA Energy Information Administration. "Frequently asked Questions: How much electricity is used for cooling in the United States?". 21 Jan. 2012. [Accessed 10 Mar. 2013]. http://www.eia.gov/tools/faqs/faq.cfm?id=98&t=3

U.S. Energy Information Administration. 2013. Annual Energy Outlook 2013. Washington D.C.: U.S. Energy Information Administration. http://www.eia.gov/forecasts/aeo/pdf/0383(2013).pdf.

Wattles P (2011). ERCOT Demand Response—Overview and Status Report. Available at http://www.ercot.com/content/meetings/dswg/keydocs/2011/0830/3_ERCOT_presentation_workshop_083011.pdf.

Example 2. Improved Performance in Tube-Encapsulated Phase Change Thermal Energy Stores Using a Sufficiently Conductive Encapsulation Material Thermal energy stores can be used to shift building peak electric loads for cooling to off-peak hours. Compact, high-density thermal storage solutions are required for buildings that may not have the space necessary for typical thermal storage systems, such as chilled water tanks. Previous studies show that latent thermal stores using polymer tube-encapsulated paraffin-based phase change materials (PCM) yield acceptable thermal performance at low to moderate encapsulation tube packing densities, but that thermal performance falls as tube packing densities climb due to increasingly restricted heat transfer fluid (HTF) flow paths. This Example reports the experimental results found when using a sufficiently conductive encapsulation material to redistribute the thermal energy around the PCM, mitigating the effect of the restricted HTF flow paths and enabling maximum encapsulation tube packing densities. These experiments show a more than two-fold increase in the percentage of recoverable thermal energy over a similar polymer tube based system, providing thermal performance comparable to that of a low density polymer tube encapsulation system while increasing PCM capacity by 111%. Test results are provided in a format suitable for determining design criteria for larger thermal stores, and a design parameter—the resistance ratio—is used to determine encapsulation tube parameters.

Symbols Used in Example 2

A Area (general) [$m^2$]

$A_c$ Surface area associated with convection [$m^2$]

$A_t$ Cross-sectional area associate with conduction along the encapsulation tubes [$m^2$]

$A_p$ Area associated with conduction between the encapsulation tube and the PCM [$m^2$]

Figure 16:
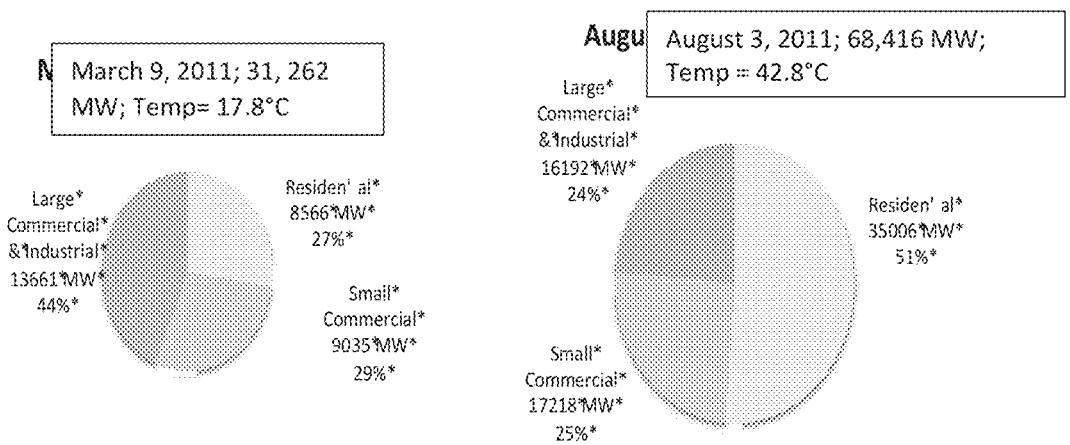
FIG. 16. Extrapolated impact of weather on peak electric loads in Texas. T=outdoor temperature in ° C. Note that the increase in peak power use resulting from weather-sensitive load is primarily due to an increase in energy use by residential customers, ostensibly associated with HVAC use.

Bi Biot number
C Constant associated with the geometry of hexagonal packed cylinders
$C_f$ Specific heat of heat transfer fluid [J/(kg·° K]
$D_h$ Hydraulic diameter (four times the area divided by the wetted perimeter) [m]
$E_{lat}$ Total latent energy in the thermal store [J]
$E_{rec}$ Fraction of total (latent and sensible) energy recovered during a discharge cycle
$E_{sen}$ Total sensible energy in the thermal store [J]
k C onductivity (general) [W/(m·° K)]
$k_f$ Conductivity of the heat transfer fluid (35% propylene glycol and water) [W/(m·° K)]
$k_p$ Conductivity of the PCM (tetradecane) [W/(m·° K)]
$k_t$ Conductivity of the encapsulation tube material [W/(m·° K)]
$K_r$ Dimensionless ratio of the net effective conductivity between adjoining materials
h Thermal convection coefficient [W/(m²·° K]
L Arbitrary length constant [m]
$L_k$ Characteristic length of conduction into a cylinder; used for Biot number [m]
$L_p$ Length constant associated with conduction into a cylinder (r/2) [m]
$L_t$ Length constant associated with conduction around the cylinder (rø) [m]
m Mass flow rate [kg/s]
Nu Nusselt number
$r_i$ Inside radius of the encapsulation tubing [m]
$r_o$ Outside radius of the encapsulation tube [m]
$R_c$ Resistance of convection between the HTF and the encapsulation tube [° K/W]
$R_k$ Resistance to conductivity in a cylinder (Biot number example) [° K/W]
$R_p$ Resistance of conduction between the PCM and the encapsulation tube [° K/W]
$R_r$ Ratio of the average radius of the encapsulation tube to the tube wall thickness
$R_t$ Resistance of conduction around the encapsulation tube [° K/W]
Q Volume flow rate of heat transfer fluid [liters/min]
t Time [s]
T Temperature (general) [° C. or ° K]
$T_p$ Average (expected) temperature of the frozen PCM [° C.]
$T_\infty$ Free-stream temperature of the HTF [° C.]
$T_{amb}$ Ambient temperature [° C. or ° K]
$T_{avg}$ Time-averaged output temperature
Subscripts
p PCM parameter
f Heat transfer fluid (HTF) parameter
t Encapsulation tube parameter Commercial and residential buildings consume more than 40% of the primary energy used in the United States, including 70% of all U.S. electricity [1]. Overall, 11% of electricity is used for environmental cooling applications in the U.S. [2]. The amount of electricity used for environmental cooling in the warmer southern climates of the U.S. can rise substantially above this average; it has been estimated that more than 20% of the annual electric consumption for residential buildings in the southern census region of the United States is used for cooling applications, and can go as high as 27% of annual electric load in the hot and humid climate of Florida [3]. As shown in FIG. 16, when concentrated into the summer cooling season weather-sensitive loads such as these can exceed 50% of peak summer electric demand [4]. Furthermore, the demand for residential and commercial cooling is expected to increase due to an ongoing shift in population towards warmer regions of the country [5].

The ability to shift peak cooling loads to off-peak periods, when existing underutilized base load generation capacity is available, can reduce the cost of electric power and improve returns on electric generation capital equipment investments [6]. Shifting of these cooling loads to periods of renewable energy availability can also mitigate the uncertainty in power generation accompanied by the increased use of intermittent renewable energy sources such as wind and solar power, while making better use of these renewable energy systems [7].

Actively-controlled thermal energy stores can provide the means to time-shift building cooling loads. An active thermal storage system works like a thermal battery, charging during periods of low electricity costs or high availability and discharging when electricity is scarce or expensive. These storage systems can be particularly effective at reducing peak energy demand and overall building energy costs for environmental systems when utility peak demand and/or time-of-day electric rates are in place [8,9]. A properly-sized thermal storage system can also reduce the required size and peak capacity of environmental cooling equipment, and thus reduce capital equipment costs, since the capacity of the equipment need only meet average rather than peak demand rates [10].

Water-glycol mixtures are a popular material used to store thermal energy in sensible form (as a change in temperature of a storage medium) since it has a relatively high heat capacity of between 3.7 and 4.2 kJ/(kg*K) depending on composition [11]. In addition, water-glycol based hydronic cooling systems are common [12], making integration of this type of thermal store with existing cooling systems simple and cost effective. However, the necessary chilled water tanks are large; while new buildings can be designed around such tanks, existing buildings may not have the space necessary to add a sensible chilled water thermal storage system. Given the long lifespan of existing residential and commercial structures (the median age of residential and commercial buildings in the U.S. is approximately 37 and 28 years, respectively [13,14]), the ability to retrofit thermal storage to existing buildings must be considered. For these retrofit applications, smaller, more compact high-density thermal stores may be required.

Such high density thermal stores can be developed using materials that store thermal energy in latent form, during a change in phase—for instance, from liquid to solid or gas to liquid—instead of in sensible form. Latent energy storage is characterized by a large enthalpy change at a constant (or with only a small change in) temperature. The result is that latent (phase change) systems can store thermal energy at a density an order of magnitude greater than that of a sensible (temperature change) system. For example, a chilled water system using a 35% propylene glycol to water ratio operating over a 9° C. temperature range can store approximately 32.1 kJ/kg, while a water-based ice thermal storage system can store upwards of 330 kJ/kg at a near-constant temperature of 0° C. [15].

Many materials can be used for latent thermal energy storage. These materials are collectively known as PCMs, or phase change materials. Typical PCMs suitable for use in environmental control thermal storage applications are generally restricted to liquid-solid phase changes for volumetric efficiency and ease of use [16]. While some liquid-gas phase transitions have high gravimetric thermal capacity, their volume changes and required operating pressures make them difficult to utilize [17]. Common liquid-solid phase PCMs include water (ice), organics such as paraffins or fatty acids, and salt hydrates [18-21].

Water as ice has successfully been used for years as a phase change thermal storage medium (i.e., the "icebox" from years past). However, water expands when frozen making containment difficult during phase cycling. In addition, water freezes at a temperature significantly lower than the 5-12° C. typically used for HVAC systems, requiring a separate chiller system for ice-based thermal storage and increasing overall HVAC system installation and operation costs [22,23]. Salt hydrates are caustic, tend to need subcooling (a requirement that they be cooled below their freezing point before crystallization is initiated), and suffer from phase segregation over repeated freeze-thaw cycles that limit their useful lifespan [24]. Paraffins and fatty acid hydrocarbons offer relatively high heats of fusions (~200 kJ/kg), chemical stability, no subcooling (self-nucleating), do not degrade with thermal cycling, are available in temperature ranges suitable for HVAC applications, and are compatible with most encapsulation materials [25-28]. They also tend to have poor thermal conductivity and are somewhat flammable, but these issues can be mitigated by thermal system design. The paraffin compound tetradecane shows promise for use in active cold thermal storage systems, as it has a phase change temperature suitable for environmental cooling use of between approximately 5.5 and 5.8° C. and a heat of fusion of approximately 215 kJ/kg [20,29].

A previous study has demonstrated that latent thermal stores constructed of tube-encapsulated paraffin-based PCMs show improved thermal storage densities over conventional sensible chilled water tanks [30]. Tube encapsulation is selected because it allows for a greater PCM density than spherical encapsulation; cylinders have a maximum packing density of 90.7% versus only 74.0% for spheres. In these experiments CPVC encapsulation tubes containing tetradecane as a PCM are packed into a tank in a pseudo-annular ring configuration, where the tubes are spaced such that each is surrounded by HTF (heat transfer fluid) that flows longitudinally along the vertically oriented encapsulation tubes. This configuration results in two dimensional heat transfer, in the r and z directions, within the encapsulation tubes and PCM. The study found that—when using laminar HTF flow at moderate encapsulation tube densities, where the cross sectional area of the encapsulation tubes equaled approximately half of the cross sectional area of the tank—this configuration allowed for approximately 80% of thermal store capacity to be recovered over a two hour period at an output temperature of <6.5°. This performance level is acceptable for reducing peak cooling loads, which typically occur over a 2 to 6 hour period.

Figure 17:
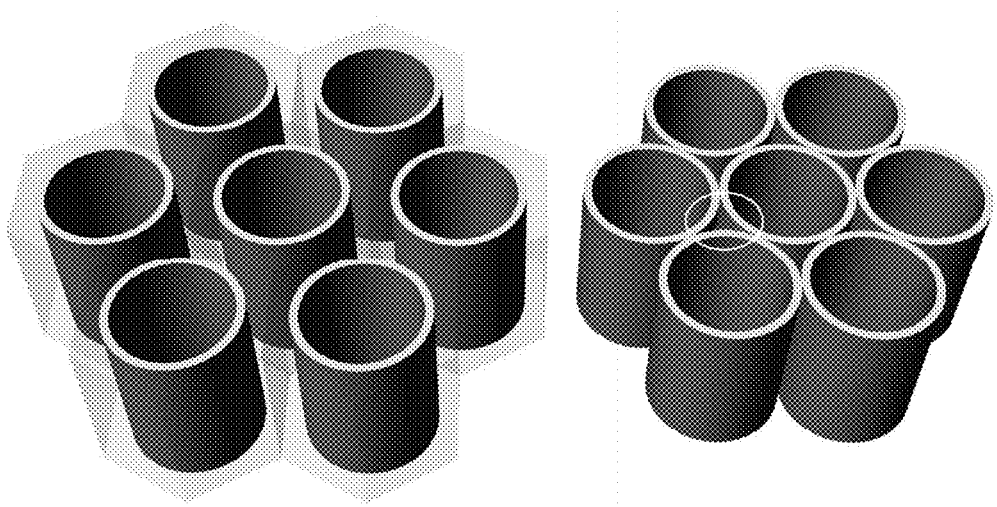
FIG. 17. Spaced vs. hexagonal-packed encapsulation tubes. The concentric hexagonal cylinders surrounding the spaced tubes represent the area available for HTF flow. For the hexagonal packed tubes, the area for HTF flow is limited to the indicated triangular-like areas formed by the confluence of the tubes.

However, as the packing density of the CPVC PCM encapsulation tubes reaches their maximum and the tubes assume a hexagonal-packed configuration, the annular flow path is reduced to six shared roughly triangular-shaped flow paths around each tube as shown in FIG. 17. While Nusselt number correlations exist for triangular pipe flow, these are average values; the convective heat transfer is not the same everywhere along the surface of the tubes due to the restricted fluid flow near the apexes of each triangular flow path. This causes the HTF flow to be unevenly distributed around each encapsulation tube, resulting in uneven thermal energy distribution to and into the encapsulation tubes. This forces the encapsulation tube material and PCM to redistribute the thermal energy around and into the PCM. Both the CPVC and PCM used by Bourne and Novoselac [30] have poor thermal conductivity, resulting in unacceptable thermal performance for the hexagonal packed configuration.

One method for resolving the poor performance of the hexagonal packed configuration is through the use of PCM conductivity enhancements. Previous studies have investigated the use of internal PCM conductivity enhancements, such as metallic foam or stainless steel lessing rings, to improve the effective conductivity of the PCM [31-33]. However, these methods add cost and reduce the PCM capacity of the thermal storage system by between 10 and 20%. In addition, the experiments of Bourne and Novoselac [30] indicate that the paraffin PCM tetradecane does have sufficient conductivity for the intended application, so long as the thermal energy is evenly distributed around small encapsulation tubes. As disclosed in this Example herein, another solution is the use of a sufficiently conductive encapsulation shell material to redistribute the thermal energy around the PCM and restore the two-dimensional (in r and L) heat transfer paradigm of the evenly-spaced pseudo annular ring packing configuration.

This Example investigates the use of a sufficiently conductive tube material as a means to redistribute thermal energy around the encapsulation tubes and into the PCM, restoring the even thermal distribution of the pseudo annular ring configuration while allowing for a higher-density hexagonal-packed configuration. A design parameter based upon a modified Biot number is proposed as a means of confirming the necessary physical properties for the PCM encapsulation tubes (size, thickness, and thermal conductivity), which can be used by designers to optimize the performance and cost of thermal stores of this type. Experiments are conducted using a densely-packed configuration of metallic encapsulation tubes, and the results compared to a previous study that used CPVC encapsulation.

The Methods section describes the development of the design parameter for encapsulation tube specifications. This section also describes the heat transfer fluid (HTF) and PCM used in this Example, the encapsulation tube type, the thermal store tank into which the encapsulation tubes are packed, the ancillary equipment and materials used for the thermal store apparatus, and the procedure used for testing in this Example. Test results, as well as a comparison to previous tests using CPVC encapsulation tubes [30], are given in the Results section.

Methods

An experimental thermal store design is constructed utilizing a PCM encapsulated in metallic cylindrical tubes and loaded into an insulated PVC tank in a dense hexagonal-packed configuration. The physical properties of the encapsulation tubes are chosen so as to meet the conditions prescribed by a design parameter proposed herein. The thermal performance of this configuration is tested by charging and discharging the thermal storage unit while monitoring the temperature of the HTF (heat transfer fluid) as it passes in and out of the thermal store. The results are compared to previous experiments that used the same PCM & tank design but a different encapsulation material.

Phase Change Material (PCM)

The PCM used in this Example is tetradecane, a paraffin. The properties of pure tetradecane, taken from the literature (as referenced in Table 1 of Example 1). A laboratory grade product of approximately 99% purity is selected over a technical grade product of 95% due to previous experiments, conducted by Bourne and Novoselac [35], that suggested a lowering of the freeze point to an unacceptable level was due to impurities in the technical grade product. This observation is supported by a previous studies [10] [36] conducted by using binary mixtures of tetradecane and hexadecane, which showed that a few percent of hexadecane in tetradecane could drop the freeze point by several degrees.

Paraffin-based PCMs can melt over a temperature range, rather than at a distinct fixed temperature [37]. Previous experiments by Bourne and Novoselac [30] utilizing 99% tetradecane as a PCM in a similar thermal store design have determined that the melting temperature range in this application is between approximately 4.5 and 6.5° C. This is an important consideration when designing a PCM-based thermal store; if the necessary output temperature is too low, then the thermal store may not fully cycle. This can reduce the effective capacity of the thermal store.

Heat Transfer Fluid

In this example, the HTF (heat transfer fluid) is a mix of distilled water containing 35% by volume propylene glycol. The pertinent properties of the HTF, evaluated at the mean thermal store operating temperature of 6.5° C., are shown in Table 4.

TABLE 4

Properties of 35% by volume propylene glycol in water at 6.5° C.

| Property | Value | Units | Source |
|---|---|---|---|
| Density | 1038 | kg/m³ | ASHRAE Fundamentals 2009 [11] |
| Kinematic viscosity | 6.73 × 10⁻⁶ | m²/s | |
| Conductivity | 0.394 | W/(m · °K) | |
| Heat capacity | 3735 | J/(kg · °K) | |

The discharge cycle flow rates are selected such that the thermal store can be discharged over a two to six hour period while maintaining a useable output temperature for as much of the discharge cycle as possible. A useable discharge temperature for chilled water HVAC applications is <6.5° C. Charge cycle flow rates are set at the maximum flow tested for the discharge cycle. HTF flow rates tested are constant during each test, but vary between runs at between 100 ml/min and 300 ml/min in 50 ml/min increments; charge cycles are all at 300 ml/min.

The Reynolds number for these flows, using this tank configuration, HTF, and a characteristic length based on the hydraulic radius of the flow paths, is on the order of one. This means that a laminar flow regime is maintained throughout the tests. While higher flow rates would produce turbulent flow, the required flow velocity through the tank would be at least 3 orders of magnitude greater than during these tests. This would result in a higher heat transfer rate, but would also result in little change to the temperature of the HTF as it passes through the store. Since an express purpose of the thermal store is to change the temperature of the HTF as it passes through the store, the flow rate must be restricted to flows such that the HTF residence time is high enough to affect the HTF temperature. Note that due to the small hydraulic diameter of the flow paths (~0.21 times the encapsulation tube radius), the heat transfer rates are high enough for the intended purpose, even with laminar flow.

PCM Encapsulation Design Parameter—Tubing Resistance Ratio

An encapsulation tube design parameter, the tubing resistance ratio, is proposed in this Example as a means to predict whether or not the physical properties and parameters of the encapsulation tube are capable of producing a well-distributed thermal condition around the PCM when a hexagonal packed configuration of encapsulation tubes is used. This parameter is modeled after a Biot number, but differs in that it compares the resistance of the encapsulation tube to redistribute thermal energy around itself to that of the resistance of passing the energy between both the HTF and the PCM. The physical basis and mathematical formula for this parameter is explained below.

Typical Biot number calculations compare the resistance of external convection with the resistance of internal conduction; for example, in the case of convection to a solid cylinder. Since the areas of convection and conduction are initially the same (at the surface of the cylinder), the area components cancel and the Biot number becomes a ratio of conductive to convective resistance, as shown in Equation 1, where $L_k$ is the characteristic length of conduction in the cylinder. When the Biot number is much less than 1 (by an order of magnitude) then it is assumed that the temperature within the conductive component does not vary with position, simplifying transient thermal problems [15]. This also suggests that temperature is well distributed throughout the conductive material in question.

$$R_c = \frac{1}{hA}, \; R_k = \frac{L_k}{kA}, \; Bi = \frac{R_k}{R_c} = \frac{hL_k}{k} \quad (1)$$

However, heat transfer to a body is not always the result of convection; heat transfer by conduction of adjacent materials is also possible. As a result, this calculation cannot be limited solely to applications involving the ratios of convective and conductive resistances; any combination of convective or conductive heat transfer must be considered. In addition, the areas associated with heat transfer to the surface of a material and conduction within it, based on tube geometry, may not always be the same. In such cases a modified form of the Biot number can be used. Such a modified form is used for the analysis of the needed physical properties of the encapsulation tubes in this study to insure that the thermal energy is well distributed around the encapsulated PCM.

Figure 19:
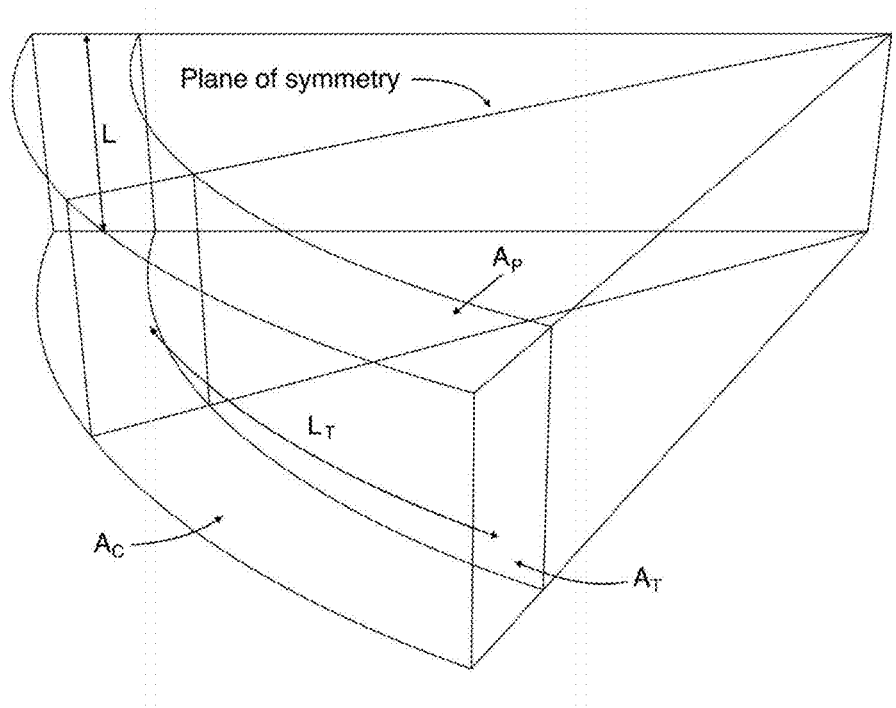
FIG. 19. Dimensional parameters used for the calculation of the resistance ratio: L=arbitrary vertical step; $L_t$=characteristic length of conduction in the encapsulation material; $A_c$, $A_t$, $A_p$=areas associated with convection, conduction in the encapsulation tube, and conduction in the PCM respectively.

The design parameter of resistance ratio is based on the numeric modeling element shown in FIG. 18. Each modeling element is comprised of a 7c/3 rad segment of an encapsulation tube (including the associated HTF, encapsulation material, and PCM), with a height equal to an arbitrary vertical step L. The outermost vertical interfaces of these elements are adiabatic, being in contact with identical surfaces of identical elements; however, horizontal faces are not adiabatic as there is a vertical temperature gradient between elements when the thermal store is operating. The physical basis for the development of the resistance ratio will be one half of the PCM and encapsulation tube of this numeric modeling element, as divided by the plane of symmetry for the element as shown in FIG. 19 (which for clarity does not show the HTF portion of the element).

To develop the resistance ratio, the thermal resistance is first calculated for heat transfer in each of the mediums—convection from the HTF to the encapsulation tube, conduction within the PCM, and conduction around the encapsulation tube. Equation 2 shows the calculation for the thermal resistance of convection to the encapsulation tube for a symmetry section of the numeric model segment. It is assumed that the thermal resistance for convection is based on the relevant surface area of the encapsulation shell and an average Nusselt number. The Nusselt number is estimated as 2.5, which corresponds to the Nusselt number for laminar flow in an equilateral triangular pipe [38]. The hydraulic diameter is calculated as four times the cross sectional area of the triangular-like HTF flow path divided by its wetted perimeter. Due to the relationship between hydraulic diameter and the convection surface area of the encapsulation tube in the hexagonal packed configuration, tube dimensional parameters cancel out and the resulting resistance is a constant function of the Nusselt number, HTF conductivity $k_f$, and an arbitrary length constant L (corresponding to the height of the modeling element).

$$R_c = \frac{1}{hA_c} = \frac{D_h}{Nu k_f A_c} = \frac{4\left(\sqrt{3} - \frac{\pi}{2}\right)r_o^2}{Nu k_f \frac{\pi}{6} r_o L} = \frac{12(2\sqrt{3} - \pi)}{\pi^2} \frac{1}{Nu \, k_f L} \quad (2)$$

The resistance of the PCM section is determined as it would normally be for a typical Biot number calculation involving a cylinder, with the characteristic length $L_p$ set equal to $r_i/2$ (the volume of an infinite cylinder divided by its surface area [15]). Note that due to the relationship between the characteristic length $L_p$ and the area of conduction $A_p$, the tube dimensional parameters cancel out and the resulting resistance is a constant function of the PCM conductivity $k_p$ and the arbitrary length constant L. The resulting thermal resistance calculation is shown in Equation 3.

$$R_P = \frac{L_p}{k_p A_p} = \frac{\frac{r_i}{2}}{k_p \frac{\pi}{6} r_i L} = \frac{3}{\pi} \frac{1}{k_p L} \quad (3)$$

It has been assumed that the thermal energy convected to the encapsulation tube surface is based on the surface area of the encapsulation shell and an average Nusselt number, but its distribution across the face of the encapsulation shell is unknown. Since our goal is to verify that the encapsulation shell can effectively redistribute the thermal energy around the PCM under the worst-case, most conservative conditions, it will further be assumed that the all of the convected energy enters the encapsulation shell at the line of symmetry and is conducted around the encapsulation shell. The characteristic length for conduction within the encapsulation tube $L_t$ is thus taken as the distance between the center of the encapsulation tube wall at the plane of symmetry and the center of the encapsulation tube wall at the edge of the modeling unit, where the apex of the triangular flow paths are formed by the intersection of the tubes. This conservative position also requires that the cross-sectional area of the tube segment $A_t$ be used for the area of conduction, since conduction is now assumed to be along the horizontal cross-section of the tube. The result is a calculation for the conservative (highest) resistance of the encapsulation tube shell as shown in Equation 4. Note that this is the only resistance calculation that retains encapsulation tube dimensional parameters.

$$R_t = \frac{L_t}{k_t A_t} = \frac{\frac{\pi}{6}\left(\frac{r_o + r_i}{2}\right)}{k_t (r_o - r_i) L} = \frac{\pi}{6} \frac{(r_o + r_i)/2}{(r_o - r_i)} \frac{1}{k_t L} \quad (4)$$

Figure 20:
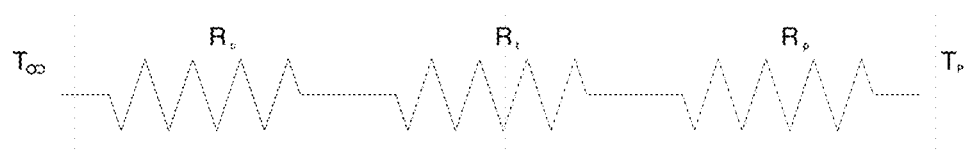
FIG. 20. A representation of a steady-state thermal circuit, consisting of three resistances (convection from the heat transfer fluid (HTF), conduction through the encapsulation tube, and conduction in the PCM) between two driving temperatures.

These resistances can be thought of as representing a steady-state thermal circuit between the free-stream temperature of the HTF $T_\infty$, and the frozen PCM $T_p$, as shown in FIG. 20. If the resistance along the encapsulation tube $R_t$ is much less than that of either the resistance to convection $R_c$ or the resistance to the conduction into the PCM $R_p$ (when $R_t/R_c$ and $R_t/R_p \ll 1$), then the temperature differential across $R_t$ is small and the temperature will be well-distributed in the encapsulation material.

The resulting resistance ratios $R_t/R_c$ (between the encapsulation tube and the HTF) and $R_t/R_p$ (between the encapsulation tube and the PCM) are shown in Equations 5 and 6. Both of these ratios must be $\ll 1$ for the temperature to be considered even throughout the encapsulation tube. Note that both of these equations resolve to the product of a dimensionless constant multiplier C based on the hexagonal packing geometry, a dimensionless geometry variable $R_r$ describing the ratio of the average tube radius to its wall thickness, and a dimensionless conductivity variable $K_r$ describing the conductivity ratio of the adjoining materials (including any Nusselt number modifier). These dimensionless quantities are summarized in Table 5.

$$\frac{R_t}{R_c} = \frac{\pi^3}{72(2\sqrt{3} - \pi)} \frac{(r_o + r_i)/2}{(r_o - r_i)} \frac{Nu \, k_f}{k_t} \quad (5)$$

$$\frac{R_t}{R_p} = \frac{\pi^2}{18} \frac{(r_o + r_i)/2}{(r_0 - r_i)} \frac{k_p}{k_t} \quad (6)$$

TABLE 5

Dimensionless quantities C, $R_r$ and $K_r$ for $R_t/R_c$ and $R_t/R_p$

| Resistance Ratio | C | $R_r$ | $K_r$ |
|---|---|---|---|
| $R_t/R_c$ | $\dfrac{\pi^3}{72(2\sqrt{3} - \pi)}$ | $\dfrac{(r_o + r_i)/2}{(r_o - r_i)}$ | $\dfrac{Nu \, k_f}{k_t}$ |
| $R_t/R_p$ | $\dfrac{\pi^2}{18}$ | | $\dfrac{k_p}{k_t}$ |

Existing convention for Biot number calculations require a resistance ratio of less than about 0.1, which is the criterion accepted here as well. The Nusselt number for flow in the roughly triangular flow paths is estimated at 2.5 as discussed previously. For the metallic tubes tested in this study, the two ratios compute to $R_t/R_c = 0.035$ and $R_t/R_p = 0.002$. For the CPVC tubes tested in the previous Example (See Example 1) the two ratios compute to $R_t/R_c = 38$ and $R_t/R_p = 2.4$. Note that of the two encapsulation tube types compared here, both of which have the same external radius, only the metallic tubes meet the criterion of 0.1 or less for the resistance ratios.

Experimental Apparatus

The PCM encapsulation system tested consists of a set of copper tubes. These are standard ½ (12.7 mm) type M thin-wall rigid copper tubes commonly used in plumbing systems. These tubes are selected to address availability and cost concerns, as well as for compliance with the resistance ratios <0.1 requirement. The pertinent physical properties of these tubes are shown in Table 6.

TABLE 6

Properties of ½" (12.7 mm) type M thin-wall copper tubing

| Property | Value | Units | Source |
| --- | --- | --- | --- |
| Outside radius | 0.007938 | m | ASTM B88-14 |
| Inside radius | 0.007227 | m | |
| Conductivity | 403 | W/(m · °K) at 6.5° C. | Incropera 2007 |
| Heat capacity | 385 | J/(kg · °K) | |

The encapsulation tubes are cut to a total finished length of 1.14m, including end caps. This length is arbitrarily chosen so as to maintain a manageable size for the test apparatus. Each tube is filled with 0.150 ml of PCM to a height of 0.908m. The completed tubes contain approximately 0.232 m of clear space above the liquid PCM to minimize internal pressure changes due to the expansion/contraction of the PCM during phase cycling.

The tank is constructed of standard 4 inch (0.102m) schedule 40 PVC pipe. The top and bottom of the tank utilize a combination of PVC and brass fittings to allow for water flow and instrumentation. A PVC pipe flange is installed near the top of the tank to facilitate disassembly, which allows for the installation and exchange of the PCM tubes. The main body of the tank is placed into a 0.305 m diameter cardboard form tube and supported by 0.102 m of polyurethane insulation board at its base. The remaining space around the tank is filled with polyurethane spray foam insulation. The upper portion of the tank is manually insulated with polyurethane foam batting and rigid foam insulation cut to size, then covered by a 0.305 m diameter cardboard cylinder.

A total of 31 encapsulated PCM tubes are placed in the thermal storage tank in a hexagonal packed configuration. Where this packing configuration meets the walls of the tank, gaps form between the tubes and tank. The total area of the gaps is large when compared to the free area between the tubes, and so to minimize their impact on HTF flow the larger gaps are plugged using ⅝ inch flexible vinyl tubing with sealed ends.

The temperature of the incoming and outgoing HTF is measured using Omega Engineering epoxy-encapsulated thermistors, part number 44033. These thermistors are positioned directly in the flow path of HTF to insure consistent measurements. The thermistors are connected to GW Instruments iNet-100 A/D data acquisition hardware using a precision 4.7 kohm resistor that provides excitation current. The resistor has an accuracy of +/−0.025%-20 ppm/° C. This configuration has a temperature measurement accuracy of +/−0.1° C. Temperature data is recorded at 10 second intervals during each test run.

HTF flow rates are measured using Omega Engineering Pelton-type turbine wheel flow meters, model number FLR1009, with a range of 50 to 500 ml/min. These produce a linear output voltage signal of 0 to 5 VDC corresponding to the flow rate. These devices have a repeatability of 0.2% of full scale flow within their allowed operating range. One flow meter is used for each of the inputs, but since the meters are unidirectional only one is in use during each test as needed by the test cycle (charge or discharge); the unused flow meter is bypassed. To improve accuracy of the flow measurements, the flow meters are calibrated at each use by directly measuring the output flow and comparing it to the reported flow rate at the beginning and end of each test run.

Figure 21:
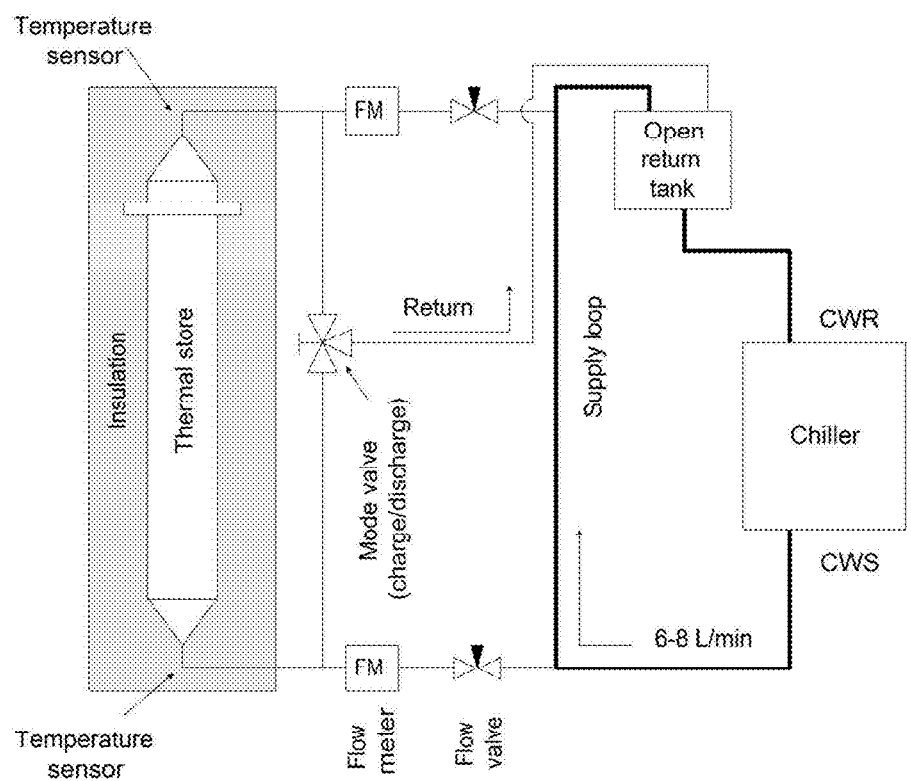
FIG. 21. Experiment schematic. The high flow supply loop provides chilled water at a stable temperature to the tank inlets. The loop allows the low-flow inlet tubes to be as short as possible to limit heat gain from the environment. The open return tank allows for flow rate confirmation during each test.

A Polyscience 5706T portable chiller unit supplies chilled water to the thermal storage tank through a high-flow-rate supply loop adjacent to the thermal store. The high-flow-rate loop prevents changes in the temperature of the supply due to residence time in the loop. Short, small diameter polyethylene tubing connects the thermal store inputs/outputs to the supply loop. The output from the thermal store is switched between the top and bottom of the tank, depending on mode (charge or discharge), with the output going to an intermediate tank to permit flow rate verification before returning to the Polyscience chiller. All tubes are insulated with foam rubber insulation to minimize losses. A schematic of the tank and its connections is shown in FIG. 21.

Experimental Procedure

During the charge cycle, HTF at approximately 2° C. is pumped into the bottom of the tank to freeze the PCM; in this mode the HTF warms as it passes from the bottom to the top of the tank. During the discharge cycle, chilled water at approximately 11° C. is pumped into the top of the tank to melt the PCM; in this mode the HTF cools as it passes from the top to the bottom of the tank. The 2° C. charge temperature is selected as low enough to fully freeze the PCM while still being within the capability of typical chilled water systems. The 11° C. temperature for the discharge cycle is selected as representative of a typical cooling coil chilled water return temperature.

By changing the direction of HTF flow depending on the cycle, a negative temperature gradient (measured from top to bottom) in the tank is preserved. This minimizes buoyancy-driven effects so as to prevent short-circuit flows through the tank. It also serves to encourage stratification within the tank.

At the end of each discharge cycle the system is allowed to attain a steady-state condition where the incoming water is at ~11° C. while the output temperature is slightly higher. The increase in water temperature results from thermal gains through the tank shell and insulation. These gains are calculated with respect to the overall tank in terms of W/° K, with ° K being the number of degrees kelvin difference between the average temperature in the tank and the ambient temperature. This rate is used to estimate losses through the tank during run time based on average tank and ambient temperatures. Losses are considered recoverable energy, since they can be prevented (and thus made available for recovery) through better insulation; in other words they are the result of insulation specification not the PCM, encapsulation, or internal tank design.

Experimental Error Analysis

The values used in the experimental calculations and their uncertainties are shown in Table 7. The relative uncertainty for values that operate over a range is determined using the median value of that range. Temperature uncertainty is taken directly from thermistor manufacturer data (based on NIST certification), while energy flow uncertainty is calculated from the relevant parameters. While the relative uncertainty of the loss rate is highest (LR in Table 7), the loss rate portion of the total energy calculation is small and contributed very little to the uncertainty of the total energy calculations.

TABLE 7

Experimental uncertainty values

| Description | Symbol | Value or range | Absolute error | Relative error* | Units | Source |
|---|---|---|---|---|---|---|
| $T_{in}$-$T_{out}$ | ΔT | 0-9° C. | 0.14 | 3.1% | C. | Calculated |
| Flow rate | $F_{lpm}$ | 0.100-0.300 | 0.003 | 1.5% | L/min | Measured |
| Density, HTF | $\rho_f$ | 1036 | 3 | 0.3% | kg/m² | |
| Heat capacity, HTF | $C_f$ | 3735 | 50 | 1.3% | J(kg K) | ASHRAE |
| $T_{amb}$-$T_{avg}$ | $\Delta T_{amb}$ | 12-21° C. | 1 | 6.1% | C. | Calculated |
| Loss rate | LR | 0.2-0.3 | 0.05 | 20.0% | W/K | Measured |
| Overall (energy calculation) | | | | 3.7% | | |

*The relative error for parameter values given as a range is calculated at the median value.

Results

Tests are performed on the thermal store with copper encapsulation tubes using multiple flow rates representative of expected loads on a per-unit basis. The results are compared to previous results using CPVC encapsulation tubes. Design guidelines are provided for similarly constructed thermal storage systems.

Thermal Store Test Results

Figure 22:
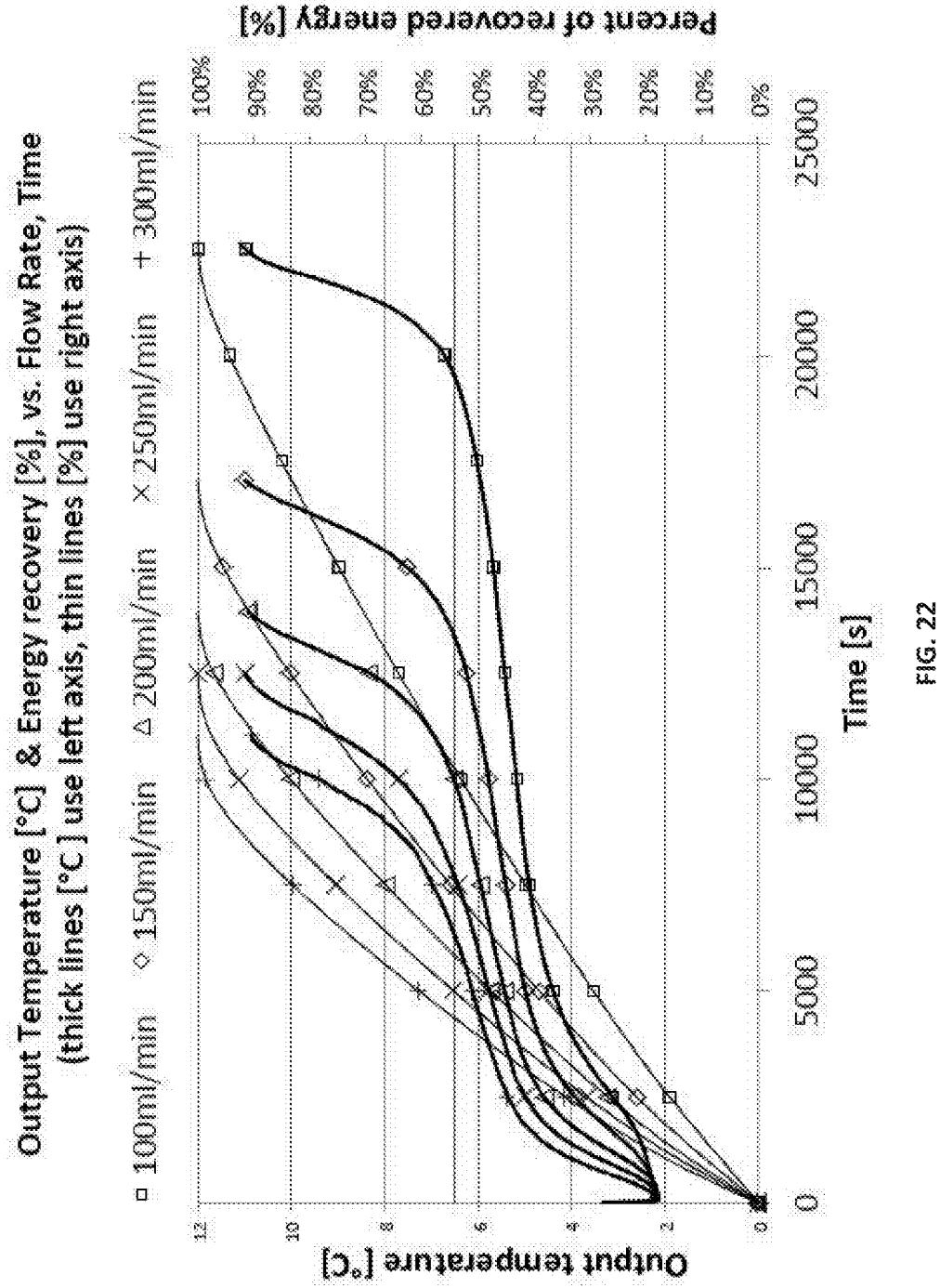
FIG. 22. Energy recovery vs. output temperature. A reference output temperature of T<=6.5 C is provided by the dashed line, but the data can be used for any output temperature. To use this graph, find where a temperature plot for a specific flow rate crosses the desire reference temperature, them move up to the corresponding energy line and read the recovery percent on the right axis.
Figure 23:
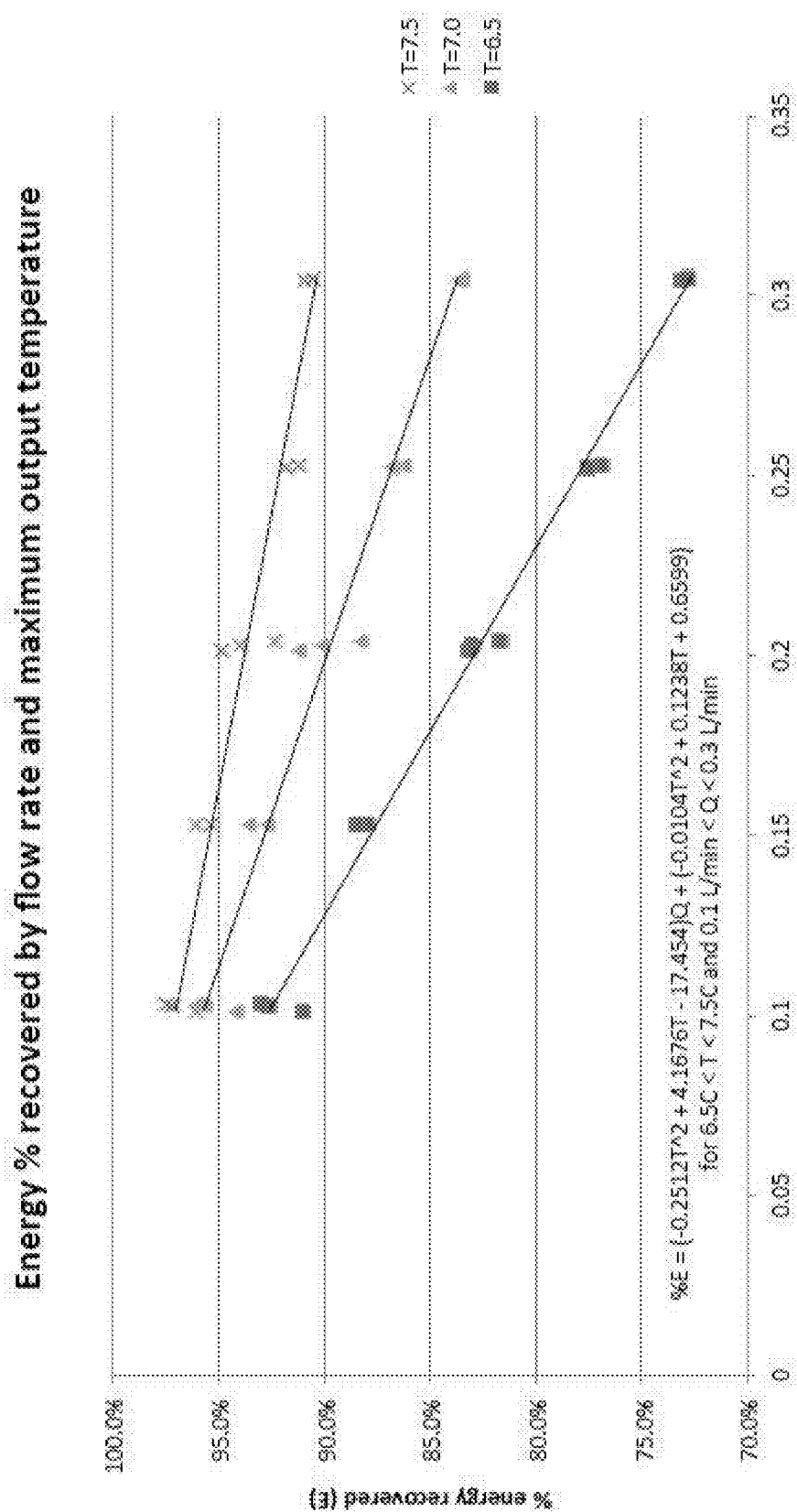
FIG. 23. Energy recovery rate as a function of flow rate and maximum allowed output temperature. The equation shown, based on a regression of the linear equations, is accurate to +/-2% when compared to experimental results.
Figure 24:
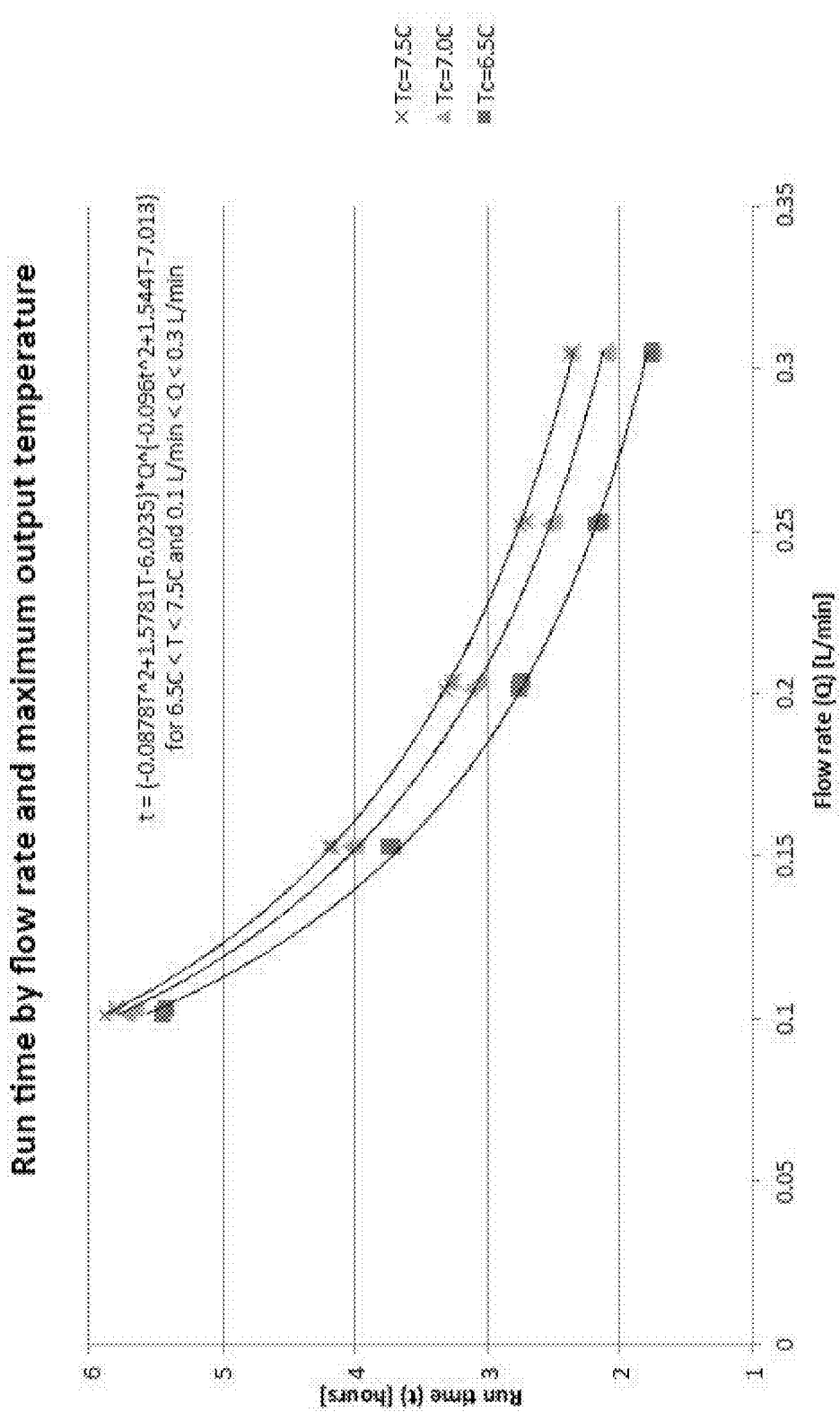
FIG. 24. Run time as a function of flow rate and maximum allowed output temperature for the experimental thermal storage tank. The equation shown, based on a regression of the power equations, is accurate to +/-3% when compared to experimental results.

The test results for the thermal store using copper encapsulation tubes are summarized in FIGS. 22 through 24. FIG. 22 gives the output temperature of the experimental thermal store and the net % of recovered energy with respect to time for flow rates between 100 and 300 ml/min in 50 ml/min increments (note that recovered energy includes losses through the tank wall, since it is possible to recover these losses with better insulation). The results show that for a usable output temperature of equal to or less than 6.5° C. (a minimum delta T of 4.5° C.), approximately 73% to 93% of total recoverable thermal storage capacity (sensible and latent) can be recovered depending on flow rate. These flow rates correspond to operating times of between 5.4 and 1.8 hours for 100 ml/min and 300 ml/min respectively, commensurate with a two to six hour peak power demand window.

FIG. 23 gives the percent of energy recovered based on the desired maximum output temperature and HTF flow rate. The output temperature range is restricted to temperatures greater than the melting range of the tetradecane PCM, which has been previously measured as between 4.5 and 6.5° C. [30]. Selecting an output temperature lower than the upper bound of PCM melting range will limit energy recovery and reduce the effectiveness of the thermal store. The flow rate range was selected to obtain discharge periods of between two and six hours, suitable for peak HVAC cooling load mitigation.

The data in FIG. 23 indicates that a greater percentage of energy can be recovered when higher output temperatures are allowed; this is due to the thermal store being able to run longer at any given flow rate before the higher maximum output temperature is reached. Lower flow rates are also shown to allow for more energy recovery because longer HTF residence times within the thermal store work to keep the output temperature lower further into the discharge cycle.

The energy recovery rate can be approximated by a linear equation of flow rate for each output temperature, as shown in FIG. 23, when limited to the tested flow rate range. However, it is expected that the energy recovery rates for all output temperatures will approach 100% as the flow rate approaches zero, and will asymptotically approach a small static value equal to the thermal energy stored in the HTF present in the tank as the flow rate approaches its maximum.

As a result, while a linear equation may be capable of representing the energy recovery rate over the examined flow rates, it is not linear over the full range of possible flow rates.

FIG. 24 gives the run time in hours based on the example maximum output temperatures (between 6.5° and 7.5° C.) and HTF flow rates (between 0.1 and 0.3 L/min). Like the data in FIG. 23, this data shows that run times increase with higher allowed output temperatures and lower flow rates. The data in FIG. 24 may be explained by considering an energy balance between the HTF flow and the thermal store capacity, as shown in Equation 7.

$$mC_f(T_{in} - T_{avg})t = (E_{sen} + E_{lat})E_{rec} \rightarrow t = \frac{(E_{sen} + E_{lat})E_{rec}}{mC_f(T_{in} - T_{avg})} \quad (7)$$

For the purposes of the energy balance, it is assumed that the input temperature (Tin) is fixed, as it has been in these experiments. $T_{avg}$ is defined as the time-averaged output temperature of the thermal store over the discharge run. $E_{sen}$ and $E_{lat}$ are the total sensible and latent thermal energy in the store, while $E_{rec}$ is the fraction of total thermal energy recovered during the discharge run. $C_f$ and m are the specific heat and mass flow rate (density times volume flow rate) of the HTF respectively. Reorganizing the equation as shown in Equation 7 demonstrates that the run time t is proportional to the energy recovery rate and inversely proportional to the mass flow rate and time-averaged output temperature.

Note that $E_{rec}$ has been shown in FIG. 23 to be an approximately linear function of the flow rate over the range of flow rates tested. Also, note from FIG. 22 that as flow rates increase so do output temperatures, indicating that $T_{avg}$ is also a function of flow rate. Given the placement of $E_{rec}$, $T_{avg}$, and m in Equation 7 and the fact that they are all functions of the flow rate, this suggests that run time is a power function of flow rate. A regression of the test data in FIG. 24 shows that run time can be approximated by a power function of flow rate for each maximum output temperature and flow rate range considered in these experiments.

The data in FIG. 23 can also be used to predict the recovery rate for thermal storage tanks of larger diameter than the experimental tank, so long as the same type and length of PCM and encapsulation tubes are used. This is possible because the hexagonal packing produces a near-constant cross-sectional ratio of PCM to tank area. Increasing the cross-sectional area of the tank (and thus the corresponding encapsulation tube count and cross-sectional area) will increase the allowed flow rate for each specific temperature and recovery rate. The increase in allowed flow rate is based on the ratio of the tank cross-sectional area to that of the experimental tank. For instance, doubling the cross-sectional area of the tank will allow for twice the volumetric flow rate for any given output temperature and recovery rate. However, these values should be considered conservative estimates due to an increase in packing efficiency (the ratio of total encapsulation tube cross-sectional area to the cross sectional area of the thermal store) as the tank becomes larger. The experimental store has a packing efficiency, when the filler rods are considered, of 86.7%, while hexagonal packed circles in an infinitely large plane can reach a 90.7% overall packing efficiency [39]. As the tank diameter becomes larger the packing efficiency will have a tendency towards, but never quite reach, this theoretical limit.

FIG. 23 can also be used to conservatively predict energy recovery rates for taller tanks that utilize the same PCM and encapsulation tube size. Adding height to the top of the tank provides capacity that will be discharged before the lower portion of the tank, thus increasing the overall recoverable capacity of the thermal store without adding unrecoverable capacity. This results in recovery rates that will always be at least as high as those for the experimental tank for any taller tank. Similarly, conservative estimates for run times can be made in the same manner utilizing the data from FIG. 24.

A multivariable regression method [40] is used to develop the empirical equations shown in FIGS. 23 and 24. These equations are functions of maximum output temperature ($6.5°$ C.$\leq T \leq 7.5°$ C.) and flow rate ($0.1$ L/min$\leq Q \leq 0.3$ L/min), and provide either the recovered energy percentage or run time as indicated.

Table 8 summarizes the flow rate, energy recovery, and run time results for copper tubes, and also includes this data from previous experiments involving CPVC encapsulation for comparison [30].

TABLE 8

Flow rate, energy recovery, and run time for copper and CPVC tubes

| Encapsulation material | # of tubes | Flow rate [ml/min] | Net energy recovered (T < 6.5°) | Run time [hours] (T < 6.5° C.) |
|---|---|---|---|---|
| Copper | 31 | 100 | 93% | 5.4 |
| Copper | 31 | 150 | 88% | 3.7 |
| Copper | 31 | 200 | 83% | 2.8 |
| Copper | 31 | 250 | 77% | 2.1 |
| Copper | 31 | 300 | 73% | 1.8 |
| CPVC | 31 | 100 | 43% | 2.0 |
| CPVC | 19 | 100 | 88% | 3.3 |

Comparison to Previous Results

Figure 25:
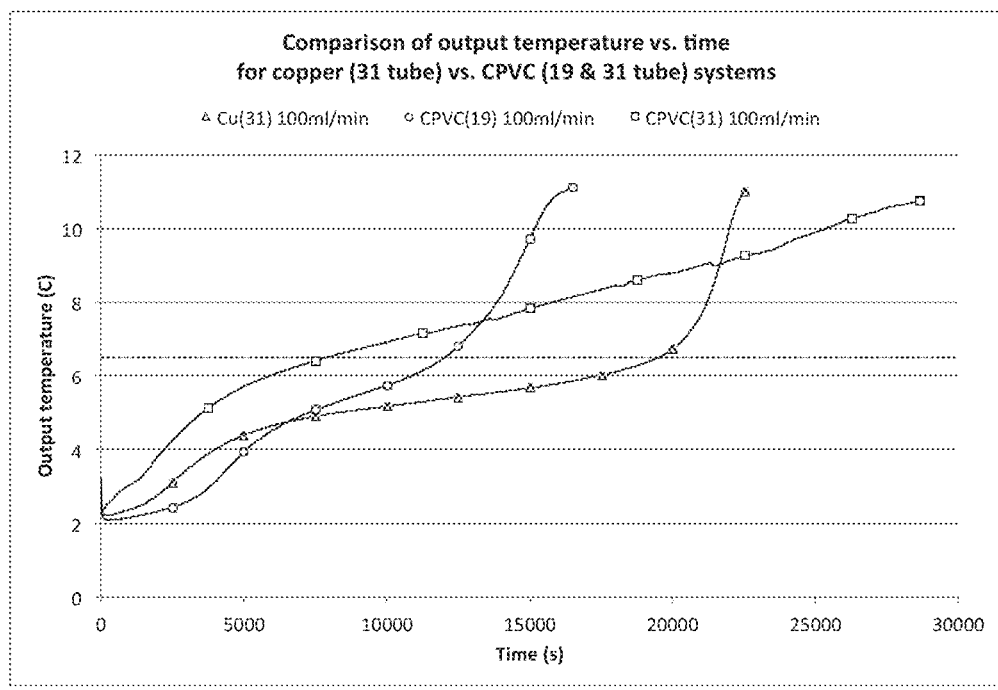
FIG. 25. A comparison of performance between CPVC and copper encapsulation tubes. Note that both the 19 tube CPVC and 31 tube copper encapsulation tubes produced acceptable results with 88% and 93% of energy recovered, although the 31 tube copper system offered a much higher thermal capacity.
Figure 26:
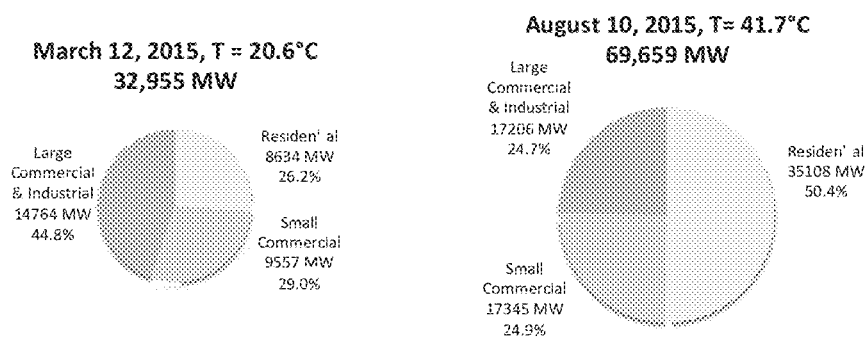
FIG. 26. The impact of weather-sensitive HVAC operations on total electric demand, as determined by ERCOT [Wattles 2013]. T=outdoor temperature in ° C. Note that the increase in peak power use resulting from weather-sensitive load is primarily due to residential and small commercial customers.

Previous results [30] are based on CPVC encapsulation tubes packed into a nearly identical tank. These experiments used both a high-density and low-density configuration of encapsulation tubes. The high density configuration consisted of 31 CPVC tubes in a hexagonal packed configuration, which is the highest density supported in the tank and is represented by the packing shown on the right in FIG. 17. The high density configuration is identical to the 31 tube packing for the copper tubes utilized in the current experiments, as the copper and CPVC tubes have the same outside diameter, and results in tube packing density (cross sectional area of tubes compared to the free cross sectional area of the tank) of ~87%. The low density configuration consisted of 19 tubes evenly spaced in the tank using tube-mounted spacer rings. This produces the pseudo annular ring packing as represented by the packing shown on the left of FIG. 17, and results in a tube packing density of ~46%. It should be noted that the CPVC tubes, due to their thicker walls, contain less PCM than the copper tubes of the current experiment (116 ml versus 150 ml/tube), and thus have a lower thermal storage density. A comparison of the results between these two sets of experiments is shown in FIG. 25 and with data organized in Table 8.

The previous study found that the high-density configuration of CPVC tubes performed poorly, allowing only 43% of the stored thermal energy to be recovered at a useable (<6.5° C.) temperature. The copper encapsulation tubes with the same configuration and flow rate presented in this study allowed recovery of up to 93% of stored thermal energy, more than double that of the CPVC tubes. Also, the thinner walls of the copper tubes provided a 29% increase in PCM capacity.

The previous study also found that the low density CPVC configuration, where the pseudo annular ring packing allowed the HTF to flow evenly around the encapsulation tubes, had acceptable thermal performance but at a lower PCM density. Up to 88% of the thermal energy could be recovered in this configuration. The hexagonal packed copper tubes used in the current study performed in a similar manner, recovering up to 93% of stored thermal energy while increasing PCM capacity by 111% over the CPVC tube pseudo annular ring configuration. This demonstrates that sufficiently conductive encapsulation tubes can mitigate the effects of the restricted HTF flow paths resulting from the hexagonal packed configuration, providing pseudo annular ring performance at hexagonal packed thermal storage densities.

Discussion on Encapsulation Materials

Similarly sized encapsulation tubes that meet the requirements of the resistance ratio defined herein (copper tubes) performed better in tests than those that did not (CPVC tubes). However, the copper tubes tested here are based on readily available components that do not optimize the resistance ratio Minimizing the wall thickness of the encapsulation tubes while maintaining compliance with the resistance ratio requirements will minimize material costs and maximize the thermal storage density of the system. In addition, other encapsulation materials may provide a lower-cost option than the copper tubes tested in these experiments.

Larger diameter tubes will also reduce encapsulation costs on a per PCM volume basis (by reducing the tube count per unit of PCM), but will also increase the time required to discharge the PCM due to the increased resistance to heat transfer through the deeper inner layer of poorly-conducting PCM. This will also limit flow rates for acceptable heat recovery levels and output temperatures. Additional tests or modeling will be required to determine the range of tubing sizes that have the capability to produce acceptable performance levels. However, encapsulation tube sizes on the order of those used in these experiments have shown to be capable of acceptable heat transfer and recovery rates for time-shifting of environmental cooling loads. The analysis here will be limited to encapsulation tubes of the same outside diameter as used in these experiments.

When the resistance ratios, as defined in their dimensionless form (Table 5), are required by definition to be less than 0.1 for acceptable performance, inequalities can be defined as shown in Equation 8.

$$0.1 > CR_r K_r \rightarrow R_r < \frac{0.1}{CK_r} \quad (8)$$

These inequalities can be solved for the maximum permissible value of $R_r$ as a function of C and $K_r$ for both $R_t/R_c$ and $R_t/R_p$ using the values found in Table 5. $R_r$ can then be solved for $r_i$ based on $r_o$. For example, performing this calculation using the same 35% propylene glycol HTF, 99% tetradecane PCM, and copper tubing material results in required $R_r$ values of less than 30.6 and 490 for Rt/Rc and Rt/Rp respectively. Solving for $r_i$ using $r_0$=0.007938 m (the outside diameter of both the copper and CPVC encapsulation tubes) gives values of 0.007683 m and 0.007921m, with the controlling value being the smaller inside radius of 0.007684 m (which corresponds to the thicker encapsulation shell). This results in an encapsulation wall thickness less than ⅓ of that used in the copper tubes tested in this study, increasing PCM mass by 13%. Repeating these calculations for an alternative encapsulation material, such as aluminum ($K_e$=237 W/(m·° K) [15]) gives an inside radius of 0.007509 m, increasing PCM mass by 8% over the tested copper tubes. A similar analysis for CPVC tubes indicate that it is not possible to meet the resistance ratio requirements with the same outside radius as the copper tube used in this study.

SUMMARY

This Example has investigated methods to improve the storage density and performance of tube-encapsulated PCM-based thermal systems. Experiments are performed using a highly-conductive encapsulation tube material designed to improve thermal energy distribution around the encapsulated PCM, thus allowing for higher tube densities. The results show that performance issues, such as low recovery rates and long run times, resulting from a dense hexagonal packing of polymer encapsulation tubes can be mitigated by properly sizing the tubes and by constructing the tube shells of conductive materials that are capable of redistributing the thermal energy around the encapsulated PCM. The use of this method prevents the need to apply internal conductivity enhancements to the PCM, which would increase costs and reduce the capacity of the thermal store.

A comparison of performance between ASTM-standard ½ inch copper and CPVC tube encapsulation systems shows a more than two-fold increase in recoverable energy at comparable tube densities, or an increase of up to 111% in PCM capacity while maintaining comparable thermal performance, for the copper tubes used in this study. The tests also show that this thermal store design, when using encapsulation tubes having an approximate outside diameter of 0.625 inches (~15 mm), can provide a performance level suitable for use in building cooling load applications, allowing the recovery of between 73% and 93% of stored energy over a 1.8 to 5.4 hour time window. Design guidelines are provided for scaling of the test configuration to various storage system capacities, using the same type and size of encapsulation tubes as utilized here.

In addition, a dimensionless design parameter—the resistance ratio—is used as a means of determining the necessary conductivity and dimensional parameters of encapsulation tubes. The resistance ratio parameter provides design guidance to allow for acceptable thermal store performance while optimizing thermal store capacity and minimizing encapsulation costs.

While the performance results in this Example are specific to thermal stores utilizing ½ inch CPVC and copper pipes meeting ASTM standards [41,42], the resistance ratio may be applied to other encapsulation tube configurations to optimize the performance of similarly constructed thermal stores.

REFERENCES CITED IN EXAMPLE 2

[1] U.S. Energy Information Administration. 2015a. "Monthly Energy Review—Energy Information Administration." Accessed September 1. http://www.eia.gov/totalenergy/data/monthly/index.cfm#consumption.
[2] U.S. Energy Information Administration. 2015b. "Use of Electricity—Energy Explained, Your Guide To Understanding Energy—Energy Information Administration." Accessed September 1. http://www.eia.gov/energyexplained/index.cfm?page=electricity_use.
[3] U.S. Energy Information Administration. 2015c. "Residential Energy Consumption Survey (RECS)—Data—U.S. Energy Information Administration (EIA)." Accessed September 1. http://www.eia.gov/consumption/residential/data/2009/index.cfm?view=consumption.
[4] Doggett, Trip. 2013. "ERCOT—A Strategic View of the Future." presented at the Gulf Coast Power Association Fall Annual Conference, October 2. http://www.ercot.com/content/news/presentations/2013/GCPA—2 Oct. 2013 FINAL.pdf.
[5] U.S. Energy Information Administration. 2015d. "Annual Energy Outlook 2015 with Projections to 2040." DOE/EIA-0383 (2015). Washington, D.C.: U.S. Energy Information Administration. http://www.eia.gov/forecasts/aeo/.
[6] Bentley, W. G., and John C. Evelyn. 1986. "Customer Thermal Energy Storage a Marketing Opportunity for Cooling off Electric Peak Demand" *Power Systems, IEEE Transactions on* 1 (4): 57-61.
[7] Hermanns, Holger, and Holger Wiechmann 2009. "Future Design Challenges for Electric Energy Supply." In *Emerging Technologies & Factory Automation,* 2009. ETFA 2009. IEEE Conference on, 1-8. http://ieeexplore.ieee.org/xpls/abs_all.jsp?arnumber=5347150.
[8] Hajiah, Ali, and Moncef Krarti. 2012. "Optimal Control of Building Storage Systems Using Both Ice Storage and Thermal Mass—Part I: Simulation Environment." *Energy Conversion and Management,* April. doi:10.1016/j.enconman.2012.02.016.
[9] Hajiah, Ali, and Moncef Krarti. 2012. "Optimal Controls of Building Storage Systems Using Both Ice Storage and Thermal Mass—Part II: Parametric Analysis." *Energy Conversion and Management* 64 (December): 509-15. doi:10.1016/j.enconman.2012.02.020.
[10] He, Bo, E. Mari Gustafsson, and Fredrik Setterwall. 1999. "Tetradecane and Hexadecane Binary Mixtures as Phase Change Materials (PCMs) for Cool Storage in District Cooling Systems." *Energy* 24 (12): 1015-28.
[11] American Society of Heating, Refrigerating and Air-Conditioning Engineers. 2009.
2009 *ASHRAE Handbook: Fundamentals.* American Society of Heating, Refrigeration and Air-Conditioning Engineers.
[12] Kuehn, Thomas H., James W. Ramsey, and James L. Threlkeld. 1998. *Thermal Environmental Engineering.* 3rd ed. Upper Saddle River, N.J.: Prentice-Hall.
[13] U.S. Census Bureau. 2013. "American Housing Survey for the United States: 2011." H150/11. U.S. Government Printing Office. https://www.census.gov/content/dam/Census/programs-surveys/ahs/data/2011/h150-11.pdf.
[14] U.S. Energy Information Administration. 2006. "Commercial Building Energy Consumption Survey." U.S.

Energy Information Administration. http://www.eia.gov/consumption/commercial/about.cfm.

[15] Incropera, Frank, David Dewitt, Theodore Bergman, and Adrienne Lavine. 2007. *Fundamentals of Heat and Mass Transfer.* 6th ed. Hoboken, N.J.: John Wiley and Sons.

[16] Regin, A. Felix, S. C. Solanki, and J. S. Saini. 2008. "Heat Transfer Characteristics of Thermal Energy Storage System Using PCM Capsules: A Review." *Renewable and Sustainable Energy Reviews* 12 (9): 2438-58. doi:10.1016/j.rser.2007.06.009.

[17] Mehling, Harald, and Luisa F. Cabeza. 2008. *Heat and Cold Storage with PCM: An Up to Date Introduction Into Basics and Applications.* Berlin: Springer.

[18] Abhat, A. 1983. "Low Temperature Latent Heat Thermal Storage: Heat Storage Materials." *Solar Energy Vol* 30 (4): 313-32.

[19] Agyenim, Francis, Neil Hewitt, Philip Eames, and Mervyn Smyth. 2010. "A Review of Materials, Heat Transfer and Phase Change Problem Formulation for Latent Heat Thermal Energy Storage Systems (LHTESS)." *Renewable and Sustainable Energy Reviews* 14 (2): 615-28. doi:10.1016/j.rser.2009.10.015.

[20] Hale, D, M Hoover, and M O'Neill. 1971. "Phase Change Materials Handbook."
NASA CR-61363. Huntsville, Ala.: Lockheed Missies and Space Company. http://hdl.handle.net/2060/19720012306.

[21] Humphries, William, and Edwin Griggs. 1977. "A Design Handbook for Phase Change Thermal Storage Control and Energy Storage Devices." National Aeronautics and Space Administration Scientific and Technical Information Office. http://hdl.handle.net/2060/19780007491.

[22] Li, Gang, Yunho Hwang, and Reinhard Radermacher. 2012. "Review of Cold Storage Materials for Air Conditioning Application." *International Journal of Refrigeration* 35 (8): 2053-77.

[23] Dimaano, Maria Natalia R., and Takayuki Watanabe. 2002. "The Capric-lauric Acid and Pentadecane Combination as Phase Change Material for Cooling Applications." *Applied Thermal Engineering* 22 (4): 365-77.

[24] Farid, Mohammed M, Amar M Khudhair, Siddique Ali K Razack, and Said Al-Hallaj. 2004. "A Review on Phase Change Energy Storage: Materials and Applications." *Energy Conversion and Management* 45 (9-10): 1597-1615. doi:10.1016/j.enconman.2003.09.015.

[25] Feldman, D., M. M. Shapiro, and D. Banu. 1986. "Organic Phase Change Materials for Thermal Energy Storage." *Solar Energy Materials* 13 (1): 1-10.

[26] Feldman, D., M. M. Shapiro, D. Banu, and C. J. Fuks. 1989. "Fatty Acids and Their Mixtures as Phase-Change Materials for Thermal Energy Storage." *Solar Energy Materials* 18 (3): 201-16.

[27] He, B, V Martin, and F Setterwall. 2004. "Phase Transition Temperature Ranges and Storage Density of Paraffin Wax Phase Change Materials." *Energy* 29 (11): 1785-1804. doi:10.1016/j.energy.2004.03.002.

[28] Baetens, Ruben, Bjørn Petter Jelle, and Arild Gustaysen. 2010. "Phase Change Materials for Building Applications: A State-of-the-Art Review." *Energy and Buildings* 42 (9): 1361-68. doi:10.1016/j.enbuild.2010.03.026.

[29] Lide, David R. 2001. *Handbook of Chemistry and Physics.* 82nd ed. Boca Raton, Fla.: CRC Press LLC.

[30] Bourne, Stephen, and Atila Novoselac. 2015. "Compact PCM-Based Thermal Stores for Shifting Peak Cooling Loads." *Building Simulation*, July. doi:10.1007/s12273-015-0243-6.

[31] Fan, Liwu, and J. M. Khodadadi. 2011. "Thermal Conductivity Enhancement of Phase Change Materials for Thermal Energy Storage: A Review." *Renewable and Sustainable Energy Reviews* 15 (1): 24-46.

[32] Chun-Long Chen, and Nihad Dukhan. 2012. "Metal-Foam Enhanced PCM Storage System: The Cylinder-in-Cylinder Geometry." *ASHRAE Transactions*.

[33] Velraj, R., R. V. Seeniraj, B. Hafner, C. Faber, and K. Schwarzer. 1999. "Heat Transfer Enhancement in a Latent Heat Storage System." *Solar Energy* 65 (3): 171-80.

[34] Kousksou, T., A. Jamil, T. El Rhafiki, and Y. Zeraouli. 2010. "Paraffin Wax Mixtures as Phase Change Materials." *Solar Energy Materials and Solar Cells* 94 (12): 2158-65.

[35] Bourne, Steve, and Atila Novoselac. 2014. "Compact Phase Change Based Thermal Storage: Experimental Apparatus, Methodology, and Results." *ASHRAE Transactions* 120 (1): 1-8.

[36] Choi, Eunsoo, Young I. Cho, and Harold G. Lorsch. 1992. "Thermal Analysis of the Mixture of Laboratory and Commercial Grades Hexadecane and Tetradecane." *International Communications in Heat and Mass Transfer* 19 (1): 1-15.

[37] He, Bo, and Fredrik Setterwall. 2002. "Technical Grade Paraffin Waxes as Phase Change Materials for Cool Thermal Storage and Cool Storage Systems Capital Cost Estimation." *Energy Conversion and Management* 43 (13): 1709-23.

[38] Cengel, Yunus A., Robert H. Turner, and John M. Cimbala. 2008. *Fundamentals of Thermal-Fluid Sciences.* 3rd ed. New York, N.Y.: McGraw Hill.

[39] Bezdek, Andréas, and Wlodzimierz Kuperberg. 1990. "Maximum Density Space Packing with Congruent Circular Cylinders of Infinite Length." *Mathematika* 37 (01): 74-80.

[40] Stoecker, W. F. 1989. *Design of Thermal Systems.* 3rd ed. McGraw-Hill.

[41] ASTM. 2014a. "Standard Specification for Seamless Copper Water Tube." ASTM International.

[42] ASTM. 2014b. "Standard Specification for Chlorinated Poly(Vinyl Chloride) (CPVC) Plastic Hot- and Cold-Water Distribution Systems." ASTM.

Example 3. Design Guidelines for High-Density Thermal Storage Systems Utilizing Hexagonal Packed Tube Encapsulated PCM HVAC cooling loads can be a large part of peak electric demand, particularly in hot and humid climates. Overall, 13% of residential and 10% of commercial electricity consumption is used for HVAC cooling operations in the U.S., but can account for as much as 27% of electricity use for residences in hot and humid climates. The ability to time-shift these cooling loads to off-peak hours, or to periods when intermittent energy generation is available, can reduce the cost of electric power and make better use of renewable energy resources. Thermal energy storage systems can be used for this purpose; however, a compact high-density solution is required for retrofit applications where large sensible energy thermal energy stores are impractical.

This Example investigates a high-density latent thermal energy storage system utilizing tube-encapsulated phase change material for HVAC cooling load applications. A numerical model is developed and validated against existing test data, and a parametric analysis is performed to determine the impact of encapsulation tube radius, length, and quantity on thermal store performance and capacity. Guidelines are provided for engineers seeking to implement this design for specific applications, and an example of using the parametric data for this purpose is provided.

Symbols Used in this Example
$\alpha_f$ Thermal diffusivity of the heat transfer fluid [m2/s]
A Area (general) [m2]
$A_a$ Area associated with advection [m2]
$A_c$ Area associated with convection [m2]
$A_k$ Area associated with conduction [m2]
a Constant (general)
$C_f$ Specific heat of the heat transfer fluid
$D_h$ Hydraulic diameter [m]
$\varepsilon_p$ PCM fraction of cross sectional area of thermal store [%]
$\varepsilon_r$ Energy recovery fraction [%]
$H_{(t)}$ Latent enthalpy of a model volume element at time t
Hf Heat of fusion [J]
h Thermal convection coefficient [W/(m2·° K]
k Conductivity (general) [W/(m·° K)]
$k_{eff}$ Conductivity, effective (general) [W/(m·° K)]
L Length (general) [m]
Nu Nusselt number [ ]
$\rho_f$ Density of heat transfer fluid [kg/m3]
$P_r$ Prandtl number [ ]
r Radius [m]
Re Reynolds number [ ]
Reo Outside radius of the encapsulation tube(s) [m]
Rei Inside radius of the encapsulation tube(s) [m]
T Temperature (general) [° C. or ° K]
$T_m$ Temperature at which PCM begins to melt [C]
$T_s$ Temperature at which PCM begins to solidify
t Time (general) [s]
$\Delta t$ Time step interval [s]
$V_f$ Volume associated with a HTF node [m3]
w Vertical heat transfer fluid velocity [m/s]
z Vertical dimension (general) [m]
$z_R$ Reference vertical dimension (for graph); 1, 2, or 3 m
$\Delta z$ Vertical step dimension or change in vertical height [m]
Subscripts
p PCM parameter
f Heat transfer fluid (HTF) parameter
s Surface of encapsulation tube
t Encapsulation tube parameter
m Row identifier
n Column identifier
Superscripts
t time parameter [s]

HVAC cooling loads can be a large part of peak electric demand, particularly in hot and humid climates. For example, 13% of electricity consumption is used for building HVAC operations in the U.S. [1], but can account for as much as 27% of electricity use for residences in some southern tropical areas, such as Florida [2]. During the summer season, HVAC cooling loads can rise dramatically; the Energy Reliability Council of Texas (ERCOT) reports that up to 53% of their peak electric load during the summer can be attributed to weather-sensitive HVAC operation [3]. Small commercial and residential applications make up the largest share of this weather sensitive load.

The shifting of peak cooling loads to off-peak hours can reduce the cost of electric power by allowing baseload generation equipment to operate more economically, both by increases in operating efficiency and by improved returns on capital equipment investments [4]. The ability to shift peak cooling loads can also be used as a demand management tool to direct electric load towards periods when intermittent renewable energy resources are available. This can mitigate the uncertainty in power generation accompanied by the increased use of intermittent wind and solar power sources, while making better use of these renewable resources [5]. The ability to use demand-management tools to shift peak electric load associated with HVAC operation will become increasingly important as intermittent renewables comprise a larger and growing share of electric supply. In addition, residential and small commercial HVAC cooling demand is expected to increase in the U.S. due to a shift in population towards warmer regions of the country [6], increasing the demand for HVAC cooling. These are strong incentives for generators to look for utility-scale or distributed energy storage opportunities.

Local, actively-controlled thermal energy stores can be used to time-shift peak cooling loads. These systems store "cold" during off-peak electric hours, which is then used during peak hours to supplement or replace compressor-based HVAC operations. A common method of thermal energy storage used with hydronic-based HVAC systems utilizes large tanks of chilled secondary coolants, or heat transfer fluids (HTF), such as solutions of water and anti-freeze plus corrosion inhibiting components. Sensible thermal energy is stored in the system as a change in temperature of the storage medium. Water-based thermal storage systems have thermal storage densities typically on the order of 5.8 to 8.1 kWh (thermal)/m$^3$ of HTF, based on a 5 to 7° C. change in temperature of a water-based fluid as it passes through an HVAC system. Newer systems are capable of operating over a larger temperature change of up to 13° C., increasing the thermal storage density to 15.3 kWh/m$^3$; however, these systems require the use of specialized chillers designed to run at a lower temperatures [7].

Due to their storage density, sensible water-based thermal storage systems tend to be quite large. While new buildings can be constructed to allow for these large sensible thermal stores, existing buildings may not have the free space necessary for the coolant storage tanks. The average age of residential and commercial buildings in the U.S. is 37 and 28 years respectively [8.9], which underscores the need develop retrofittable thermal storage systems for these applications. For existing buildings, a solution that can operate at a higher storage density to minimize the size of the thermal store is required. In addition, the thermal store should be compatible with existing or typical chiller and cooling coil equipment so that the chiller supporting the existing HVAC system can also charge the thermal store.

An alternative method of thermal storage utilizes the latent heat resulting from a change in phase, most commonly between solid and liquid forms to minimize volumetric and pressure changes in the system. Materials used in this manner are termed "phase change materials", or PCMs. PCM-based thermal storage systems are characterized by large changes in enthalpy at small or no change in temperature. Common solid-liquid PCMs suitable for cold storage are water, paraffins, and fatty acids, and salt hydrates [10-15]. Of these, paraffins show promise as a thermal storage PCM due to their high latent energy capacity (~220 kJ/kg), lack of a subcooling requirement to initiate freezing, compatibility with common encapsulation materials, and chemical stability over many thermal cycles [14, 16-18]. Paraffins are hydrocarbon alkanes available in a wide range of compositions and freezing temperatures, with longer carbon chains having higher melting temperatures [Hale, Humphries].

To be used in a thermal storage application, the PCM must be isolated from the HTF used in the HVAC system. One method to isolate the PCM is through the use of a shell-and-tube design, where the PCM occupies the shell and tubes carrying HTF run through the shell [19]. This design has an advantage in that the shell-and-tube heat exchanger configuration is well understood. However, the tubes running through the shell complicate plumbing and increase costs, and also occupy space that would otherwise contain PCM and thus lowers overall system capacity.

Alternatively, the PCM can be macro-encapsulated into cylindrical, rectangular or spherical containers [20]. The encapsulated modules of PCM are then placed into a larger tank and exposed to a flow of HTF to store or recover latent thermal energy. Spherical encapsulation containers, while having the greatest surface area, pack poorly; hexagonal close-packing of spheres results in a maximum density of only ~74% [21]. Rectangular encapsulation can be packed to 100% density, but this leaves no room for the HTF to flow; this encapsulation system must be mechanically spaced to allow HTF flow, increasing the cost and complexity of the thermal store. Cylinder (tube) encapsulation, on the other hand, self-packs into a hexagonal arrangement to a maximum 90.7% density [22] while leaving small triangular-like flow paths for HTF distributed evenly around each tube. The base performance and cost per unit of a thermal store constructed with hexagonal-packed tubes is configurable by altering the diameter of the cylinders, while the capacity is scalable by increasing the height and number of cylinders.

Previous studies have shown that this hexagonal-packed cylinder configuration can provide acceptable performance and improved thermal storage densities for HVAC applications if the thermal encapsulation shell meets certain conditions defined by the thermal properties of the encapsulation material, PCM, HTF, and cylinder dimensional parameters [23,24]. A thermal storage system for HVAC cooling load applications, utilizing the PCM tetradecane ($C_{14}H_{30}$) and a hexagonal-packed array of encapsulation tubes, can have a thermal storage density of between 3 and 7 times that of advanced conventional chilled water storage systems. Future improvements in PCMs may yield even higher densities. However, generally applicable design guidelines for engineers wishing to implement this thermal store design are lacking.

The objective of this Example is to provide design guidance for the hexagonal-packed tube encapsulated PCM-based thermal storage systems proposed by Bourne and Novoselac [23-26]. The study investigates the effect of encapsulation tube radius, length, and quantity on system performance and provides guidelines necessary for the use of this design in specific applications. In addition, a modular "stack and pack" method of design and construction can facilitate the mass manufacture of this system, reducing costs and enabling wider adoption of the design.

Methods

A finite volume numeric model is developed for the hexagonal-packed tube encapsulated thermal store design. The numeric model is validated against existing data, and a parametric analysis is performed based on various encapsulation tube lengths and radii.

Numerical Model

A linear numerical model based on a finite volume method is selected for maximum flexibility. The finite volume method permits multiple phase fronts (as well as non-distinct, "mushy" phase fronts [27]) that might occur during interrupted charge/discharge cycles of paraffin compounds, and also permits the variable or intermittent flow rates typically encountered in hydronic-based HVAC systems. In addition, this model type allows for thermal re-reorganization in the store due to conduction during periods of zero HTF flow, which can occur from repeated intermittent cooling demand calls between charge sessions. Finally, this method allows for a combined vertical and radial conduction scheme, which is required for the sufficiently conductive encapsulation shells needed for this design. The model takes as input matrices representing the previous time step temperature and latent energy values for each node (latent energy is set to 0 for surface and non-PCM nodes), HTF input temperature and flow rate, as well as physical parameters and constants for the model. It returns a set of matrices representing the current time step temperature and latent energy values. Successive iterations can be used to model operation over any time interval. The default time step is one second.

Figure 27:
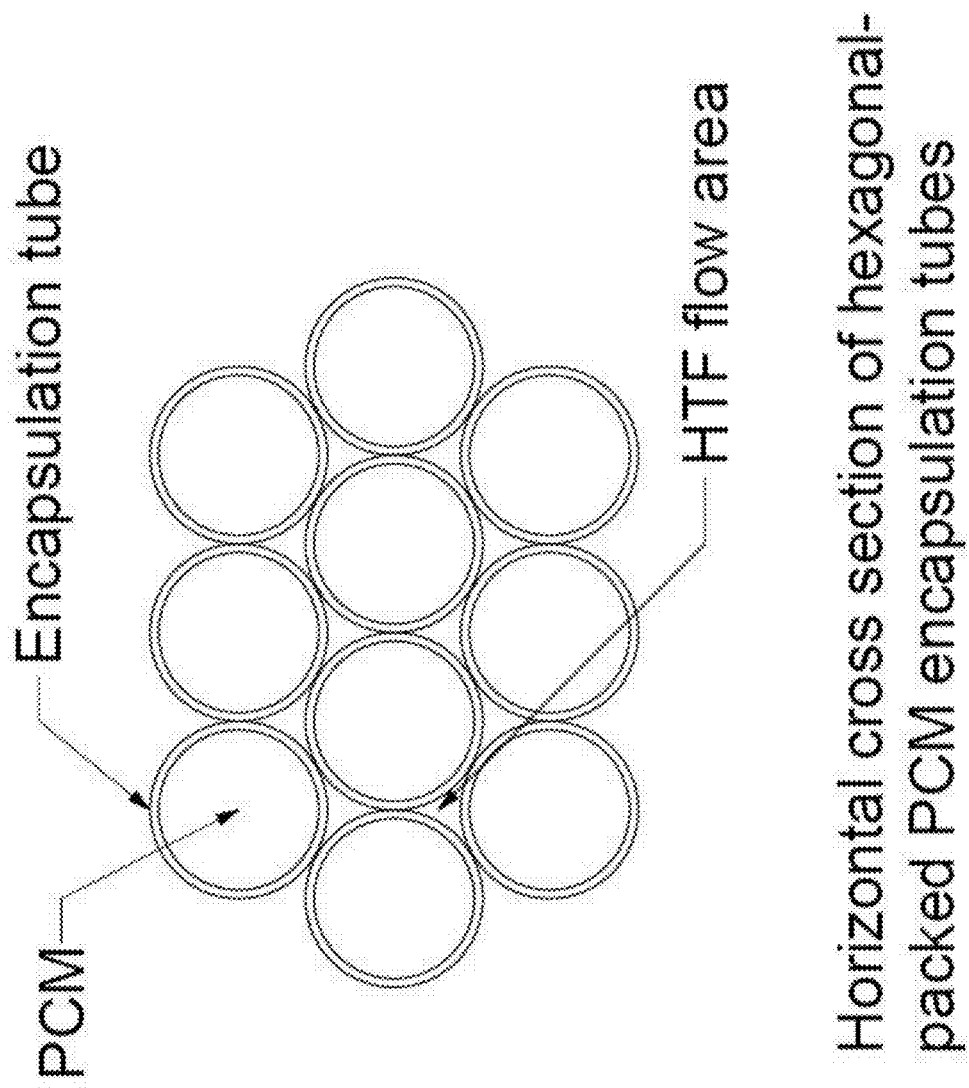
FIG. 27. The packing scheme used in the thermal store. Note the triangular-like flow paths for the HTF that result from the intersection of the encapsulation cylinder surfaces.

The finite volume numerical model of the thermal store is based on a method previously developed for annular flow around closely-spaced cylinders of encapsulated PCM [24]. This model is modified for the hexagonal-packed cylinder-encapsulated PCM-based thermal store design by allowing for the HTF flow paths created by the intersection of the encapsulation tubes, as shown in FIG. 27, to be treated as triangular pipes. Nusselt number correlations exist for average heat transfer in triangular pipes; however, these correlations represent an average heat transfer effect that is not uniform across the pipe surface. This is because HTF flow is restricted at the apex of the triangles, reducing heat transfer in these areas. To eliminate this concern, the model incorporates the "resistance ratio" design parameter proposed by Bourne and Novoselac [23] in the specification of the encapsulation tubes. When applied, this design parameter ensures that the conductivity around the shell of the encapsulation cylinder is an order of magnitude higher than the conductivity either to or from the PCM or HTF. This makes possible the assumption that the thermal load and temperature are well distributed and uniform around the surface of the encapsulation cylinder ($dT/d\theta=0$) making thermal transfer in the encapsulation cylinder and PCM axisymmetric. This simplifies modeling by reducing the model to two dimensions (r and z). Note that because the resistance ratio parameter defines the relationship of the outside radius of the encapsulation tube and material to the encapsulation wall thickness, only the outside radius and material of the encapsulation tube are specified for the model.

Figure 28:
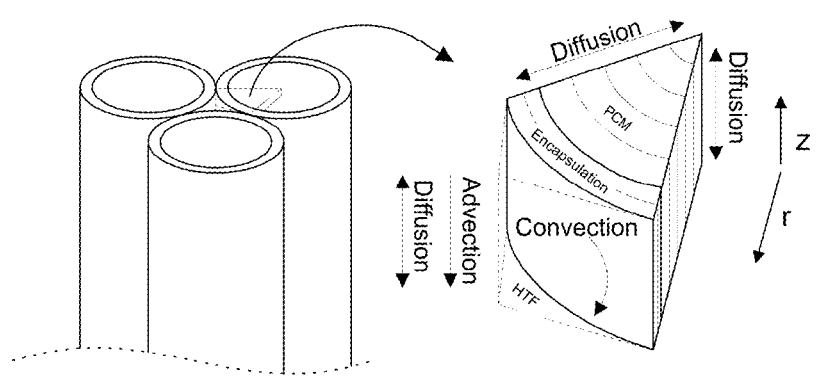
FIG. 28. An element of the numerical model, which consists of components representing the HTF, encapsulation cylinder, and PCM. The model combines a vertical stack of these elements.

FIG. 28 shows an element that is the basis for the numerical model. This element represents a 60° ($\pi/3$ radian) section of an encapsulation cylinder with arbitrary step height $\Delta z$, including its surrounding HTF and enclosed PCM, spanning between the contact points of the adjoining encapsulation cylinders. The vertical surfaces of the element are adiabatic, based on the assumptions that $dT/d\theta=0$ (axisymmetric) in the PCM and encapsulation shell, and that HTF stratification in the tank results in a uniform temperature for all HTF cells at the same vertical location in the tank. However, horizontal surfaces are subject to the temperature gradient in the tank and are therefor not adiabatic. These two assumptions (vertical interfaces are adiabatic, horizontal interfaces are not) allow the thermal store to be modeled as a stack of these elements.

Figure 29:
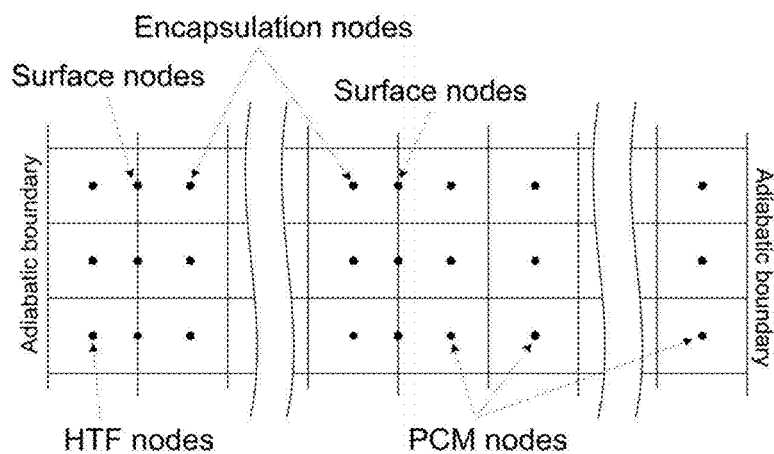
FIG. 29. Example node breakdown for different elements of the model. HTF, encapsulation, PCM, and boundary surface nodes are depicted. The number of PCM and encapsulation nodes are configurable for each model run.

Each element consists of volumes representing the HTF, encapsulation material, and PCM, and each volume contains a node. In addition, some surface nodes are assigned where dissimilar materials or heat transfer mechanisms occur. Volume nodes are used to track temperature, and thus accumulate sensible energy. Volume nodes in the PCM are also used to track latent energy. Surface nodes track temperature, but do not accumulate thermal energy; they act only as transfer agents between volume nodes. An example representation of the nodes and volumes use in the model is shown in FIG. 29.

The model considers advection of HTF flow, vertical diffusion in the HTF, convection from the HTF to the surface of the encapsulation surface, as well as vertical and radial conduction within the encapsulation material and PCM. Changes in sensible energy are calculated by temperature differences between time steps and the specific heat of the material associated with each volume node; changes in latent energy are calculated by the net energy exchanged during phase transition at each time step.

A natural temperature gradient in the tank is maintained to insure that the tank remains stratified and that buoyancy-driven, short-circuit HTF flows are avoided. To accomplish this goal, the direction of HTF flow is made dependent on the cycle type (charge or discharge). During the charge cycle, cold supply HTF is pumped into the bottom of the thermal store and warms as it rises in the tank, absorbing energy from the solidifying PCM; during the discharge cycle, warm return HTF is pumped into the top of the tank and is cooled as it descends in the tank. Maintaining tank stratification minimizes the potential for buoyancy-driven free convection in the HTF, and so this potential is ignored. Only conductivity is considered in the PCM, regardless of phase; any buoyancy-driven convection effects in the PCM are assumed to be included in the effective conductivity of the PCM, $k_c$.

Thermodynamic properties associated with the HTF and the encapsulation material are considered constant over the temperature range of the thermal store; these properties are evaluated at the mean operating temperature. Thermodynamic properties of the fully solid or fully liquid PCM are set dependent on phase state.

Figure 30:
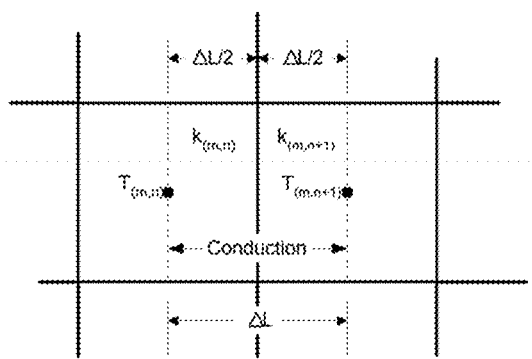
FIG. 30. The physical basis for calculating the effective conductivity value k with respect to heat transfer between adjoining cells with different conductivities.

If the PCM has different conductivity parameters for each phase (liquid, solid) then the conductivity during phase change is set as a linear interpolation of the solid and liquid values based on phase state. In addition, since adjacent cells of PCM may be in different states of phasing and therefore have different conductivity values, the net effective conductivity between adjoining nodes is calculated before each iteration of the model; this allows for the use of larger model elements, reducing node counts and improving model computational run-times. This calculation equates the sum of the thermal resistances to heat flow for the applicable portion of the each element to the net total effective resistance; simplifying and inverting the result yields the effective conductivity between the nodes. FIG. 30 and Equation 1 demonstrate this calculation for horizontally adjoining nodes/cells; the same procedure is applied for vertically adjoining cells.

$$\frac{\Delta L/2}{K_{m,n}A_k} + \frac{\Delta L/2}{k_{m,n+1}A_k} = \frac{\Delta L}{k_{eff}A_k} \rightarrow k_{eff} = \frac{2k_{m,n}k_{m,n+1}}{k_{m,n} + k_{m,n+1}} \quad (1)$$

Figure 31:
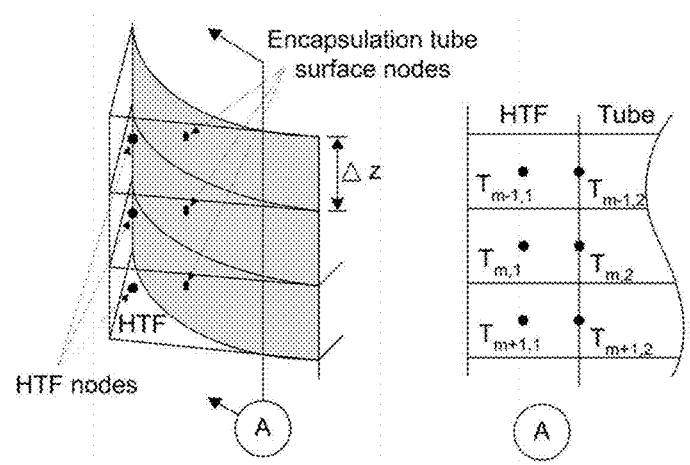
FIG. 31. Geometry and node configuration for heat transfer in the heat transfer fluid (HTF). This figure shows the HTF and convection surface nodes considered during the convection, advection, and diffusion modeling of the HTF. Flow is vertical (top to bottom) during the discharge cycle.

Heat transfer associated with the HTF is modeled using a single HTF node at each vertical step in the model. Advection and vertical diffusion is modeled between HTF nodes, and convection is modeled between the HTF nodes and the surface nodes of the encapsulation cylinder. For convection purposes, the spaces formed between the encapsulation cylinders are modeled as a set of triangular pipes. The flow rates from experiments using this design [23,24] show that velocities are very low. Reynolds numbers are on the order of 1, ensuring laminar flow. A Nusselt number for laminar flow in triangular pipes of 2.5 is used for convection purposes [28]. Each HTF node volume is assumed well mixed at the beginning of each time step, with uniform temperature. The geometry and node configuration is shown in FIG. 31, with the formula used to describe the energy balance and heat transfer with respect to the HTF given in Equation 2.

$$V_f \rho_f C_f (T_{m,1}^t - T_{m,1}^{t-\Delta t}) = \quad (2)$$

$$A_c h(T_{m,2} - T_{m,1})\Delta t + A_a k_f \left( \frac{T_{m-1,1} - T_{m,1}}{\Delta z} - \frac{T_{m,1} - T_{m+1,1}}{\Delta z} \right) \Delta t +$$

$$A_a w \rho_f C_f (T_{m-1,1} - T_{m,1})\Delta t$$

This equation collapses to the differential form found in Equation 3.

$$\frac{\partial T}{\partial t} = \frac{A_c}{V_f} \frac{h}{\rho_f C_f}(T_s - T_f) + a_f \frac{\partial^2 T}{\partial z^2} - w \frac{\partial T}{\partial z} \quad (3)$$

The hydrodynamic entry length can be estimated with Equation 4 using the hydraulic diameter of the triangular-like flow paths and an estimated expected Reynolds number on the order of 1, and the thermal entry length can also be estimated using Equation 5 and the mean Prandtl number of the HTF [28]. The results indicate that the hydrodynamic entry length is on the order of 1 mm, and as a result the flow is assumed hydrodynamically fully developed everywhere in the tank. The results also indicate that the thermal entry length is short relative to the length of the tank, on the order of 16 mm. It should be noted that the thermal entry length calculation is predicated on a constant wall temperature, which is not present in this design. However, the rate of change of wall temperature in the tank during operation is small, and as a result it is assumed that the thermal entry acts as if the wall temperature is constant over the time and length interval of interest for each model element, and that the flow is fully thermally developed everywhere in the tank with respect to the model elements.

$$L_{fd,h} = 0.05 Re_{D_h} D_h \quad (4)$$

$$L_{fd,t} = 0.05 Re_{D_h} D_h Pr \quad (5)$$

Figure 32:
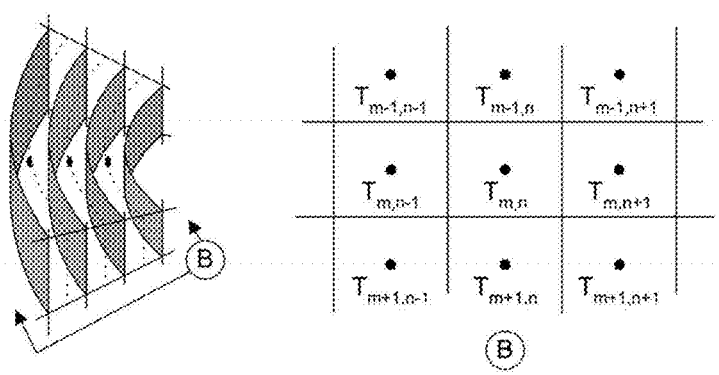
FIG. 32. The node configuration for radial and vertical conduction in the encapsulation and PCM.

Heat transfer within the encapsulation cylinders and the PCM considers conduction only, in both the r and z directions, regardless of whether the PCM is solid, changing phase, or liquid. The geometry and node configuration is shown in FIG. 32. Note that the surface nodes used between the PCM and the encapsulation material are not shown here.

FIG. 32 is used to develop Equation 3 to solve for unknown temperatures at each time step.

$$V_{(m,n)}\rho_{(m,n)}C_{(m,n)}\frac{T^t_{(m,n)} - T^{t-\Delta t}_{(m,n)}}{\Delta t} = \tag{3}$$

$$\left[k_{(m,n)}A_{o(m,n)}\frac{T_{(m,n-1)} - T_{(m,n)}}{\Delta r} - k_{(m,n)}A_{i(m,n)}\frac{T_{(m,n)} - T_{(m,n+1)}}{\Delta r}\right] +$$

$$\left[k_{(m,n)}A_{h(m,n)}\frac{T_{(m-1,n)} - T_{(m,n)}}{\Delta z} - k_{(m,n)}A_{h(m,n)}\frac{T_{(m,n)} - T_{(m+1,n)}}{\Delta z}\right]$$

This equation assumes that adjacent nodes have the same heat capacity and conductivity, which is not true at the interface between the encapsulation tube and the PCM; however, surface nodes are used there to differentiate between the materials and eliminate this concern. The PCM conductivity values shown in Equation 3 are replaced with the calculated effective conductivity values at run time. This equation collapses to the heat equation (assuming k=constant) in cylindrical coordinates for the r and z dimensions:

$$\frac{\partial T}{\partial t} = \frac{\alpha}{r}\frac{\partial}{\partial r}\left(r\frac{\partial T}{\partial r}\right) + \alpha\frac{\partial^2 T}{\partial z^2} \tag{4}$$

To improve the performance and accuracy of the model, a log-mean value is used for conduction calculations involving radial areas represented in Equation 3. This is based on the idea that radial conduction between volumetric temperature nodes can be thought of as conduction between two surface nodes of a cylindrical mass. In this case the integration of Fourier's law gives an effective area for heat transfer equal to the log mean area of the two surfaces involved [29]. This log mean area is used for conduction between radial nodes to maintain model accuracy while allowing larger radial steps.

While the general heat equation still applies during phase transition, its use must be modified to account for the phase change process. During phase change the PCM absorbs or releases a large amount of energy; for an idealized pure PCM, the temperature would be constant during that change. A model for this process would fix the PCM temperature during phase change and then solve for the remaining surrounding temperatures, energy exchanges and net enthalpy change associated with the phase transition. After the PCM element had received or released all the necessary energy to complete phasing, the model would return to representing the PCM element using fixed thermodynamic properties for the PCM in liquid or solid form. However, the PCM modeled here is not ideal.

Previous experiments [24] have shown that the 99% tetradecane PCM utilized melts over a temperature range estimated to be between 4.5° C. and 6.5° C., rather than at a single temperature. Differential scanning calorimeter (DSC) testing on other paraffins show similar characteristics, and also that the heat absorption rate during phase change is not constant with temperature [30]. This precludes the use of an alternative constant specific heat capacity value for use during PCM phase change (the heat of fusion divided by the temperature range over which the phase change occurs). Instead, an enthalpy-tracking method is used to set the temperature of a phasing PCM volume at each time step iteration based on its current phase state.

Figure 33:
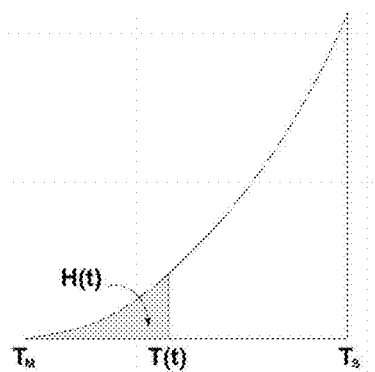
FIG. 33. This curve is used to find the temperature of a PCM node undergoing phase change. $T_M$ and $T_S$ are the low and high temperatures of the phase change, and the area $H_{(t)}$ represents the total enthalpy contributing to phase change at time t and temperature T(t). $H_{(t)}$ is calculated for each PCM node undergoing phase change at each time step, and is used to calculate the new temperature for the PCM node.

The area under the curve shown in FIG. 33 represents an estimate of the enthalpy change in the PCM with respect to temperature over the phase change temperature range. The basic curve shape is based on heat flow rate curves for similar paraffins undergoing DSC testing using a slow temperature ramp rate [30,31], and the knowledge that the DSC heat flow rates are proportional to instantaneous specific heat during phase change [31]. The curve is estimated as a square function of temperature, with the requirement that the integral of the curve represent the total heat of fusion of the PCM (Equation 5). This leads to Equation 6, which solves for the temperature of the PCM node based on the cube root of the fractional phase state of the node.

$$H_f = \int_0^{T_S-T_m} aT^2 dT = \frac{a}{3}(T_S - T_M)^3 \rightarrow a = \frac{3H_f}{(T_S - T_M)^3} \tag{5}$$

$$H(t) = \tag{6}$$

$$\int_0^{T(t)-T_m} aT^2 dT = H_f\frac{(T(t) - T_M)^3}{(T_S - T_M)^3} \rightarrow T(t) = T_M + \sqrt[3]{\frac{H(t)}{H_f}}(T_s - T_m)$$

The temperature of a phasing PCM element is set at the beginning of each time step iteration based on the current phase state, and the remaining unknown model node temperatures are resolved. The current enthalpy of the phasing PCM element is then updated using the resolved node temperatures and general conduction equations. In this way the temperature of a PCM node undergoing phase transition is held constant during the time step, as with a perfect PCM, but is updated to a new constant value for the next time step based on the updated phase enthalpy. Small time steps (1 sec) minimize error using this method.

Model Validation/Calibration

The model data is compared to previous test data [23] to validate the model. However, there are some fundamental differences between the idealized model and the actual experiments from which the validation data was obtained. To make the model comparable to the test data, adjustments are made to the model as described in the following paragraphs. All adjustments to the model are removed for the parametric study; these adjustments are only used for model validation purposes.

The experimental apparatus has an additional volume of HTF at the top and bottom of the tank. A pre-processor is added to the model to account for the time shift and thermal diffusion that occurs as a result of these pools.

The numerical model assumes a perfect insulation system (no losses through the shell). The actual experiment has limited insulation resulting in some losses through the shell, and due to the small diameter of the shell these losses are important (large surface area to volume ratio). To account for the losses, a separate loss calculation is added to the model based on the measured loss rate of the experiment. The measured loss rate is based on a measured steady-state loss rate; typical loss rates noted are between 0.2 and 0.3 W/° K over the surface of the tank, where ° K is the difference between the ambient and tank temperature. This adjustment is applied directly to the HTF in the tank during the model run.

The PVC shell of the experiment accounted for approximately 5% of the total thermal capacity of the thermal store, while the model assumes no mass in the shell. To compensate for this the sensible thermal capacity of the shell is proportionally added to the sensible capacity of the PCM.

A finite amount of time is required set up the experimental apparatus for each run, resulting in a small thermal gain through the shell of the tank. This results in a partial tank stratification, causing a small temperature differential between the top and bottom of the tank. An adjustment is made in the temperatures of the model to duplicate the 0.2° C. gradient in the tank before each model run to compensate for this gain.

Figure 34:
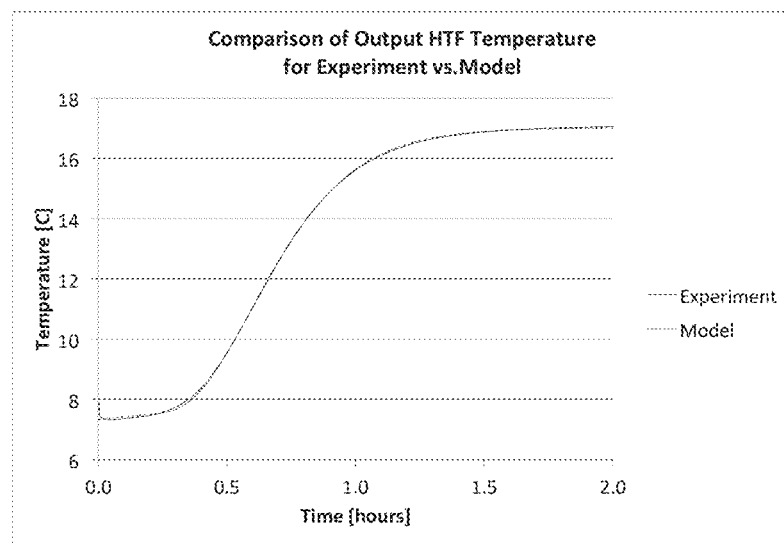
FIG. 34. A comparison of the model to experimental data. The experimental thermal store is preconditioned to 7° C., then 17° C. water is input until the thermal store stabilizes at the new temperature. This temperature range is chosen to ensure sensible thermal changes only are considered. The experiment and model show good agreement.

A validation run is made at temperatures above the freezing point of the PCM. This allows calibration of the PCM liquid state conductivity, and validation of the model for sensible energy conditions. For this comparison the thermal store is stabilized at a temperature slightly above 7° C. (above the melting temperature of the PCM), then 17° C. HTF is input to the store at a normalized rate of approximately 30 L/(min m² of PCM) until the temperature stabilizes in the tank stabilizes. The model and experimental data are then compared, as shown in FIG. 34. The best fit resulted when using a conductivity value for the PCM in its liquid state of 0.15 W/(m ° K), and results in the model data beings almost indistinguishable from the experimental data. This value also agrees with published data [12].

Figure 35:
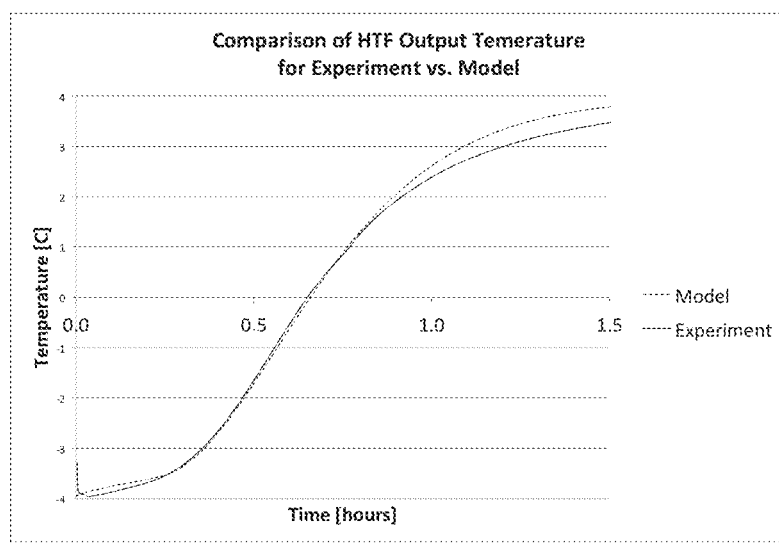
FIG. 35. A comparison of the output heat transfer fluid (HTF) temperature between the model and the experiment. Using a two-stage conductivity value provides good agreement up to ~2° C. The remaining differences are attributed to early onset phase transition.

A second validation run is made at temperatures below the minimum freezing point of the tetradecane PCM. This allows calibration of the solid state PCM conductivity, and validation of the model under a second sensible energy condition. In this case the thermal store was conditioned to a temperature of approximately −4° C., then HTF at a temperature of 3.5° C. is input to the store until the temperature stabilizes at the new value. The model and experiment data are compared in FIG. 35.

In this case no single value of conductivity for the solid PCM allowed for a match over all of the data. However, visual inspection of a clear PVC tube containing frozen tetradecane noted a separation of the PCM from around the partial inside perimeter of the tube. The PCM has a higher density when solid, which indicates that the PCM shrinks when frozen. The observation and density data suggest that a high-resistance interface may be formed at the inside surface of the encapsulation tube due to the PCM shrinking and pulling away from the surface of the tube during the freeze cycle. To compensate for this the model utilizes a two-step conductivity value for the solid state PCM. The node adjacent to the tube surface is given a conductivity a value of 0.06 W/(m ° K), while all other solid PCM nodes are assigned a conductivity for the solid PCM value equal to that of the liquid phase, or 0.15 W/(m ° K). The interface discontinuity only exists while the node is fully solid; as soon as the melting process starts in a node it is assumed that the melted PCM will fill in the discontinuity, and so at that point the PCM node is reassigned the standard solid phase conductivity value of 0.15 W/(m ° K). These values provide a reasonable match to the experimental data up to the point where the output temperature climbs above 1.5° C.

After 0.8 hours (output temperature above 1.5° C.) the model and experimental data diverge significantly. However, a sensible energy analysis of the model and experiment do not account for the additional energy absorption of the experiment. A possible reason for this discrepancy is that an early-onset portion of the phase transition is absorbing part of the energy. Since the additional energy cannot be accounted for in a sensible energy balance, it is assumed that an early phase transition is the cause of the divergence.

A latent heat value for the PCM was found using an energy balance method to be 215 kJ/kg for the 99% tetradecane during the original experiments. This value is in the range of published values for tetradecane (211-227 kJ/kg) [12, 13, 32], and is used here as well for compatibility.

Figure 36:
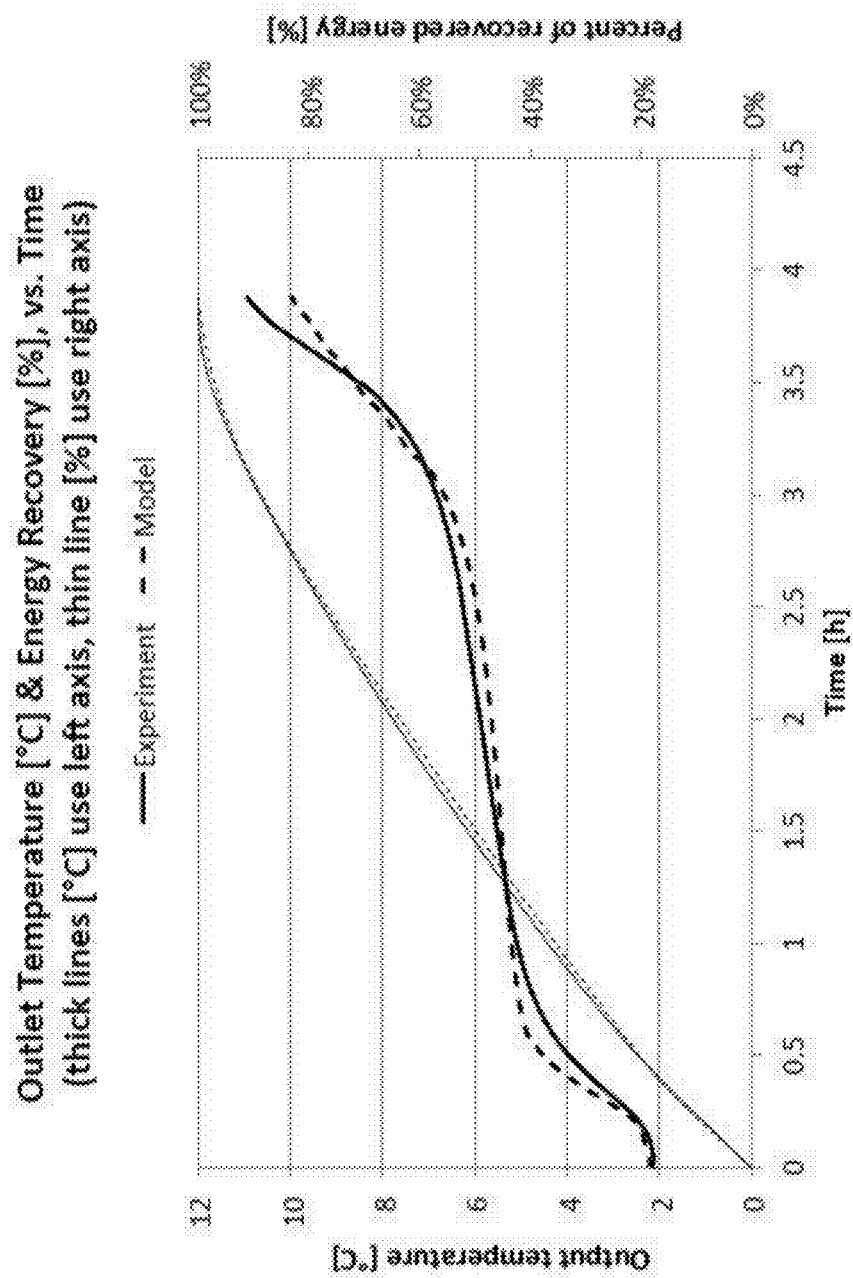
FIG. 36. A comparison of experiment to model data shows good agreement. This plot shows both recovery rate as a percent of total thermal capacity and output temperature of the HTF. The discrepancies are likely due to the unknown thermal properties of the PCM as it undergoes a phase transition. This comparison is made at the median experimental flow rate of 200 ml/min, equivalent to 40 L/(min m² of PCM).

A comparison between the model and the experiment over a phase transition is also performed using the calibrated model. The comparison includes both output temperature and energy recovery as a percent of total energy, and is made at the median flow rate of the experiments. The results of that comparison are shown in FIG. 36. The results shows greater variance due to the unknowns associated with the thermal properties of the PCM during phase transition, however, the energy recovery as percent of total thermal store energy and HTF output temperature are in good agreement. When the particular value of interest for this study—the percent of total energy recovered at $T_{out}$<6.5° C.—is compared between the model and the experimental data, it shows an average error of approximately +/−4% over the full range of flow rates tested. This value is similar to the expected error reported for the experimental measurements, given as 3.7% [23]. This shows that the model is sufficiently accurate for its intended purpose.

Parametric Analysis

The model is run for a series of encapsulation tube outside radius dimensions ranging from 0.007 m to 0.016 m [0.007, 0.010, 0.013, and 0.016m] and heights of 1 to 3 meters in 1 meter increments. Aluminum is modeled for the encapsulation tube material to minimize costs (for instance, by capitalizing on existing knowledge held by the soft drink and canning industry in the manufacture, filling, and protection of aluminum containers). The selected PCM is tetradecane, $C_{14}H_{30}$, in a lab-grade (99%) configuration. The HTF is a 35% solution of propylene glycol in distilled water. The tank shell thermal mass is ignored, and the tank is also assumed to be perfectly insulated (no tank wall losses). The thermodynamic properties of the PCM, the HTF, and the aluminum encapsulation material are given in Table 1 (see Example 1), Table 4 (see Example 2), Table 9 (below), respectively.

TABLE 9

Properties of Aluminum at 6.5° C.

| Property | Value | Units | Source |
| --- | --- | --- | --- |
| Density | 2700 | kg/m³ | Lide, 2001 [34] |
| Conductivity | 236 | W/(m · °K) | |
| Heat capacity | 881 | J/(kg · °K) | |

Flow rates are normalized per cross-sectional area [m²] of PCM, based on the encapsulation tubes being vertical in the tank and the cross sectional area a horizontal plane through the store. These flow rates of 20 to 60 liters/(min m² of PCM) [20, 30, 40, 40, 50, and 60 L/(min m² of PCM)] are proportional to those used in previous studies of this thermal store design [23].

The initial state of the store is fully charged at 2° C., and the incoming HTF is set at a fixed 11° C. A temperature of 6.5° C. is assumed to be the upper limit of usable output temperature, and is used for comparison purposes between different configurations and run parameters.

Results

Figure 37:
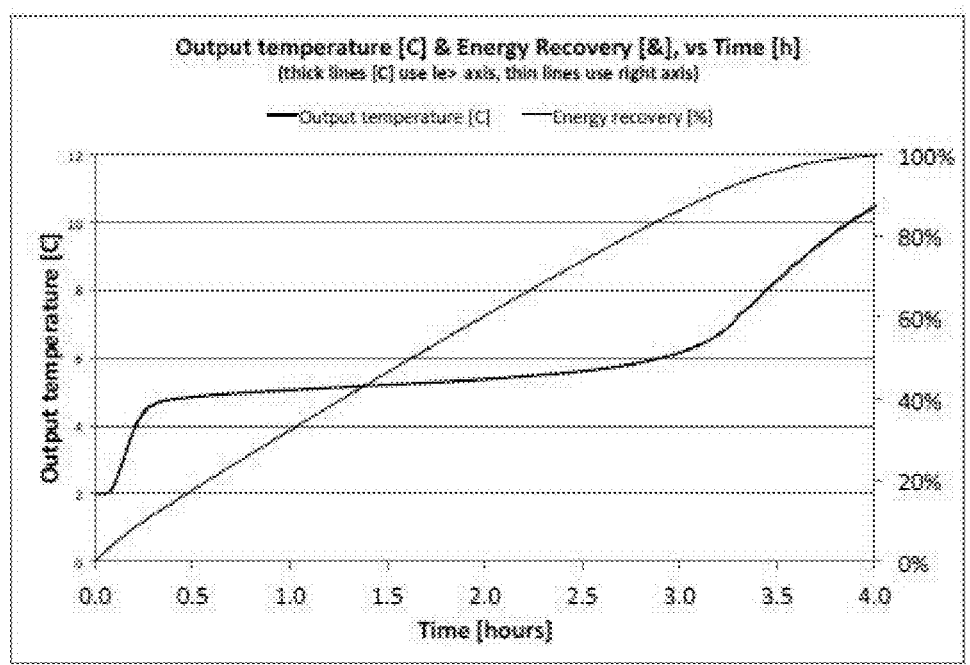
FIG. 37. Example output from the model showing the temperature out and energy recovery as a percentage of total capacity with respect to time for 0.007 m radius encapsulation tubes and a 40 L/(min*m^2 PCM) flow rate of incoming 11° C. HTF. Find the time where the temperature reaches the maximum permissible output temperature and then move up to find the percent of energy recovered.

Model runs are performed for each of the possible tube sizes and flow rate values under consideration. Calculations pertaining to thermal store capacity are normalized so that each store, regardless of encapsulation tube size, has a PCM cross-sectional area of 1 m² and utilizes tubes of 1, 2, or 3 m in length. FIG. 37 shows an example of output temperature and cumulative energy recovery as a percent of store capacity.

Figure 38:
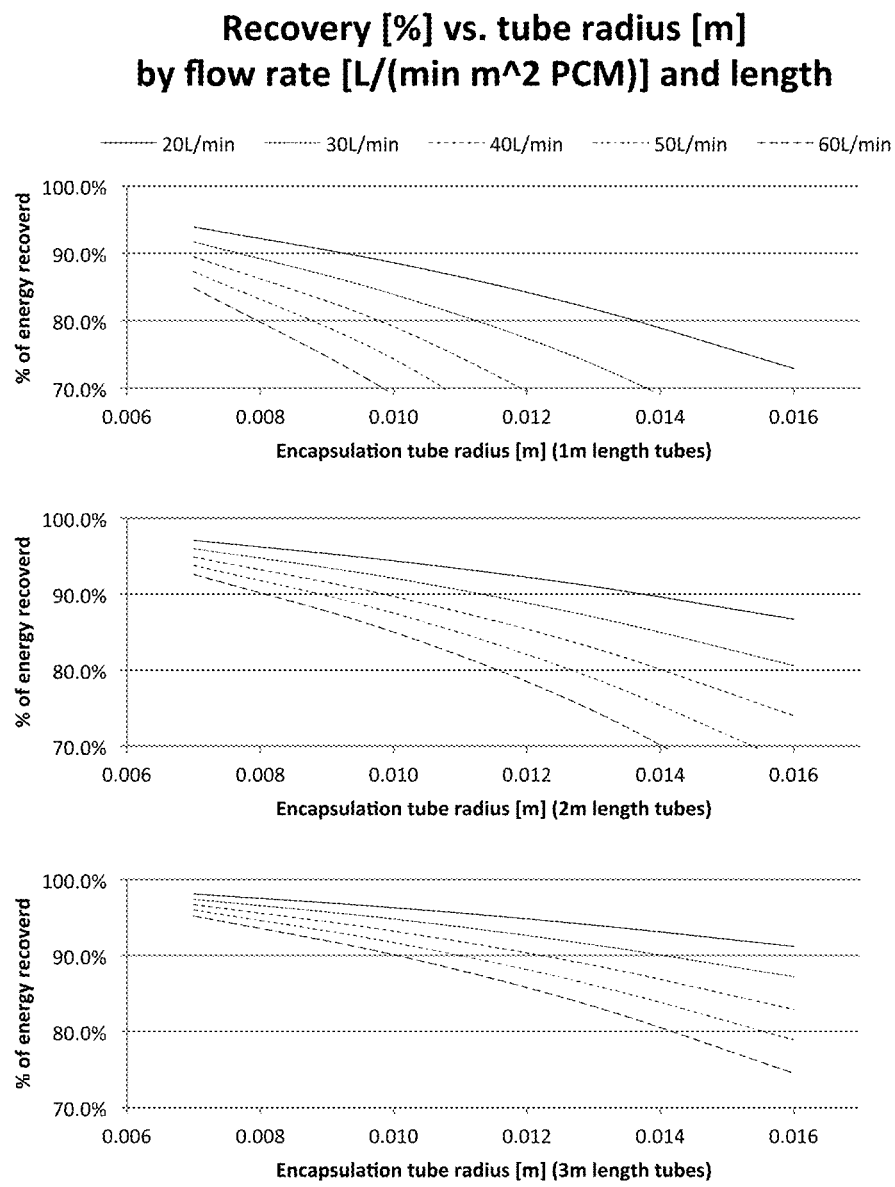
FIG. 38. The recovery rate as a percentage of total thermal store capacity is plotted for various encapsulation tube radii by flow rate per m^2 of PCM cross-sectional area, for 1, 2, and 3 m long tubes, where the input temperature is 11° C. and the output temperature is <6.5° C. The results show that as tube radius increases, flow rates must be slowed or the tubes lengthened to maintain a high recovery rate.

FIG. 38 shows the percent of total energy (sensible and latent) recovered at an output temperature of less than 6.5° C. for aluminum encapsulation tubes by tube radius, length, and flow rate. Flow rates are normalized per square meter of PCM, as examined by a horizontal cross section through the thermal store. These results show that smaller tube diameters allow for greater total energy recovery at any flow rate, but that larger diameter tubes can be used where taller tanks, lower flow rates, or lower total energy recovery values can be tolerated. Larger tubes can reduce costs associated with PCM encapsulation per unit of storage.

Understanding how the performance of this system will be altered as a result of diameter, height, or material changes in the thermal store can extend the use of this parametric data. For instance, since the flow rate of the model is based on the cross sectional area of PCM, adding diameter to the tank provides an increase in flow rate and capacity proportional to the increased cross-sectional area of the store while maintaining the recovery rate and run times predicted for the smaller unit. As an example, a thermal store with a PCM cross-sectional area of 2 m² would allow for a flow rate of 40 L/min while following the energy recovery projection for a 20 L/(min m² of PCM) flow rate as shown in FIG. 38. This same procedure can also be used to design smaller thermal stores.

Figure 39:
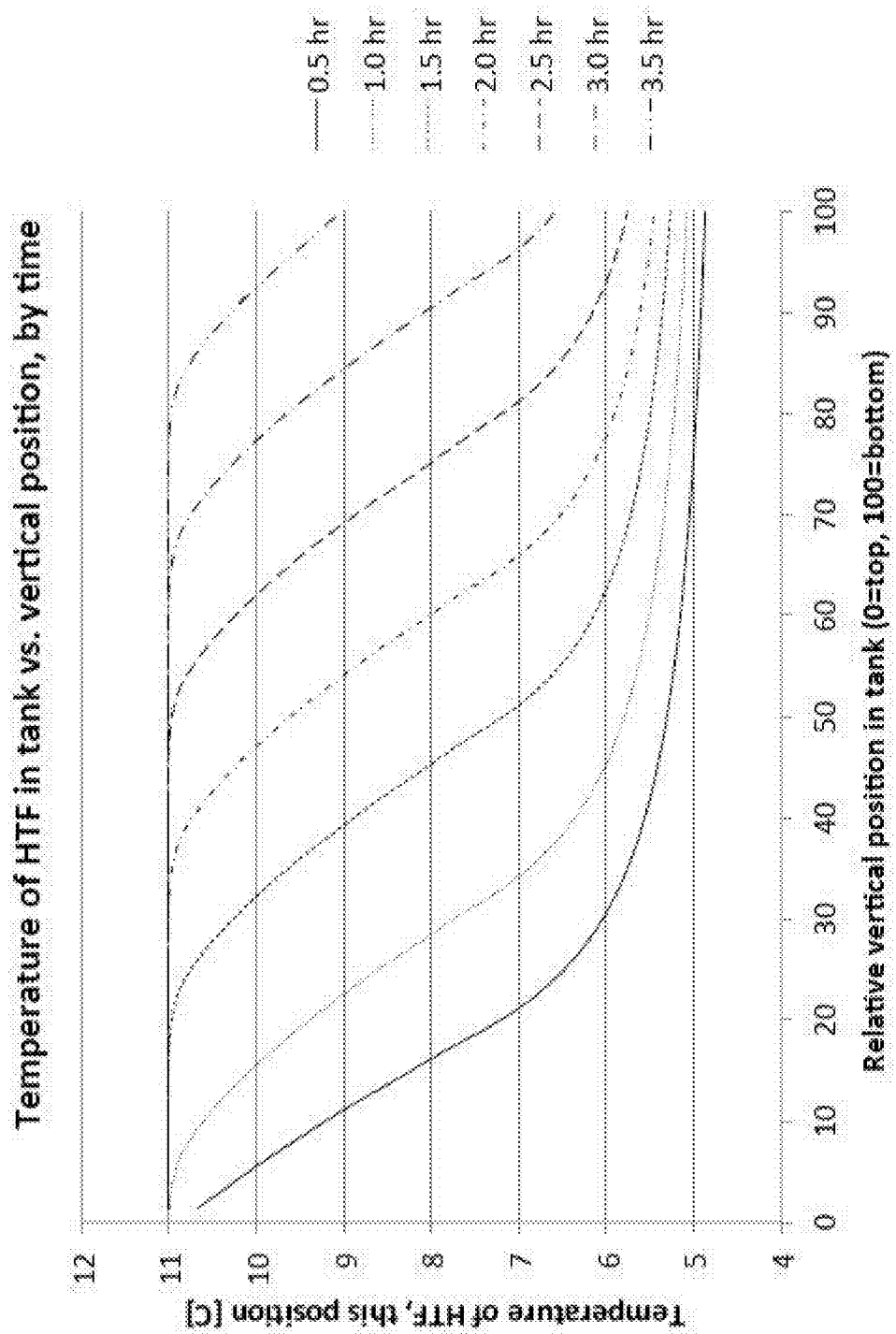
FIG. 39. The temperature gradient initially formed in the tank is pushed down the tank as it discharges. In this case (0.007 m radius encapsulation tubes, 40 L/(min*m^2 of PCM flow rate) the gradient profile is fully developed by the one-hour mark. Once established the gradient travels down the tank until it reaches the tank exit, after which the output temperatures begin to rise quickly.

Taller encapsulation tubes can add capacity and performance as well, but have a different impact on recovery/flow rate performance. A further analysis of the store shows that as the system is operated a temperature gradient is formed in the thermal storage tank. Once established, the temperature gradient maintains a relatively stable slope and length as it moves down the tank during the discharge cycle until it meets the tank output, after which the output temperature rises quickly. This is demonstrated in FIG. 39, which shows snapshots of the tank HTF temperature with respect to vertical position within the tank at i/2 hour time intervals. This indicates that, so long as the length of the thermal store is longer than the final temperature gradient formed in the tank at the point the maximum acceptable output temperature is reached, any length added to the thermal store encapsulation tubes will add capacity that is completely recoverable.

As a result, an increase in height will add capacity and improve the energy recovery fraction $\varepsilon_r$ of the thermal store at any given configuration and flow rate. The change in energy recovery resulting from a height increase over the reference heights of 1, 2, and 3 meters can be estimated using Equation 7. In this equation, $\varepsilon_{r'}$ is the adjusted energy recovery percent, $\varepsilon_r$ is the recovery percent taken from the appropriate graph in FIG. 38, $z_R$ is the reference height of the graph used in FIG. 38, and $\Delta z$ is the height added above the reference height. All of the tested configurations, when recovery was above 70%, met the requirement for thermal gradient length necessary use of equation 7.

$$\varepsilon_{r'} = \frac{\varepsilon_r z_R + \Delta z}{z_R + \Delta z} \quad (7)$$

The use of the resistance ratio [23] to set the inside radius of the encapsulation tubes, coupled with the hexagonal packing of the encapsulation tubes, results in a constant ratio of PCM packing $\varepsilon_p$ (the ratio of PCM cross-sectional area to tank cross-sectional area, or PCM volume to tank volume) for any given encapsulation material, HTF, and PCM. For 35% propylene glycol HTF and tetradecane PCM encapsulated in copper tubes this ratio is 0.849, while it is 0.811 for aluminum. However, even though the copper tubes have a higher PCM density, a thermal store consisting of 1 m³ of PCM will require more aluminum tubes than copper tubes. This results in a larger overall thermal store size but also greater surface area and thus heat transfer rate for the aluminum tubes. These $\varepsilon_p$ values can be used to determine the overall uninsulated size of a given storage capacity, or the storage capacity from the maximum uninsulated size of the tank.

The model results also show that, for the aluminum tubes modeled, the ratio of latent to total thermal energy is approximately 0.90; this can be used to estimate the total energy available in the store using the known volume of PCM in the system.

It is possible to specify a thermal store for a particular application using the data provided in this section, as shown by the following example. Let's assume that a residential-scale thermal store is required. The operating parameters are a capacity of 60 kWh (thermal) with peak demand rate of 9 kW, and a desired recovery rate as a percent of total capacity of 80%. Let's also assume that space is limited for this residential unit, and that the uninsulated diameter of the base can be no more than 1 m (radius=0.5 m). The steps to design this thermal store are as follows:

a) Divide the thermal store desired capacity by the desired recovery percent; this gives the actual needed capacity of the thermal store: 75 kWh.

b) Find the cross-sectional area of the PCM in the thermal store, based on the allowed size (radius=0.5m, area=0.79 m²) multiplied by the packing ratio parameter for aluminum tubes of 0.811; this gives a PCM cross-sectional area of 0.64 meters.

c) Calculate the necessary HTF flow rate to meet the demand rate using an average temperature change between HTF supply and return of 5.5° C., and the specific heat property for the HTF as given in Table 6. This application requires a flow rate of 26 L/min d) Divide the required flow rate by the PCM cross sectional area to obtain the flow rate normalized to a 1 m² cross sectional area of PCM, as used in the graphs of FIG. 38. This gives a normalized flow rate of 40 L/(min m² of PCM).

e) Multiply the required thermal capacity by the typical ratio of latent to total thermal energy (0.90), and then divide this value by the latent capacity of the PCM and PCM density to estimate the total PCM volume needed. For this case the total PCM volume required is 1.5 m³ of PCM.

f) Divide the total PCM required by the PCM cross sectional area to obtain the minimum height of the thermal store, in this case 2.4 meters.

g) Using equation 10, calculate the actual recovery percentage $\varepsilon_{r'}$ from the desired recovery percentage $\varepsilon_{r'}$ using a reference height of 2 m (see the 2 m chart in FIG. 38) and an actual height of 2.4 m; for this design the value comes to 75%.

h) Using the chart for a 2 m tall thermal store in FIG. 38, locate the tube size where the 40 L/min flow rate crosses a horizontal line drawn corresponding to a 75% recovery rate; any tube radius equal to or smaller than the identified radius will function in this application. In this case the 40 L/min flow rate line does not go below 75% at the largest tube radius listed, (0.016 m radius) so any tube radius this size or smaller is acceptable.

The overall thermal density of this storage system design can also be estimated in a similar fashion. For aluminum encapsulation tubes, the overall thermal density is estimated as 41.5 kWh/m$^3$; this is 2.7 to 7.2 times that of typical chilled water storage systems [7].

As an alternative, using pre-manufactured encapsulation tubes of fixed lengths (for example, in 0.5 m increments) enables a thermal store of to be constructed using a "stack and pack" method. The height and radius of the thermal store can be selected based on the data provided in this parametric analysis so that the needed design operating parameters are met. Such a method of construction would facilitate the mass manufacturing of this design, reducing costs and enabling wider adoption of these thermal storage systems.

Summary

This Example investigates the design and operation of a high capacity thermal store consisting of aluminum cylinders containing tetradecane as a PCM, which are densely packed in a hexagonal pattern into a larger tank. A numerical model of the design is validated against existing test data, then used for a parametric analysis of encapsulation tube radius, height, and HTF flow rate on the performance of the thermal store.

The results show that this design provides acceptable storage capacities and recovery rates for use in HVAC cooling applications, providing 2.7 to 7.2 times the storage density of chilled water systems. The parametric data also shows that smaller diameter encapsulation tubes provide faster recovery rates and higher overall recovery efficiency, but that larger tubes can also provide suitable performance when lower flow rates or taller encapsulation tubes are permitted. The data provided by this study provides guidance for the development of thermal stores of varying size and performance using this design, and an example of the process for specifying a thermal store from this data is provided.

REFERENCES CITED IN EXAMPLE 3

[1] U.S. Energy Information Administration. 2015b. "Use of Electricity—Energy Explained, Your Guide To Understanding Energy—Energy Information Administration." Accessed September 1. http://www.eia.gov/energyexplained/index.cfm?page=electricity_use.

[2] U.S. Energy Information Administration. 2015c. "Residential Energy Consumption Survey (RECS)—Data—U.S. Energy Information Administration (EIA)." Accessed September 1. http://www.eia.gov/consumption/residential/data/2009/index.cfm?view=consumption.

[3] Wattles, Paul. 2016. "ERCOT-IGERT Presentation 2/8/16." presented at the IGERT group presentation, University of Texas, February 8.

[4] Bentley, W. G., and John C. Evelyn. 1986. "Customer Thermal Energy Storage a Marketing Opportunity for Cooling off Electric Peak Demand" *Power Systems, IEEE Transactions on* 1 (4): 57-61.

[5] Hermanns, Holger, and Holger Wiechmann 2009. "Future Design Challenges for Electric Energy Supply." In *Emerging Technologies & Factory Automation, 2009. ETFA 2009. IEEE Conference on*, 1-8. http://ieeexplore.ieee.org/xpls/abs_all.jsp?arnumber=5347150.

[6] U.S. Energy Information Administration. 2015d. "Annual Energy Outlook 2015 with Projections to 2040." DOE/EIA-0383 (2015). Washington, D.C.: U.S. Energy Information Administration. http://www.eia.gov/forecasts/aeo/.

[7] Andrepont, John S. 2012. "Applications of Low Temperature Fluid (LTF) in Thermally Stratified Thermally Stratified Thermal Energy Energy Storage (TES)." *ASHRAE Transactions* 118: 487.

[8] U.S. Census Bureau. 2013. "American Housing Survey for the United States: 2011." H150/11. U.S. Government Printing Office. https://www.census.gov/content/dam/Census/programs-surveys/ahs/data/2011/h150-11.pdf.

[9] U.S. Energy Information Administration. 2006. "Commercial Building Energy Consumption Survey." U.S. Energy Information Administration. http://www.eia.gov/consumption/commercial/about.cfm.

[10] Abhat, A. 1983. "Low Temperature Latent Heat Thermal Storage: Heat Storage Materials." *Solar Energy* Vol 30 (4): 313-32.

[11] Agyenim, Francis, Neil Hewitt, Philip Eames, and Mervyn Smyth. 2010. "A Review of Materials, Heat Transfer and Phase Change Problem Formulation for Latent Heat Thermal Energy Storage Systems (LHTESS)." *Renewable and Sustainable Energy Reviews* 14 (2): 615-28. doi:10.1016/j.rser.2009.10.015.

[12] Hale, D, M Hoover, and M O'Neill. 1971. "Phase Change Materials Handbook."

NASA CR-61363. Huntsville, Ala.: Lockheed Missies and Space Company. http://hdl.handle.net/2060/19720012306.

[13] Humphries, William, and Edwin Griggs. 1977. "A Design Handbook for Phase Change Thermal Storage Control and Energy Storage Devices." National Aeronautics and Space Administration Scientific and Technical Information Office. http://hdl.handle.net/2060/19780007491.

[14] Baetens, Ruben, Bjørn Petter Jelle, and Arild Gustavsen. 2010. "Phase Change Materials for Building Applications: A State-of-the-Art Review." *Energy and Buildings* 42 (9): 1361-68. doi:10.1016/j.enbuild.2010.03.026.

[15] Sharma, Atul, V. V. Tyagi, C. R. Chen, and D. Buddi. 2009. *"Review on Thermal Energy Storage with Phase Change Materials and Applications." Renewable and Sustainable Energy Reviews* 13: 318-45.

[16] Feldman, D., M. M. Shapiro, and D. Banu. 1986. "Organic Phase Change Materials for Thermal Energy Storage." *Solar Energy Materials* 13 (1): 1-10.

[17] Feldman, D., M. M. Shapiro, D. Banu, and C. J. Fuks. 1989. "Fatty Acids and Their Mixtures as Phase-Change Materials for Thermal Energy Storage." *Solar Energy Materials* 18 (3): 201-16.

[18] He, B, V Martin, and F Setterwall. 2004. "Phase Transition Temperature Ranges and Storage Density of Paraffin Wax Phase Change Materials." *Energy* 29 (11): 1785-1804. doi: 10.1016/j.energy.2004.03.002.

[19] Trp, Anica. 2005. "An Experimental and Numerical Investigation of Heat Transfer during Technical Grade Paraffin Melting and Solidification in a Shell-and-Tube Latent Thermal Energy Storage Unit." *Solar Energy* 79 (6): 648-60. doi: 10.1016/j.solener.2005.03.006.

[20] Regin, A. Felix, S. C. Solanki, and J. S. Saini. 2008. "Heat Transfer Characteristics of Thermal Energy Storage System Using PCM Capsules: A Review." *Renewable and Sustainable Energy Reviews* 12 (9): 2438-58. doi: 10.1016/j.rser.2007.06.009.

[21] Hales, Thomas C. 1998. "An Overview of the Kepler Conjecture." *arXiv Preprint math/*9811071. http://arxiv.org/abs/math/9811071.

[22] Bezdek, Andréas, and Wlodzimierz Kuperberg. 1990. "Maximum Density Space Packing with Congruent Circular Cylinders of Infinite Length." *Mathematika* 37 (01): 74-80.

[23] Bourne, Stephen, and Atila Novoselac. 2016. "Improved Performance in Tube-Encapsulated Phase Change Thermal Energy Stores for HVAC Applications." *Building and Environment* 98 (March): 133-44. doi: 10.1016/j.buildenv.2015.12.023.

[24] Bourne, Stephen, and Atila Novoselac. 2015. "Compact PCM-Based Thermal Stores for Shifting Peak Cooling Loads." *Building Simulation*, July. doi:10.1007/s12273-015-0243-6.

[25] Bourne, Stephen, and Atila Novoselac. 2015. "PCM-Based High-Density Thermal Storage Systems for Residential and Small Commercial Retrofit Applications." *Procedia Engineering* 121: 536-43. doi:10.1016/j.proeng.2015.08.1025.

[26] Bourne, Steve, and Atila Novoselac. 2014. "Compact Phase Change Based Thermal Storage: Experimental Apparatus, Methodology, and Results." *ASHRAE Transactions* 120 (1): 1-8.

[28] Cengel, Yunus A., Robert H. Turner, and John M. Cimbala. 2008. *Fundamentals of Thermal-Fluid Sciences*. 3rd ed. New York, N.Y.: McGraw Hill.

[29] McAdams, William H. 1942. *Heat Transmission*. 2nd ed. New York: McGraw-Hill.

[30] He, B, V Martin, and F Setterwall. 2004. "Phase Transition Temperature Ranges and Storage Density of Paraffin Wax Phase Change Materials." *Energy* 29 (11): 1785-1804. doi: 10.1016/j.energy.2004.03.002.

[31] O'Neill, M. J. 1966. "Measurement of Specific Heat Functions by Differential Scanning calorimetry." *Analytical Chemistry* 38 (10): 1331-36.

[32] He, Bo, and Fredrik Setterwall. 2002. "Technical Grade Paraffin Waxes as Phase Change Materials for Cool Thermal Storage and Cool Storage Systems Capital Cost Estimation." *Energy Conversion and Management* 43 (13): 1709-23.

[33] American Society of Heating, Refrigerating and Air-Conditioning Engineers. 2009. 2009 *ASHRAE Handbook: Fundamentals*. American Society of Heating, Refrigeration and Air-Conditioning Engineers.

[34] Lide, David R. 2001. *Handbook of Chemistry and Physics*. 82nd ed. Boca Raton, Fla.: CRC Press LLC.

[35] Kouksou, T., A. Jamil, T. El Rhafiki, and Y. Zeraouli. 2010. "Paraffin Wax Mixtures as Phase Change Materials." *Solar Energy Materials and Solar Cells* 94 (12): 2158-65.

While the invention has been described with reference to various and preferred embodiments, it should be understood by those skilled in the art that various changes may be made and equivalents may be substituted for elements thereof without departing from the essential scope of the invention. In addition, many modifications may be made to adapt a particular situation or material to the teachings of the invention without departing from the essential scope thereof.

Therefore, it is intended that the invention not be limited to the particular embodiment disclosed herein contemplated for carrying out this invention, but that the invention will include all embodiments falling within the scope of the claims.

What is claimed is:

1. A latent heat storage device comprising:
   a containment tank;
   a plurality of cylindrical encapsulation tubes having a hollow interior, wherein the cylindrical encapsulation tubes are arrayed in a hexagonal-packed pattern, are comprised of a sufficiently conductive material, and are contained within the containment tank;
   a phase change material, contained within the hollow interior of the cylindrical encapsulation tubes; and
   a means for connecting the containment tank in fluid communication with a first source of heat transfer fluid to allow a heat transfer fluid to flow through a heat transfer fluid space to exchange heat with the phase change material;
   wherein the latent heat storage device has a first resistance ratio of less than about 0.1, wherein the first resistance ratio is defined by the equation:

$$\frac{R_t}{R_c} = \frac{\pi^3}{72(2\sqrt{3}-\pi)} \frac{(r_o+r_i)/2}{(r_o-r_i)} \frac{Nu\ k_f}{k_t}$$

wherein:
$R_t$ is the resistance of conduction around the encapsulation tube [° K/W];
$R_c$ is the resistance of convection between the heat transfer fluid (HTF) and the encapsulation tube [° K/W];
$r_o$ is the outside radius of the encapsulation tube [m];
$r_i$ is the inside radius of the encapsulation tubing [m];
$k_f$ is the conductivity of the heat transfer fluid [W/(m·° K)];
$k_t$ is the conductivity of the encapsulation tube material [W/(m·° K)]; and
Nu is the Nusselt number.

2. The device of claim 1, wherein the sufficiently conductive tubes are comprised of a metal.

3. The device of claim 2, wherein the sufficiently conductive tubes are comprised of copper.

4. The device of claim 2, wherein the sufficiently conductive tubes are comprised of aluminum.

5. The device of claim 1, wherein the phase change material is selected from water (ice), a salt hydrate, a fatty acids, or a paraffin hydrocarbon.

6. The device of claim 5, wherein the phase change material is a paraffin hydrocarbon.

7. The device of claim 6, wherein the phase change material comprises tetradecane.

8. The device of claim 7, wherein the phase change material comprises at least 99% tetradecane.

9. The device of claim 1, wherein the phase change material has a phase change temperature in a range between 5° C. and 12° C.

10. The device of claim 1, wherein the heat transfer fluid comprises an aqueous solution of ethylene glycol, propylene glycol, glycerol, or combinations thereof.

11. The device of claim 10, wherein the heat transfer fluid comprises an aqueous solution containing about 35% by volume propylene glycol.

12. The device of claim 1, wherein the latent heat storage device has a resistance ratio of less than about 0.05.

13. A latent heat storage device comprising:
   a containment tank;
   a plurality of cylindrical encapsulation tubes having a hollow interior, wherein the cylindrical encapsulation tubes are arrayed in a hexagonal-packed pattern, are comprised of a sufficiently conductive material, and are contained within the containment tank;
   a phase change material, contained within the hollow interior of the cylindrical encapsulation tubes; and a means for connecting the containment tank in fluid communication with a first source of heat transfer fluid to allow a heat transfer fluid to flow through a heat transfer fluid space to exchange heat with the phase change material;

wherein the latent heat storage device has a resistance ratio of less than about 0.1, wherein the resistance ratio is defined by the equation:

$$\frac{R_t}{R_p} = \frac{\pi^2}{18} \frac{(r_o + r_i)/2}{(r_0 - r_i)} \frac{k_p}{k_t}$$

wherein:

$R_t$ is the resistance of conduction around the encapsulation tube [° K/W];

$R_p$ is the resistance of conduction between the PCM and the encapsulation tube [° K/W];

$r_o$ is the outside radius of the encapsulation tube [m];

$r_i$ is the inside radius of the encapsulation tubing [m];

$k_p$ is the conductivity of the phase change material (PCM) [W/(m·° K)]; and $k_t$ is the conductivity of the encapsulation tube material [W/(m·° K)].

14. The device of claim 13, wherein the sufficiently conductive tubes are comprised of a metal.

15. The device of claim 13, wherein the phase change material is selected from water (ice), a salt hydrate, a fatty acids, or a paraffin hydrocarbon.

16. The device of claim 13, wherein the heat transfer fluid comprises an aqueous solution of ethylene glycol, propylene glycol, glycerol, or combinations thereof.

17. The device of claim 13, wherein the latent heat storage device has a resistance ratio of less than about 0.05.

18. A latent heat storage device comprising:

a containment tank;

a plurality of cylindrical encapsulation tubes having a hollow interior, wherein the cylindrical encapsulation tubes are arrayed in a hexagonal-packed pattern, are comprised of a sufficiently conductive material, and are contained within the containment tank;

a phase change material, contained within the hollow interior of the cylindrical encapsulation tubes; and a means for connecting the containment tank in fluid communication with a first source of heat transfer fluid to allow a heat transfer fluid to flow through a heat transfer fluid space to exchange heat with the phase change material;

wherein the latent heat storage device has a first resistance ratio of less than about 0.1 and a second resistance ratio of less than about 0.1;

wherein the first resistance ratio is defined by the equation:

$$\frac{R_t}{R_c} = \frac{\pi^3}{72(2\sqrt{3} - \pi)} \frac{(r_o + r_i)/2}{(r_o - r_i)} \frac{Nu}{k_t} \frac{k_f}{k_t}$$

wherein the second resistance ratio is defined by the equation:

$$\frac{R_t}{R_p} = \frac{\pi^2}{18} \frac{(r_o + r_i)/2}{(r_0 - r_i)} \frac{k_p}{k_t}$$

wherein:

$R_t$ is the resistance of conduction around the encapsulation tube [° K/W];

$R_c$ is the resistance of convection between the heat transfer fluid (HTF) and the encapsulation tube [° K/W];

$R_p$ is the resistance of conduction between the PCM and the encapsulation tube [° K/W];

$r_o$ is the outside radius of the encapsulation tube [m];

$r_i$ is the inside radius of the encapsulation tubing [m];

$k_f$ is the conductivity of the heat transfer fluid [W/(m·° K)];

$k_p$ is the conductivity of the phase change material (PCM) [W/(m·° K)];

$k_t$ is the conductivity of the encapsulation tube material [W/(m·° K)]; and

Nu is the Nusselt number.

19. The device of any one of claim 18, wherein the latent heat storage device has a first resistance ratio of less than about 0.05.

20. The device of claim 18, wherein the latent heat storage device has a second resistance ratio of less than about 0.05.

* * * * *